(12) United States Patent
Sakagami et al.

(10) Patent No.: US 8,553,245 B2
(45) Date of Patent: Oct. 8, 2013

(54) MANAGEMENT OF IMAGE FORMING APPARATUS BASED ON USER AUTHENTICATION

(75) Inventors: Atsushi Sakagami, Kanagawa (JP); Naoto Sakurai, Saitama (JP); Koji Sasaki, Kanagawa (JP); Tomoko Saeki, Tokyo (JP); Tsuyoshi Hoshino, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 456 days.

(21) Appl. No.: 12/485,206

(22) Filed: Jun. 16, 2009

(65) Prior Publication Data
US 2010/0002250 A1 Jan. 7, 2010

(30) Foreign Application Priority Data
Jul. 4, 2008 (JP) ................................. 2008-176227

(51) Int. Cl.
*G06K 15/00* (2006.01)

(52) U.S. Cl.
USPC .............. 358/1.14; 358/1.1; 358/1.15; 726/3; 726/4; 726/5; 726/6; 726/7; 726/26; 726/27; 726/29; 726/31; 713/168; 713/170; 713/186

(58) Field of Classification Search
None
See application file for complete search history.

(56) References Cited

U.S. PATENT DOCUMENTS

| | | | |
|---|---|---|---|
| 7,542,590 B1 * | 6/2009 | Robinson et al. ............. | 382/115 |
| 7,821,660 B2 * | 10/2010 | Kitada ........................ | 358/1.15 |
| 7,916,320 B2 * | 3/2011 | Okamoto et al. ............ | 358/1.14 |
| 8,127,362 B2 * | 2/2012 | Asahara ....................... | 726/26 |
| 8,146,809 B2 * | 4/2012 | Matsumoto et al. ........... | 235/380 |
| 2004/0046986 A1 * | 3/2004 | Kuwabara et al. ............ | 358/1.14 |
| 2004/0255168 A1 * | 12/2004 | Murashita et al. ............. | 713/202 |
| 2005/0146755 A1 | 7/2005 | Shimokawa et al. | |
| 2005/0154739 A1 * | 7/2005 | Ikai et al. ......................... | 707/10 |
| 2006/0044589 A1 * | 3/2006 | Nakagawaji .................. | 358/1.14 |
| 2007/0016777 A1 * | 1/2007 | Henderson et al. ........... | 713/169 |
| 2007/0133033 A1 * | 6/2007 | Mizutani et al. .............. | 358/1.14 |
| 2008/0068637 A1 * | 3/2008 | Levy ............................. | 358/1.14 |
| 2009/0262381 A1 * | 10/2009 | Tsujimoto ..................... | 358/1.14 |
| 2010/0083000 A1 * | 4/2010 | Kesanupalli ................... | 713/186 |
| 2011/0060908 A1 * | 3/2011 | Pizano et al. .................. | 713/168 |
| 2011/0185413 A1 * | 7/2011 | Fujii et al. ......................... | 726/7 |

FOREIGN PATENT DOCUMENTS

| | | |
|---|---|---|
| JP | 2000-311138 | 11/2000 |
| JP | 2004-222141 | 8/2004 |
| JP | 2005-122656 | 5/2005 |
| JP | 2005-278143 A | 10/2005 |

(Continued)

OTHER PUBLICATIONS

Office Action issued Sep. 4, 2012, in Japanese Patent Application No. 2008-176227.

(Continued)

*Primary Examiner* — Hilina K Demeter
(74) *Attorney, Agent, or Firm* — Oblon, Spivak, McClelland, Maier & Neustadt, L.L.P.

(57) ABSTRACT

An image forming apparatus connected via a network with an authentication server for user authentication based on biometric information about a user. The image forming apparatus is also connected with a managing server for managing an operation of the image forming apparatus. The image forming apparatus includes a transmission unit transmitting the biometric information about the user to the authentication server, a reception unit receiving use limit information corresponding to the biometric information about the user from the managing server, and a control unit controlling the operation of the image forming apparatus based on the use limit information.

13 Claims, 45 Drawing Sheets

(56) References Cited

FOREIGN PATENT DOCUMENTS

| | | |
|---|---|---|
| JP | 2006-113953 A | 4/2006 |
| JP | 2007-004478 A | 1/2007 |
| JP | 2007-94541 A | 4/2007 |
| JP | 3940321 | 4/2007 |

OTHER PUBLICATIONS

Japanese Office Action issued Nov. 20, 2012, in Japan Patent Application No. 2008-176227.

\* cited by examiner

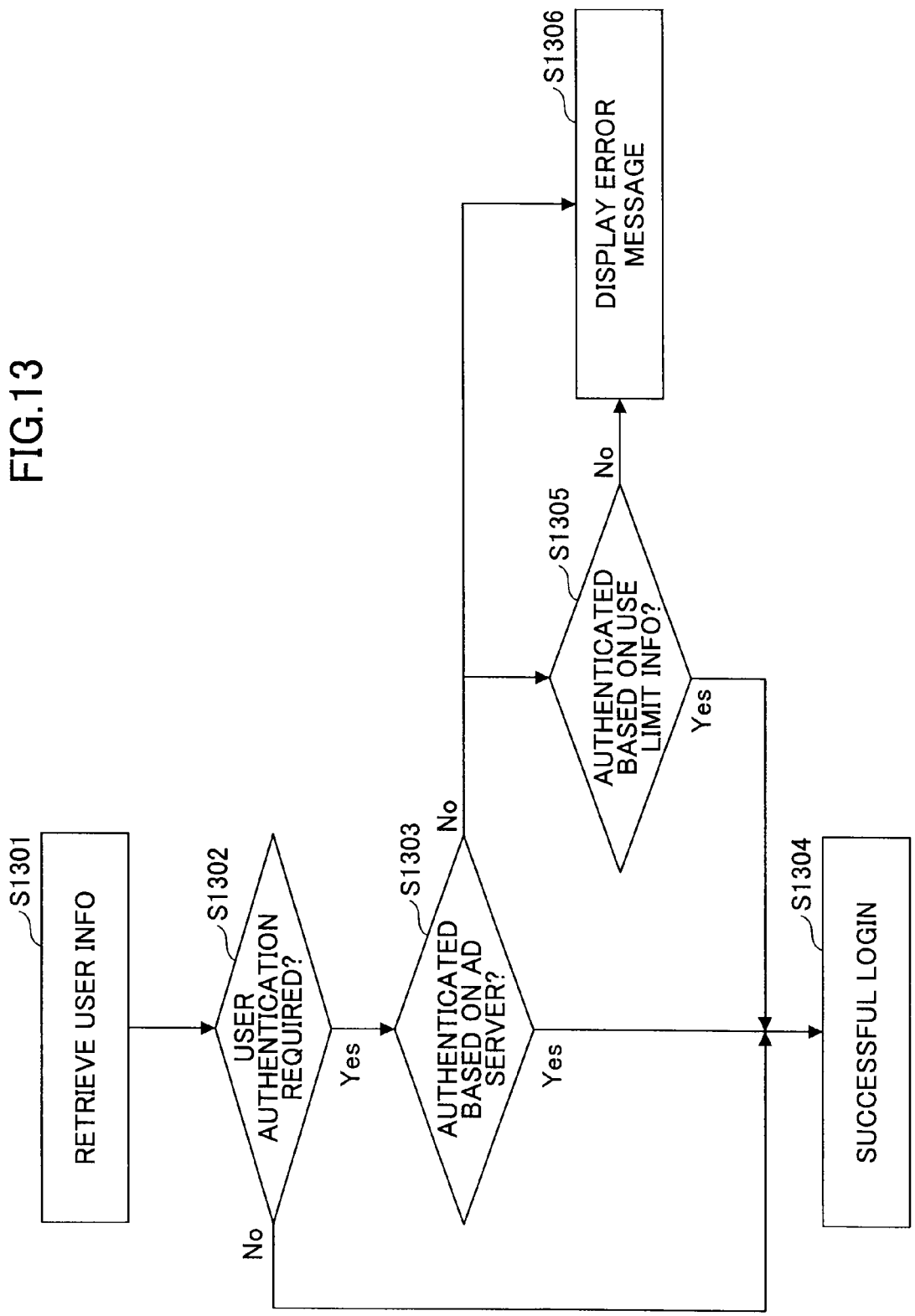

FIG.19

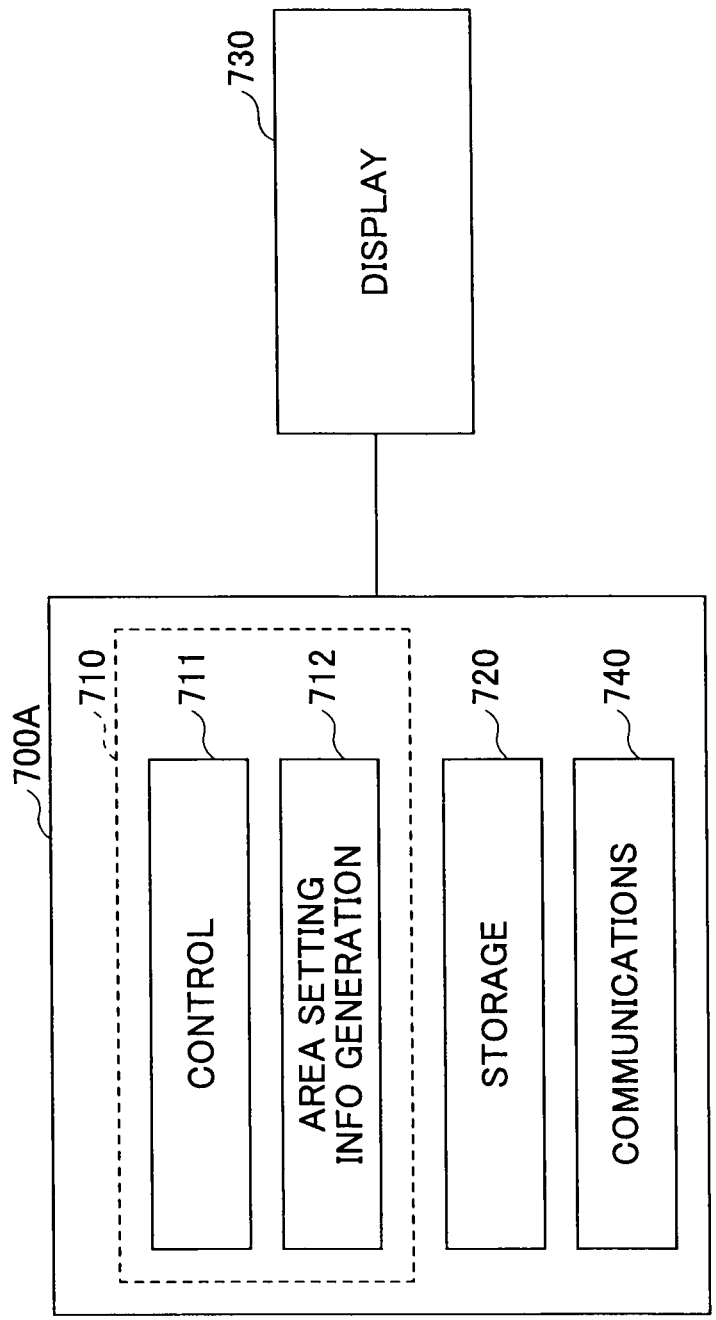

FIG.32A

|   | 0 | 7 8 9 10 11 | 15 |
|---|---|---|---|
| 0 | IC CARD IDENTIFYING INFO | | |
| 1 | ① EMPLOYEE NO. | ② TIMES OF ISSUE | - |
| 2 | ③ DATE OF ISSUE | | - |
| 3 | | ④ EXPIRATION DATE | |
| 4 | | .. | |

IC CARD A

FIG.32B

| No. | ITEM | BLOCK NO. | START | END | DIGITS | ATTRIBUTE | CHARACTER | VALUE |
|---|---|---|---|---|---|---|---|---|
| ① | EMPLOYEE NO. | 1 | 0 | 9 | 10 FIXED | FIXED | ASCII | P000445566 |
| ② | TIMES OF ISSUE | 1 | 10 | 11 | 2 FIXED | FIXED | ASCII | 01 |
| ③ | DATE OF ISSUE | 2 | 0 | 7 | 8 FIXED | FIXED | ASCII | 20070206 |
| ④ | EXPIRATION DATE | 3 | 8 | 15 | 8 FIXED | FIXED | ASCII | 20101231 |

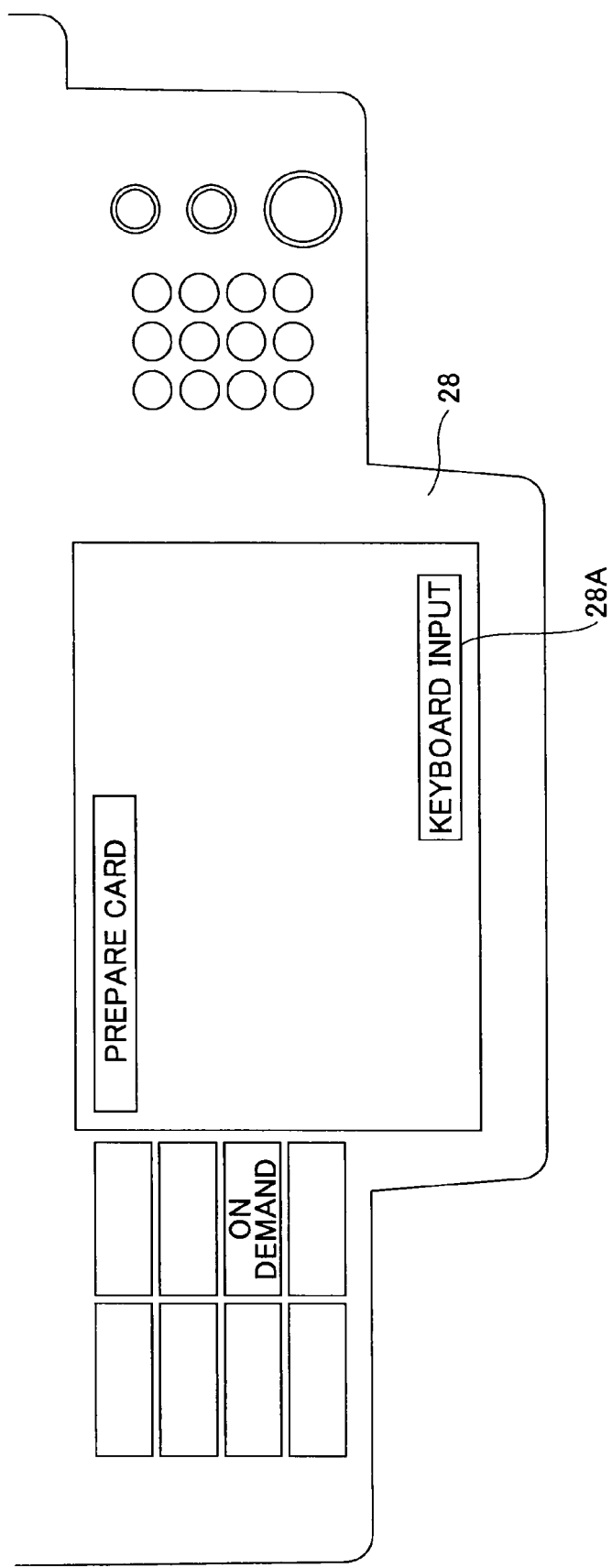

MANAGEMENT OF IMAGE FORMING APPARATUS BASED ON USER AUTHENTICATION

BACKGROUND OF THE INVENTION

1. Field of the Invention

The present invention generally relates to image forming apparatuses including multifunction peripherals, and more particularly to systems and methods for managing processes in such an image forming apparatus based on user authentication.

2. Description of the Related Art

In recent years, sharing of an image forming apparatus such as a multifunction peripheral ("MFP", which includes the multiple functions of a facsimile, a scanner, and a copier, for example) has become increasingly common in offices of organizations or corporations, wherein a plurality of computer terminals are connected over a network. In such an environment, confidentiality of image data handled on the network needs to be maintained. Further, as the image forming apparatus is shared by multiple users, improvement in utilization efficiency is desirable.

For example, in Japanese Laid-Open Patent Application No. 2004-222141 directed to a network scanner apparatus, address information including at least a user name, a password, distribution information, and a reference address is set for each address to which data is distributed via a network and registered in an address information storage unit. Based on the combination of the user name and password in the address information storage unit, user authentication is performed, and use of the network scanner apparatus is granted only to those users who have been authenticated.

However, in the above invention, because the image data of a manuscript that has been read is transferred to a certain destination, the image data may be viewed by unintended people when the terminal at the destination is shared by multiple users. Furthermore, utilization of the network scanner apparatus is granted to all of the users who are authenticated. It should be noted that many of the modern image forming apparatuses are multifunctional and include FAX and copy functions as well as scanner function. If the multiple authenticated persons are granted utilization of all such functions of a multifunctional image forming apparatus, the image forming apparatus may possibly be used for unintended purposes.

SUMMARY OF THE INVENTION

One or more of the disadvantages of the related art are overcome by the present invention which, in one aspect, is an image forming apparatus connected via a network with an authentication server for authenticating a user of the image forming apparatus based on biometric information about the user that is acquired by the image forming apparatus. The image forming apparatus is also connected with a managing server for managing an operation of the image forming apparatus.

The image forming apparatus includes a transmission unit configured to transmit the biometric information about the user to the authentication server; a reception unit configured to receive use limit information corresponding to the biometric information about the user from the managing server; and a control unit configured to control the operation of the image forming apparatus based on the use limit information.

In another aspect of the present invention, there is provided a method for managing an operation of an image forming apparatus by a user using a managing server connected with the image forming apparatus via a network. A biometric authentication server for authenticating the user of the image forming apparatus based on biometric information that is acquired by the image forming apparatus is also connected with the managing server via the network.

The method includes storing use limit information limiting the operation of the image forming apparatus in the managing server; receiving user identifying information corresponding to the biometric information acquired by the image forming apparatus from the biometric authentication server; acquiring from the managing server the use limit information corresponding to the user identifying information; and transmitting the use limit information to the image forming apparatus.

In yet another aspect, there is provided an image forming apparatus managing system for managing an operation of an image forming apparatus connected via a network with a biometric authentication server for authenticating a user of the image forming apparatus based on biometric information about the user that is acquired by the image forming apparatus. The image forming apparatus is also connected via the network with a managing server for managing the operation of the image forming apparatus.

The biometric authentication server includes a transmission unit configured to transmit user identifying information corresponding to the biometric information received from the image forming apparatus to the managing server. The managing server includes a use limit information storage unit in which use limit information limiting the operation of the image forming apparatus is stored; a use limit information acquiring unit configured to acquire the use limit information corresponding to the user identifying information from the limit information storage unit; and a transmission unit configured to transmit the use limit information to the image forming apparatus.

The image forming apparatus includes a transmission unit configured to transmit the acquired biometric information to the biometric authentication server; and a control unit configured to control the operation of the image forming apparatus based on the use limit information transmitted from the managing server.

BRIEF DESCRIPTION OF THE DRAWINGS

Other objects, features and advantages of the present invention will become apparent upon consideration of the specification and the appendant drawings, in which:

FIG. 13 shows a flowchart of an IC card authentication process according to Embodiment 1;

FIG. 19 shows a screen displayed on the operating/display unit 28;

FIG. 31 shows a managing terminal 700A according to Embodiment 4;

FIG. 32A shows a format of an IC card;

FIG. 32B shows a table of information items recorded in the IC card;

FIGS. 38A and 38B show examples of screens displayed on the MFP 200C according to Embodiment 4;

FIG. 41 shows a configuration of an MFP 200a, an operating terminal 50, a biometric information reader 210a, and an IC card reader 220a.

DETAILED DESCRIPTION OF THE PREFERRED EMBODIMENTS

In accordance with an embodiment of the present invention, biometric information of a user is acquired by an image forming apparatus, and the user is authenticated or not authenticated by a biometric authentication server based on the biometric information. Utilization of the image forming apparatus by the user is controlled by a managing server in accordance with the biometric information.

Figure 1:
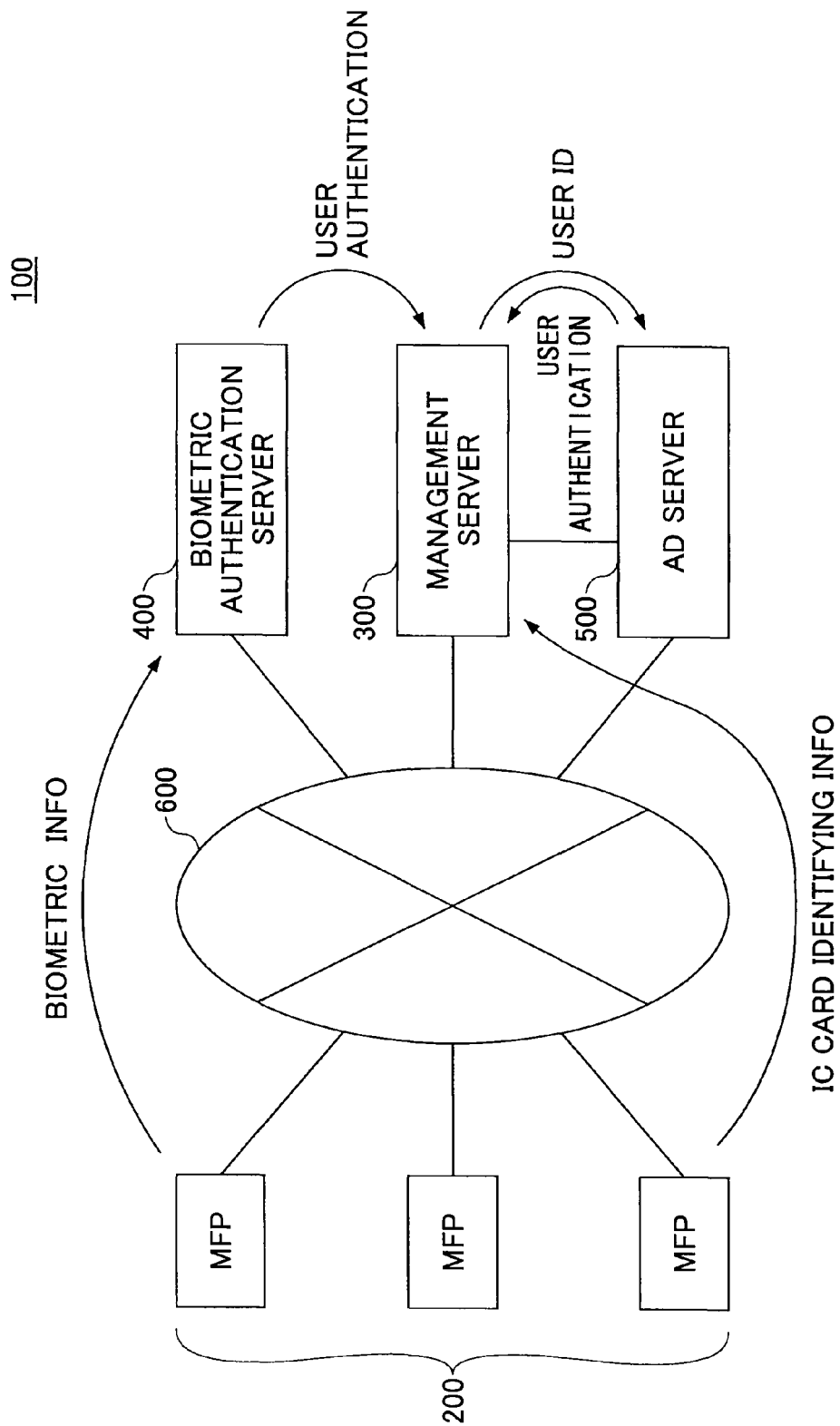
FIG. 1 shows an image forming apparatus managing system 100 according to an embodiment of the present invention.

FIG. 1 shows an image forming apparatus managing system 100 according to an embodiment of the present invention. The image forming apparatus managing system 100 includes one or more multifunction peripherals (MFP) 200 as an image forming apparatus, a managing server 300, a biometric authentication server 400, and an AD (ActiveDirectory) server 500, which are connected via a network 600.

The MFP 200 acquires biometric information about a user of the MFP 200 as authenticating information for authenticating the user. The biometric information is transmitted to the biometric authentication server 400 via the network 600. In the biometric authentication server 400, there is stored a user ID corresponding to the biometric information. The biometric authentication server 400 transmits the corresponding user ID to the managing server 300. In the managing server 300, there is stored use limit information concerning the MFP 200 that is associated with the user ID. The managing server 300 supplies the use limit information corresponding to the user ID to the MFP 200. Based on the use limit information, an operation of the MFP 200 is controlled.

The MFP 200 may employ information stored in a recording medium, such as IC card identifying information stored in an IC card, as the authenticating information. In this case, the MFP 200 transmits the acquired IC card identifying information to the managing server 300. The managing server 300 then transmits the user ID corresponding to the IC card identifying information to the AD server 500 for user authentication. The managing server 300 supplies the use limit information associated with the authenticated user ID to the MFP 200. Based on the use limit information, the MFP 200 controls its operation.

Thus, in the image forming apparatus managing system 100 according to the present embodiment, either biometric information about the user or identifying information stored in a recording medium such as an IC card may be used as the information used for user authentication. The operation of the MFP 200 is then controlled based on the use limit information associated with each user ID corresponding to the biometric information or IC card identifying information about each user. Use of the image forming apparatus is thus granted on an individual user basis, thus making it possible to maintain confidentiality of information. Further, in accordance with the present embodiment, use of biometric information for user authentication prevents impersonation, so that information that requires high level of confidentiality can be properly handled.

Figure 2:
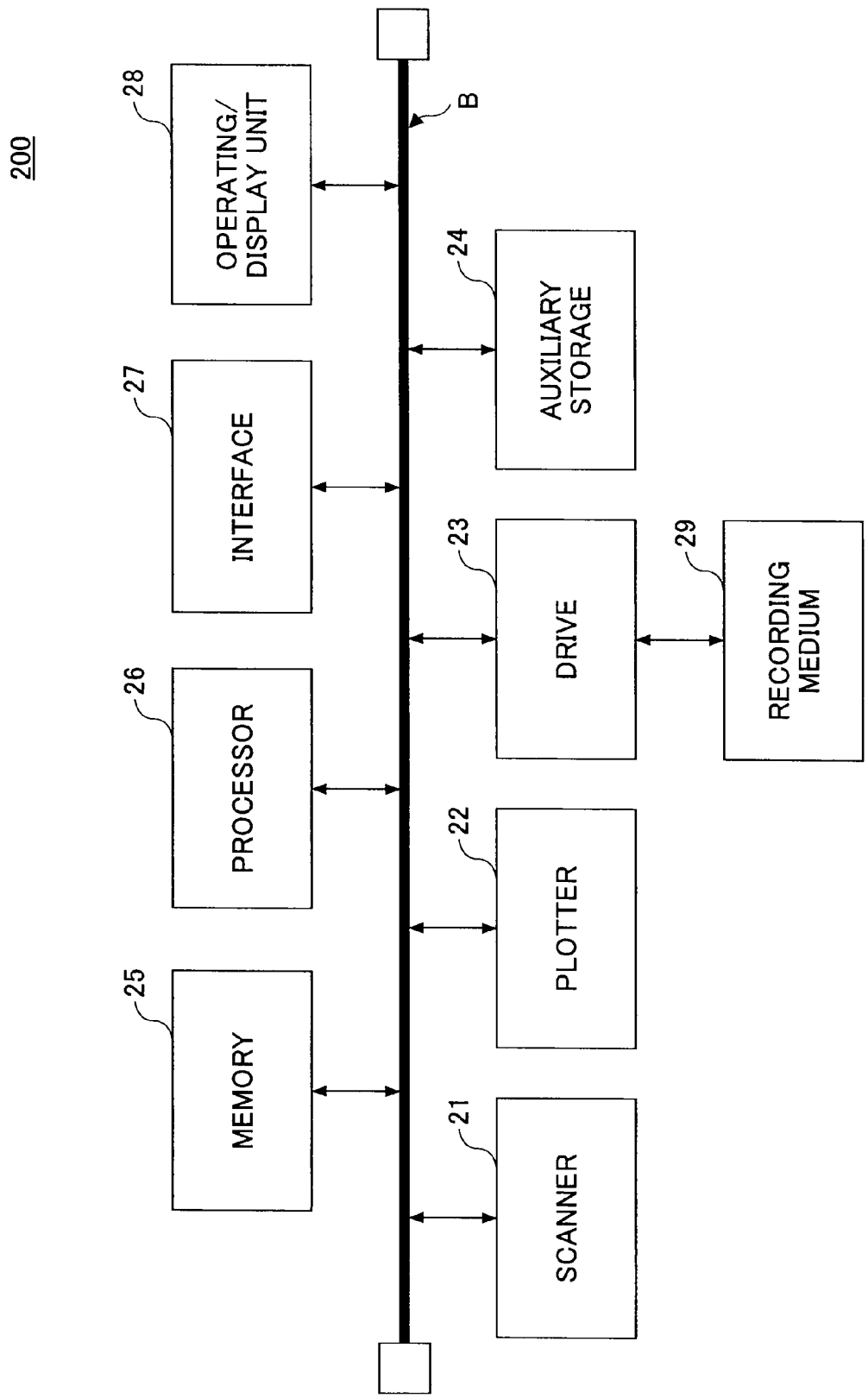
FIG. 2 shows a hardware structure of an MFP 200 in the image forming apparatus managing system 100.

FIG. 2 shows a block diagram of a hardware configuration of the MFP 200. The MFP 200 includes a scan unit 21, a plotter unit 22, a drive unit 23, an auxiliary storage unit 24, a memory unit 25, a processor unit 26, an interface unit 27, and an operating/display unit 28, which are all connected via a bus B.

The scan unit 21, which may include a scanner engine and an engine control unit for controlling the scanner engine, is used for obtaining image data from a paper manuscript or the like. The image data is outputted by the plotter unit 22, which may include a plotter engine and an engine control unit for controlling the plotter engine. The interface unit 27 may include a modem and a LAN (local area network) card and is used for providing connection with the network 600. Specifically, the interface unit 27 enables the MFP 200 to exchange information with other devices on the network 600. The operating/display unit 28 may include a touch panel that displays operating keys for the MFP 200 or the status of progress of a process.

The MFP 200 is controlled by various programs of which one is an image forming program which may be either stored in a recording medium 29 for distribution, or downloaded via the network 600. The recording medium 29 with the image forming program may include various recording media that record information optically, electrically, and/or magnetically. Examples are a CD-ROM (compact disc read-only memory), a flexible disc, a magneto-optical disc, a ROM, and a flash memory.

The image forming program may be installed in the auxiliary storage unit 24 by setting the recording medium 29 on the drive unit 23. The image forming program may also be downloaded via the network 600 and then installed in the auxiliary storage unit 24 via the interface unit 27. The MFP 200 loads the installed image forming program and other necessary files or data and the like. Upon starting up of the image forming apparatus, the memory unit 25 reads the image forming program from the auxiliary storage unit 24 and loads it. The processor unit 26 realizes various processes as described below, in accordance with the image forming program stored in the memory unit 25.

Figure 3:
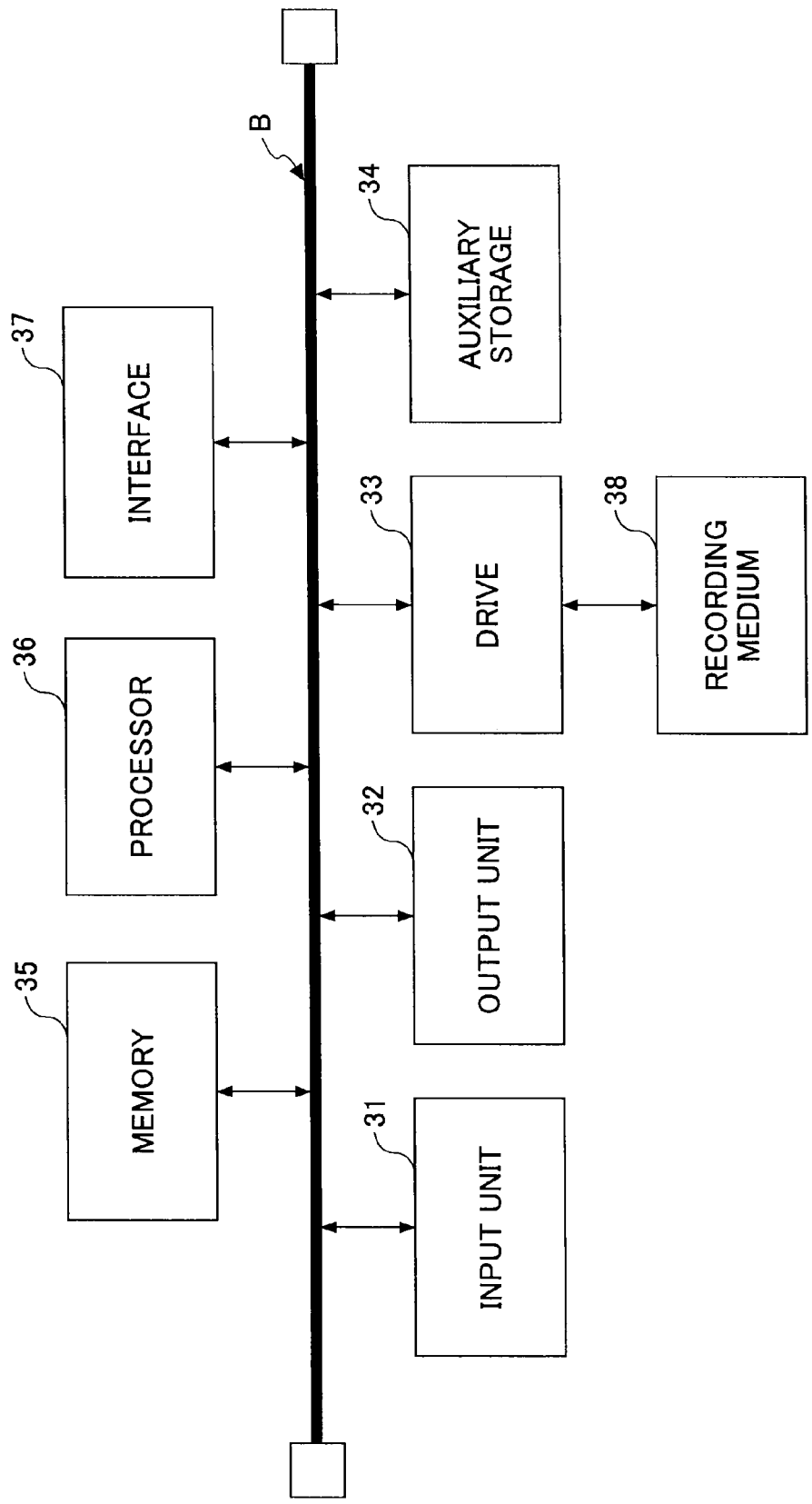
FIG. 3 shows a hardware structure of a managing server 300 in the image forming apparatus managing system 100.

FIG. 3 shows a block diagram of a hardware configuration of the managing server 300. The managing server 300 includes an input device 31, an output device 32, a drive unit 33, an auxiliary storage unit 34, a memory unit 35, a processor unit 36, and an interface unit 37, which are mutually connected via a bus B. The input device 31, which may include a keyboard and mouse, is used for inputting various signals. The output device 32 may include a display unit for displaying various windows and data. The interface unit 37 may include a modem or a LAN card and is used for connection with the network 600. Specifically, the managing server 300 exchange information with other devices on the network 600 via the interface unit 37.

The managing server 300 is controlled by various programs of which one is a managing program which may be either stored in a recording medium 38 for distribution or downloaded via the network 600. The recording medium 38 in which the managing program is recorded may record information optically, electrically, and/or magnetically. Examples of the recording medium are a CD-ROM, a flexible disc, a magneto-optical disc, and various semiconductor memories that record information electrically, such as a ROM and a flash memory.

The managing program may be installed in the auxiliary storage unit 34 by setting the recording medium 38 on the drive unit 33. Alternatively, the managing program may be downloaded via the network 600 and then installed in the auxiliary storage unit 34 via the interface unit 37. The managing server 300 loads the installed managing program and other necessary files and data and the like. Upon starting up of the image forming apparatus, the memory unit 35 reads the managing program from the auxiliary storage unit 34 and loads it. The processor unit 36 realizes various processes as described below in accordance with the managing program stored in the memory unit 35.

Embodiment 1

Figure 4:
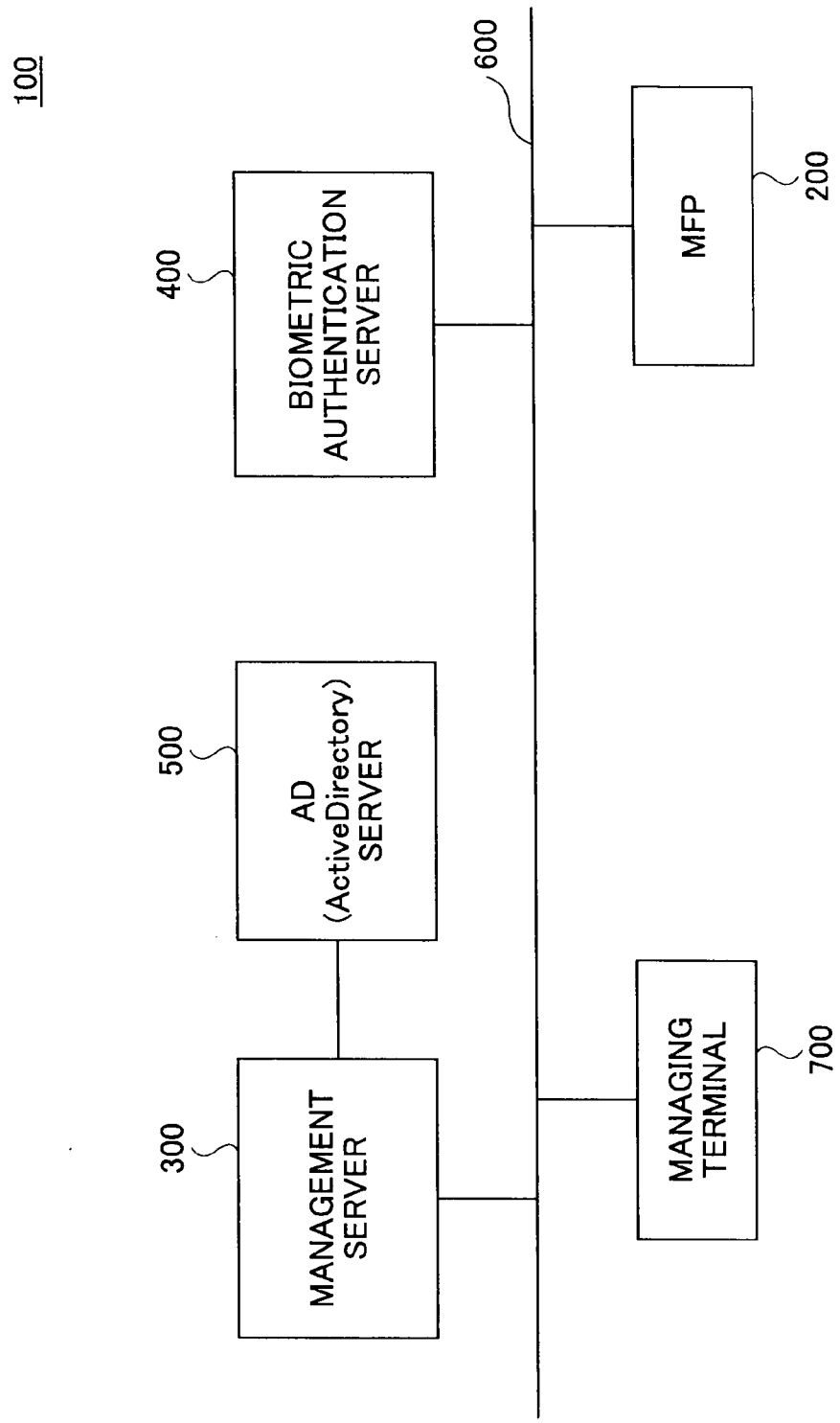
FIG. 4 shows a system configuration of the image forming apparatus managing system 100 according to Embodiment 1.

Hereafter, the image forming apparatus managing system 100 according to Embodiment 1 of the present invention is described with reference to the drawings. In this embodiment, information used for user authentication is selectable in the image forming apparatus managing system 100. FIG. 4 shows a system configuration of the image forming apparatus managing system 100 according to Embodiment 1.

The image forming apparatus managing system 100 includes an MFP 200, a managing server 300, a biometric authentication server 400, an AD server 500, and a managing terminal 700, which are connected via a network 600.

In accordance with the present embodiment, when user authentication by biometric information is selected, user authentication is performed by the biometric authentication server 400. When user authentication by IC card identifying information is selected, user authentication is performed by the managing server 300 and the AD server 500. In accordance with the present embodiment, the biometric information may be based on vein recognition. Biometric information is not limited to vein recognition and may include fingerprints in other embodiments of the present invention.

Figure 5:
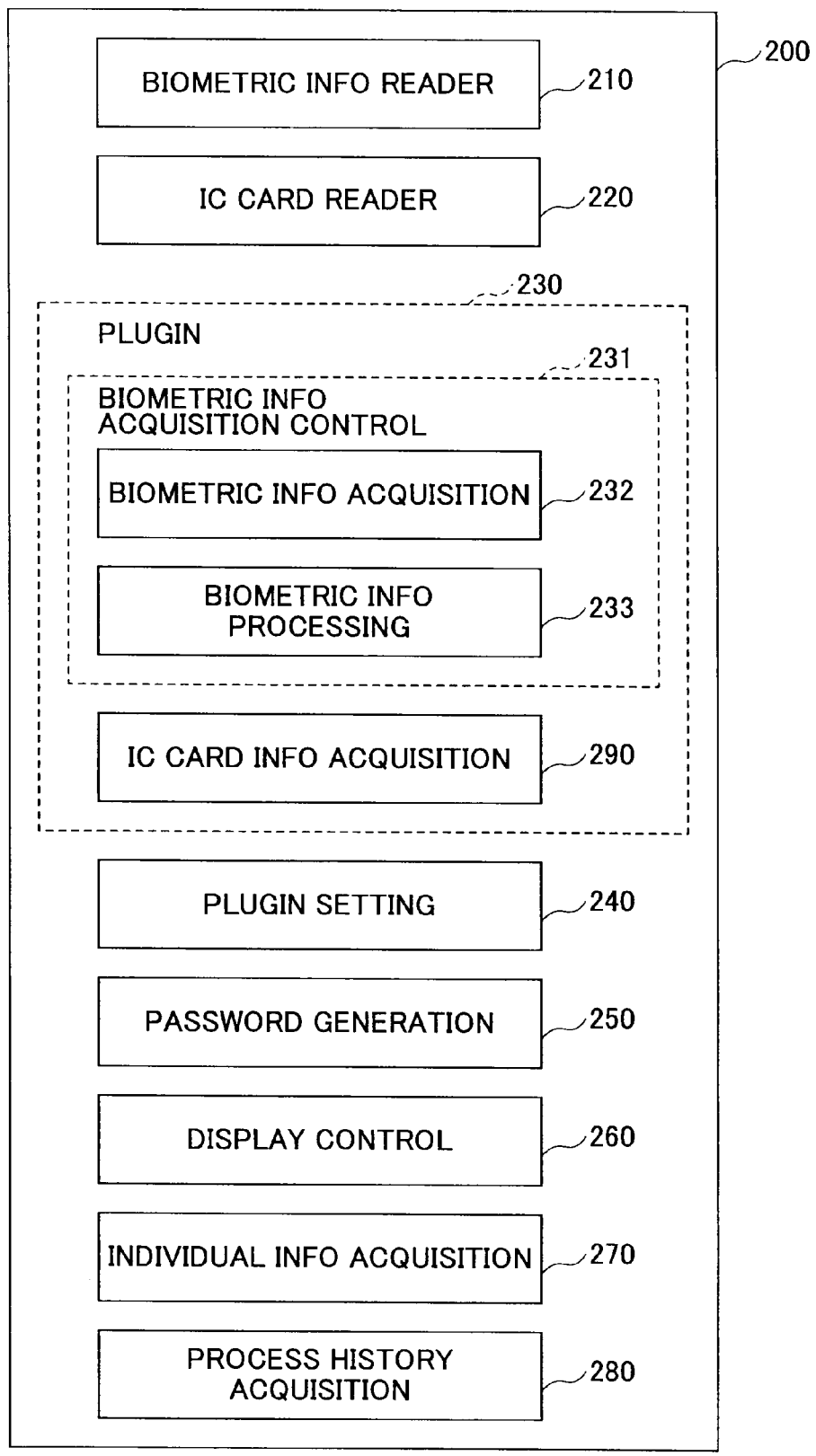
FIG. 5 shows a functional configuration of the MFP 200 according to Embodiment 1.

FIG. 5 shows a functional configuration of the MFP 200. The MFP 200 includes, in addition to the hardware units shown in FIG. 2, a biometric information reader 210 and an IC card reader 220. The biometric information reader 210 and the IC card reader 220 are controlled by the processor unit 26. The biometric information reader 210 may comprise a finger vein imaging unit for taking an image of the veins in a user's finger. The IC card reader 220 may comprise a contactless IC card reader.

The MFP 200 further includes a plug-in unit 230, a plugin setting unit 240, a password generating unit 250, a display control unit 260, an individual information acquiring unit 270, and a process history acquiring unit 280.

The plug-in unit 230 is a program stored in the auxiliary storage unit 24 that is read and executed by the processor unit 26. The plug-in unit 230 includes a plugin 231 having a biometric information acquisition control function for controlling a process relating to the acquisition of biometric information. The plug-in unit 230 also includes a plugin 290 having an IC card information acquiring function for controlling the acquisition of information from an IC card. The plugins 231 and 290 may be recorded in the recording medium 29, or may be downloaded via the network 600. The plugins 231 and 290 acquired from the recording medium 29 or downloaded are then stored in the auxiliary storage unit 24. The plugins 231 and 290 may be mutually independently installed or uninstalled to or from the MFP 200.

The plugin 231 includes a biometric information acquiring unit 232 for acquiring biometric information obtained by the biometric information reader 210; and a biometric information processing unit 233 for rendering the biometric information into data that can be handled by the MFP 200. The plugin 290 is configured to acquire the IC card identifying information read by the IC card reader 220.

The plugin setting unit 240 sets a plugin that is started in the plug-in unit 230. In the MFP 200 of the present embodiment, the setting of the plugin that is started using the plugin setting unit 240 allows for the selection of biometric information or IC card identifying information for user authentication.

The password generating unit 250 generates a password based on the IC card identifying information, in accordance with a particular algorithm. The password once generated by the password generating unit 250 is stored in the auxiliary storage unit 24 as individual information, as will be described later. The display control unit 260 controls the display on the operating/display unit 28 of the MFP 200.

The individual information acquiring unit 270 acquires the individual information based on the use limit information as described later. The individual information, which is information each user can individually use on the MFP 200, may be stored in the auxiliary storage unit 24 in advance. The individual information may include the individual user's setting information and address book, and image data or electronic documents that have been or are to be processed in the MFP 200. The individual information is associated with the user ID, as will be described later, and is read upon selection of an "individual menu" in the MFP 200. In the MFP 200, when the individual menu is selected and the individual information is read, the processor unit 28 executes a process in the MFP 200 based on the individual information.

The process history acquiring unit 280 acquires a history of processes executed in the MFP 200. The acquired history information may be stored in the auxiliary storage unit 24, or transmitted to a history managing apparatus (not shown) or the like via the network 600. The process history may be stored in association with the user ID and the type of process so that the history of executed processes can be retrieved by referring to the user ID or the type of process. A result of such retrieval may be displayed on the operating/display unit 28 for the user.

Figure 6:
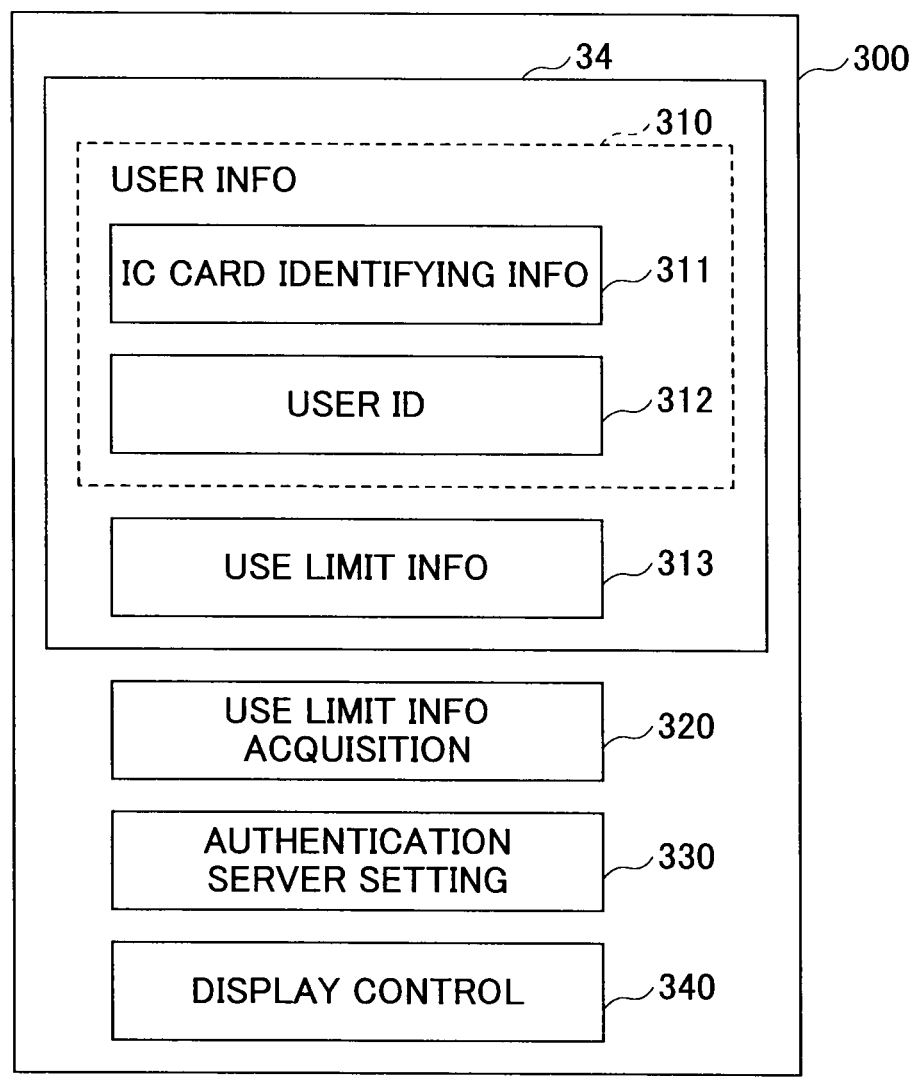
FIG. 6 shows a functional configuration of the managing server 300 according to Embodiment 1.

Hereafter, the managing server 300 according to the present embodiment is described with reference to FIG. 6, showing a functional configuration of the managing server 300 according to Embodiment 1. In the managing server 300, user information 310 and use limit information 313 for each individual user are stored in the auxiliary storage unit 34 in advance. The user information 310 includes IC card identifying information 311 and a user ID 312. The IC card identifying information 311 is the same as the IC card identifying information recorded in the IC card reader 220, and is stored in advance. The user ID 312 is user identifying information corresponding to the IC card identifying information 311, and is read based on the IC card identifying information 311.

The use limit information 313 includes information indicating one or more functions that a corresponding user can use in the MFP 200 and setting conditions. The use limit information 313 is associated with the user ID 312. For example, the use limit information 313 indicates whether the scan function, the FAX function, the monochrome print function, and/or the color print function of the MFP 200 may be used. In the MFP 200 according to the present embodiment, the use limit information 313 may indicate that a user A is allowed to use the scan function, the FAX function, the monochrome print function, and the color print function while a user B is allowed to use only the scan function and the print function.

The use limit information acquiring unit 320 acquires the use limit information associated with the user ID 312 from the auxiliary storage unit 34. The authentication server setting unit 330 sets an authentication server used for user authentication. In accordance with the present embodiment, the authentication server set by the authentication server setting unit 330 is either the biometric authentication server 400 or the AD server 500. The display control unit 340 controls the display on a display unit such as the output device 32 of the managing server 300.

The biometric authentication server 400 performs user authentication based on biometric authentication. In the biometric authentication server 400, there is stored biometric information associated with individual users, and user IDs associated with the individual biometric information. The AD server 500 performs user authentication based on the user ID. In the AD server 500, the user IDs are stored in advance.

The managing terminal 700 is a terminal for managing the image forming apparatus managing system 100. The managing terminal 700 may be used to modify a setting in the MFP 200 or the managing server 300, or register information therein. Although the present embodiment employs the single managing terminal 700, the managing terminal 700 may be allocated to the MFP 200 and the managing server 300 individually.

The biometric authentication server 400, the AD server 500, and the managing terminal 700 may each have a similar hardware configuration to that of the managing server 300. Namely, the biometric authentication server 400, the AD server 500, and the managing terminal 700 may be each provided by a general computer having a processor unit, an auxiliary storage unit, a memory unit, and an output device (such as a display unit).

Hereafter, an operation of the image forming apparatus managing system 100 according to the present embodiment is described. In the present embodiment, user authentication by biometric information can be performed by setting an appropriate plugin that is started in the MFP 200, and setting the authentication server used for user authentication. In the following, the setting of the plugin and the authentication server is described.

Figure 7:
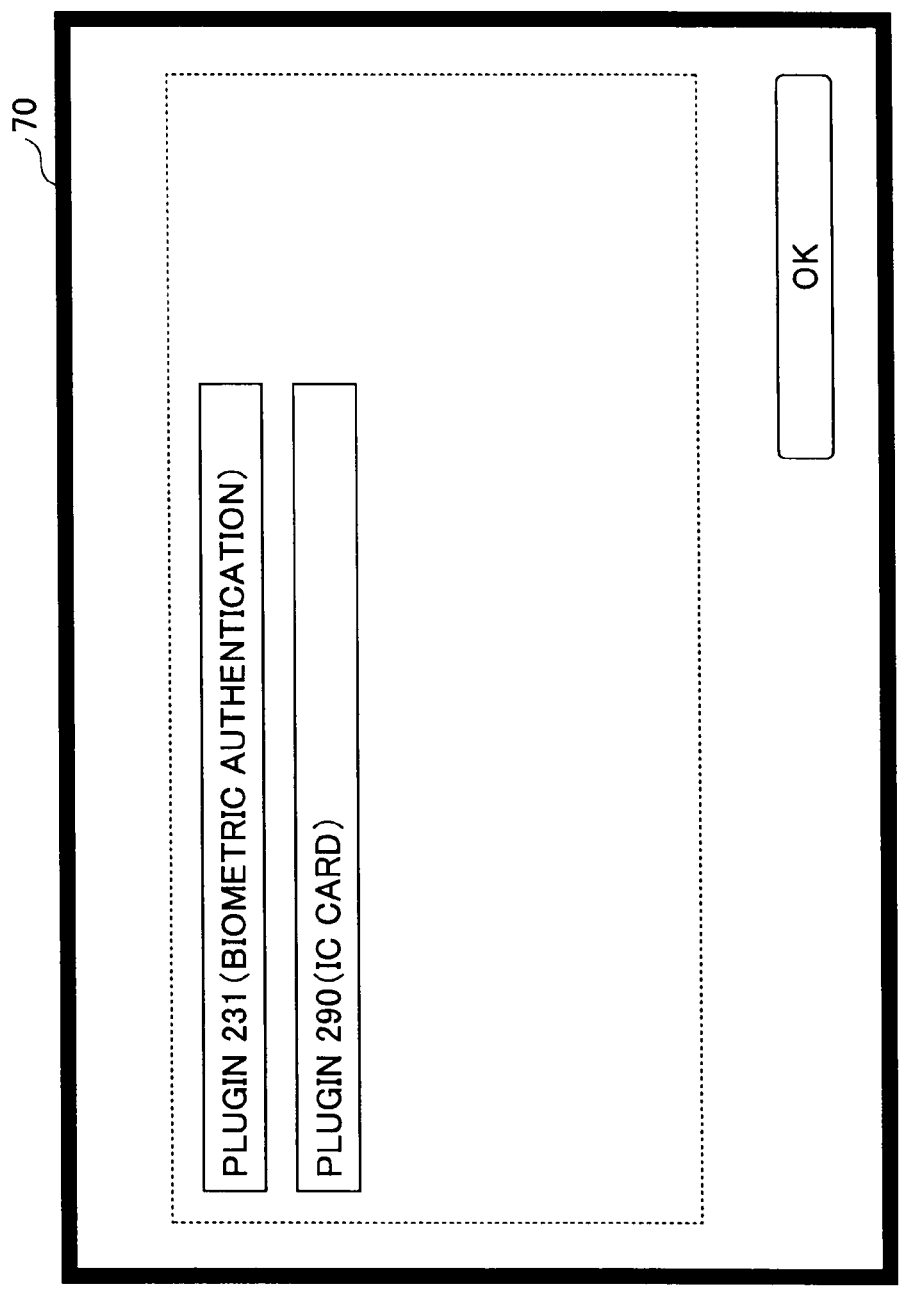
FIG. 7 shows a plugin setting screen according to Embodiment 1.

FIG. 7 shows a plugin setting screen 70 according to Embodiment 1. The plugin setting screen 70 is displayed on the operating/display unit 28 by the display control unit 260 in the MFP 200 in response to a plugin setting instruction. In the plugin setting screen 70, there is displayed a list of plugins that can be started in the MFP 200. The plugin selected on the plugin setting screen 70 is set by the plugin setting unit 240 as the plugin to be started. Alternatively, the plugin setting screen 70 may be displayed on a display unit of the managing terminal 700. When the plugin is selected on the managing terminal 700, the plugin setting unit 240 may acquire plugin setting information from the managing terminal 700 and set the selected plugin as the plugin that is started.

Figure 8:
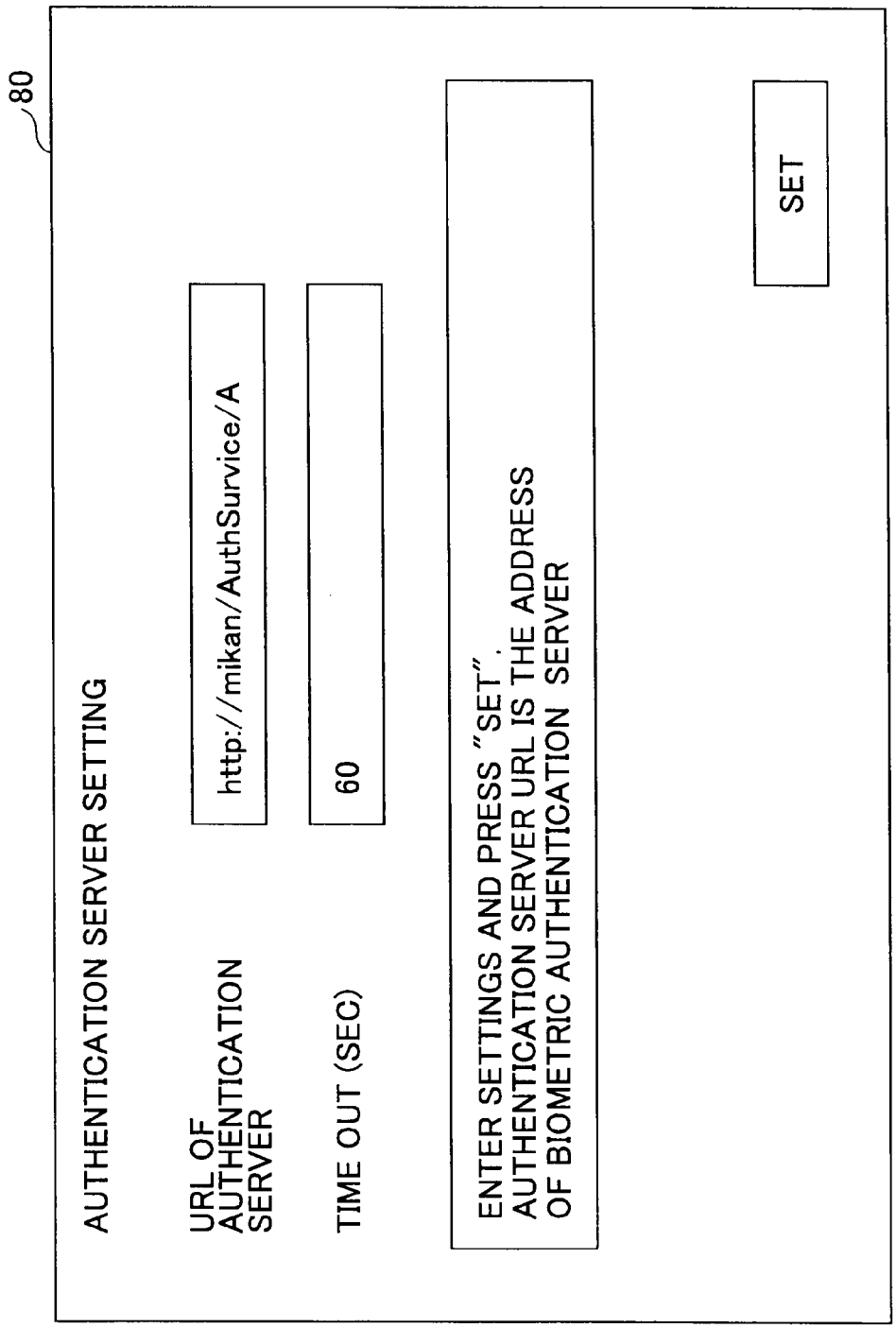
FIG. 8 shows an authentication server setting screen in the managing server 300.

FIG. 8 shows an example of an authentication server setting screen in the managing server 300 according to the present embodiment. The managing server 300 acquires authentication server setting information, and sets an authentication server using the authentication server setting unit 330. The managing server 300, in response to an authentication server setting instruction, instructs the display control unit 340 to display an authentication server setting screen 80 on the display unit 32.

In the authentication server setting screen 80, settings concerning the URL (Uniform Resource Locator) of the authentication server on the network 600, or other settings unique to the individual authentication server are made. The authentication server setting screen 80 shown in FIG. 8 is adapted for the setting of the biometric authentication server 400. For example, in the authentication server setting screen 80, the URL of the biometric authentication server 400 and a timeout period for acquiring biometric information are set.

The authentication server setting unit 330 acquires the setting information generated on the authentication server setting screen 80 and sets the authentication server. Alternatively, the authentication server setting screen 80 may be displayed on the display unit of the managing terminal 700. When the authentication server is set via the managing terminal 700, the authentication server setting unit 330 acquires the setting information from the managing terminal 700 and sets the authentication server.

Hereafter, a description is given of a user authentication process in the image forming apparatus managing system 100 according to the present embodiment. First, user authentication based on biometric information (hereafter referred to as "biometric authentication") is described. In this case, in the MFP 200, the plugin 231 is set as the plugin to be started for realizing the biometric information acquisition control function, and the biometric authentication server 400 is set as the authentication server.

Figure 9:
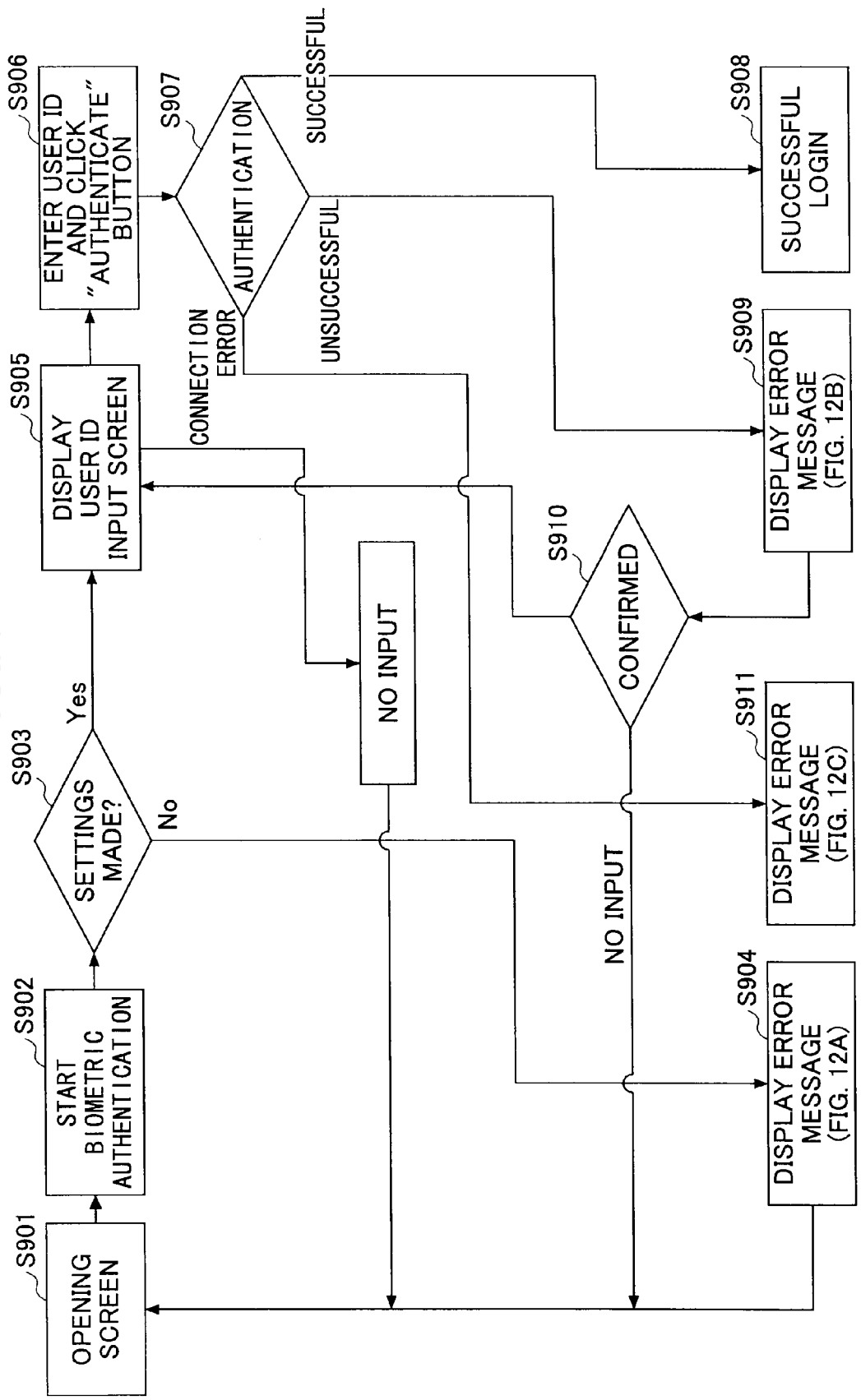
FIG. 9 shows a flowchart of a biometric authentication process according to Embodiment 1.
Figure 10:
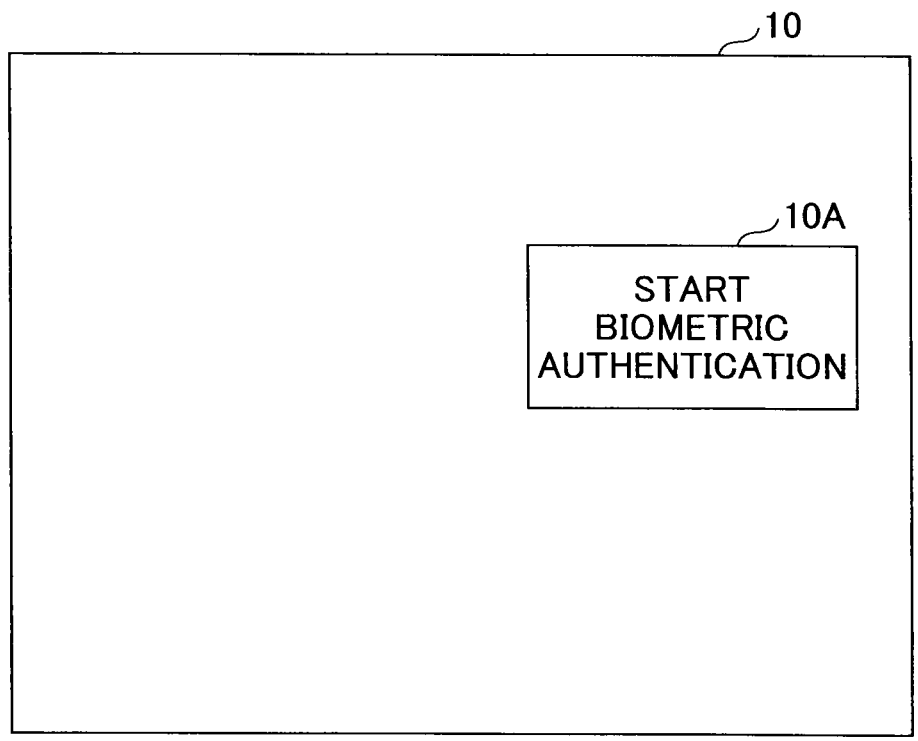
FIG. 10 shows an opening screen of the biometric authentication process.

FIG. 9 shows a flowchart of a process of biometric authentication according to Embodiment 1. In step S901, the display control unit 260 of the MFP 200 causes the operating/display unit 28 to display an opening screen 10 (see FIG. 10) which prompts the acquisition of biometric information. FIG. 10 shows an example of the opening screen, where a start button 10A for entering a biometric authentication start instruction is displayed.

Figure 12A:
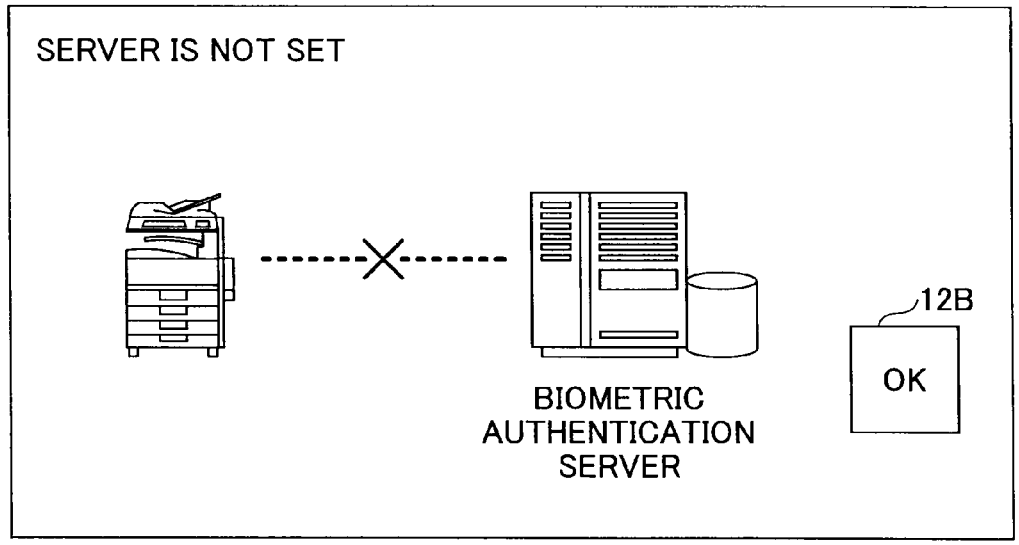
FIGS. 12A through 12C show various error messages displayed on the operating/display unit 28.
Figure 12B:
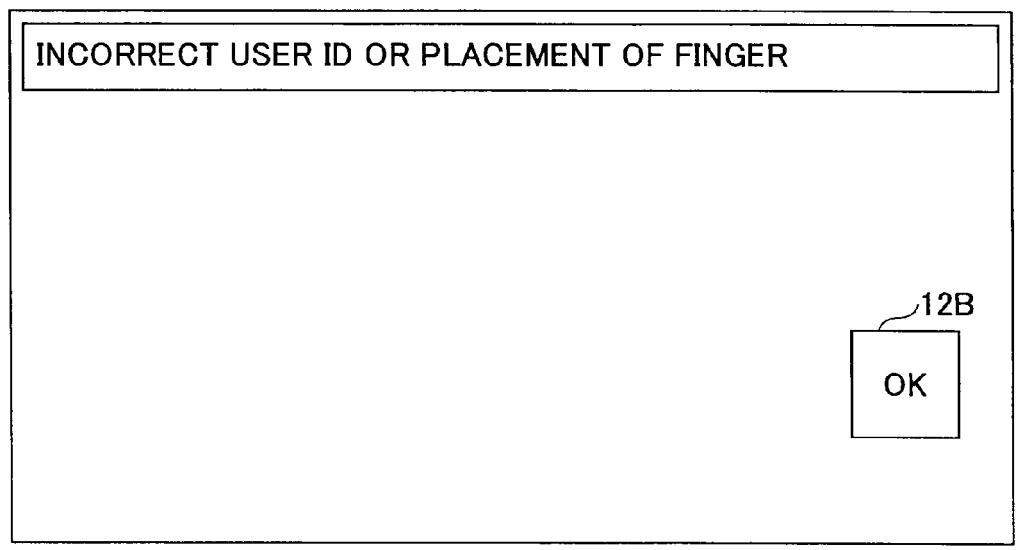
Figure 12C:
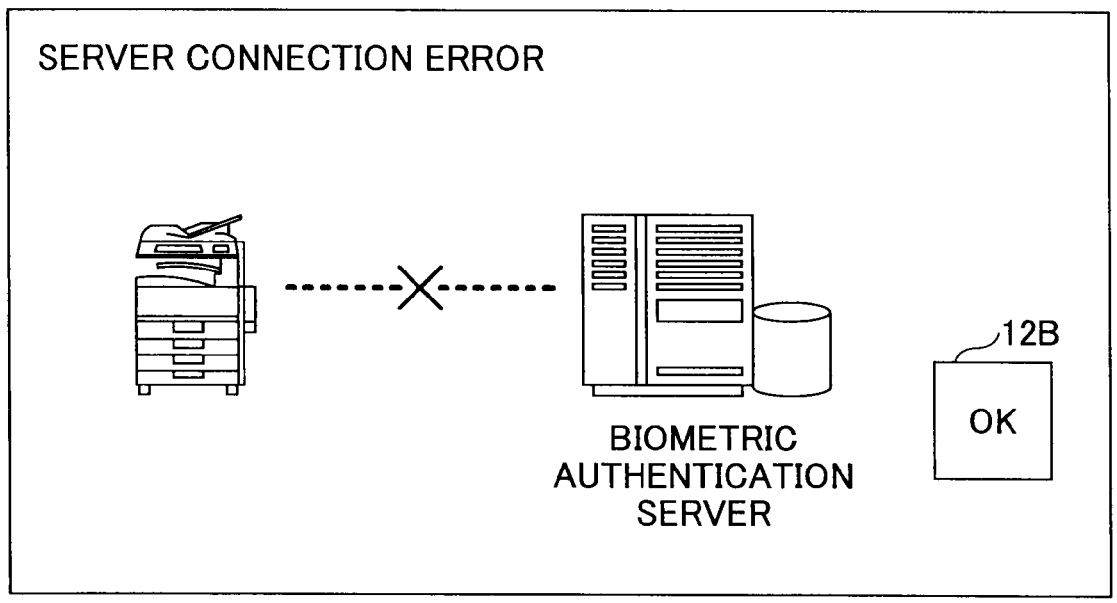

When the start button 10A is operated (or touched) on the opening screen, biometric authentication is started in step S902, where. In step S903, the managing server 300, in response to the biometric authentication start instruction, determines whether the biometric authentication server 400 is set as the authentication server. If in step S903 it is determined that the authentication server is not set, the managing server 300 notifies the MFP 200. The MFP 200 then causes the display control unit 260 to display an error message on the operating/display unit 28 in step S904, indicating that the authentication server is not set (see FIG. 12A). FIGS. 12A to 12C show examples of the error message displayed on the operating/display unit 28.

Figure 11:
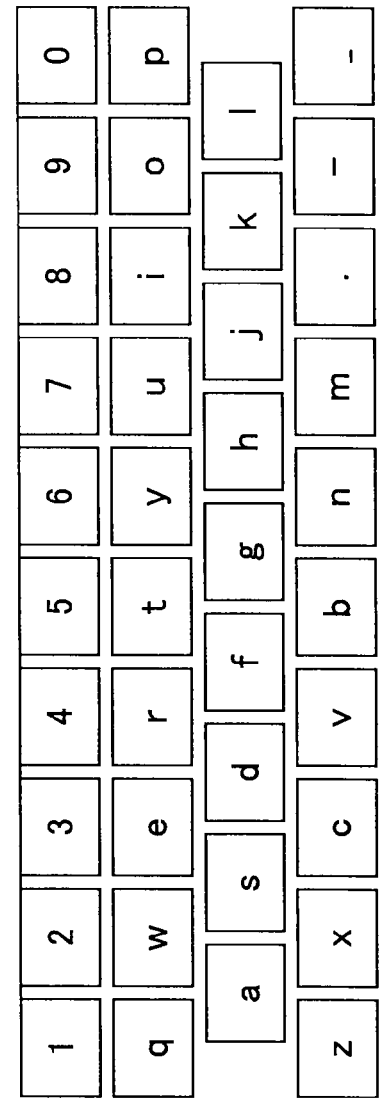
FIG. 11 shows a user ID input screen displayed on an operating/display unit 28 of the MFP 200.

Still referring to FIG. 9, if it is determined in step S903 that the biometric authentication server 400 is set, the managing server 300 notifies the MFP 200. In the MFP 200, the display control unit 260 causes the user ID input screen 11 shown in FIG. 11 to be displayed on the operating/display unit 28 in step S905. FIG. 11 shows an example of the user ID input screen displayed on the operating/display unit 28.

If there is no input in step S905 for a predetermined duration of time, the display control unit 260 causes the operating/display unit 28 to display the opening screen 10 in step S901. If the user ID is inputted in step S905, biometric information is read by the biometric information reader 210, and the authentication button 11A displayed on the user ID input screen 11 is operated in step S906. Then a biometric authentication process is performed in step S907. After the user is authenticated in step S907, the user login in the image forming apparatus managing system 100 is completed in step S908.

The biometric authentication process according to the present embodiment is described. In the present embodiment, the user ID and the biometric information acquired in step S905 by the MFP 200 are transmitted to the biometric authentication server 400. In the biometric authentication server 400, if there are a user ID and biometric information that correspond to the user ID and biometric information transmitted from the MFP 200, the user is authenticated.

In step S907, if the authentication process is unsuccessful due to an input error of the user ID or a biometric information reading error, the display control unit 260 in step S909 displays an appropriate error message on the operating/display unit 28 (see FIG. 12B). The user ID input error may be caused when a prohibited character or letter is inputted. If a confirm button 12B is operated in step S910 in response to the error message displayed in step S909, the display control unit 260 displays the user ID input screen 11 back in step S905. If no operation is entered in step S910 for a certain duration of time, the display control unit 260 displays the opening screen 10 back in step S901.

In step S907, if the authentication process cannot be performed due to a connection error between the MFP 200 and the biometric authentication server 400, the display control unit 260 in step S911 displays an appropriate error message on the operating/display unit 28 (see FIG. 12C).

Thus, in accordance with the present embodiment, user authentication is performed using biometric information. Use of biometric information prevents the risk of user impersonation and enables the maintenance of high level of security. Furthermore, use of biometric information for user authentication eliminates the need for carrying an IC card or the like for login into the image forming apparatus managing system 100, thus providing enhanced user-friendliness.

Hereafter, a description is given of a user authentication process using IC card identifying information (hereafter referred to as "IC card authentication process"). In this case, in the MFP 200, the plugin 290 that has the IC card information acquisition function is set as the plugin to be started, and the AD server 500 is set as the authentication server.

FIG. 13 shows a flowchart of the IC card authentication process according to Embodiment 1. The MFP 200 acquires the IC card identifying information 311 via the IC card reader 220, and transmits it to the managing server 300 via the interface unit 27. Upon reception of the IC card identifying information 311, the managing server 300 in step S1301 retrieves the user information 310 stored in the auxiliary storage unit 34, based on the IC card identifying information 311. The managing server 300 then determines whether there is IC card identifying information in the auxiliary storage unit 34 that corresponds to the acquired IC card identifying information. If there is the corresponding IC card identifying information in the auxiliary storage unit 34, the managing server 300 reads the user ID 312 associated with the acquired IC card identifying information. The managing server 300 then determines in step S1302 whether the AD server 500 is set for the user authentication process. If in S1302 the AD server 500 is set for user authentication, the managing server 300 in step S1303 accesses the AD server 500 and determines whether the user ID 312 that has been read exists among the user IDs retained in the AD server 500.

If the corresponding user ID exists in the AD server 500 in step S1303, the managing server 300 considers the user to have been authenticated, and login of the user is completed in step S1304. If in step S1302 user authentication based on the AD server 500 is not set, the process goes to step S1304 and the login of the user is completed. In this case, the login is complete as long as the IC card identifying information corresponding to the acquired IC card information is present in the auxiliary storage unit 34.

If in S1303 there is no user ID 312 in the AD server 500, the managing server 300 in step S1305 determines whether use of the MFP 200 should be granted to the user ID 312 based on the use limit information 313 corresponding to the relevant user ID. If in step S1305 the user ID 312 is a user ID for which use of the MFP 200 is granted, the managing server 300 considers the user to have been authenticated. If in step S1305 the user ID 312 is a user ID for which use of the MFP 200 is not granted, the managing server 300 considers the login process to have failed and ends the user authentication process in step S1306.

Thus, in accordance with the present embodiment, user authentication is performed using an IC card as described above.

Hereafter, the granting of utilization of the MFP 200 on an individual user basis after completion of the login of a user according to the present embodiment is described. In accordance with the present embodiment, after user authentication, the managing server 300 acquires the use limit information 313 corresponding to the user ID 312, using the use limit information acquiring unit 320. The use limit information 313 is then transmitted to the MFP 200. The MFP 200 then controls its operation based on the use limit information 313 so that only one or more of the functions that are allowed to be used by the authenticated user are realized.

The process for realizing only those functions that are allowed for an authenticated user is referred to as an individual menu process. The "individual menu" may refer to the individual menu process. The functions available in the individual menu may include accessing and viewing of image data or electronic documents stored in the MFP 200 on an individual user basis; using or editing of an address book for an individual user; and viewing of mail documents for an individual user. Furthermore, in the MFP 200 according to the present embodiment, when the individual menu is selected, the display on the operating/display unit 28 or settings in the MFP 200 can be customized by the individual user.

Figure 14:
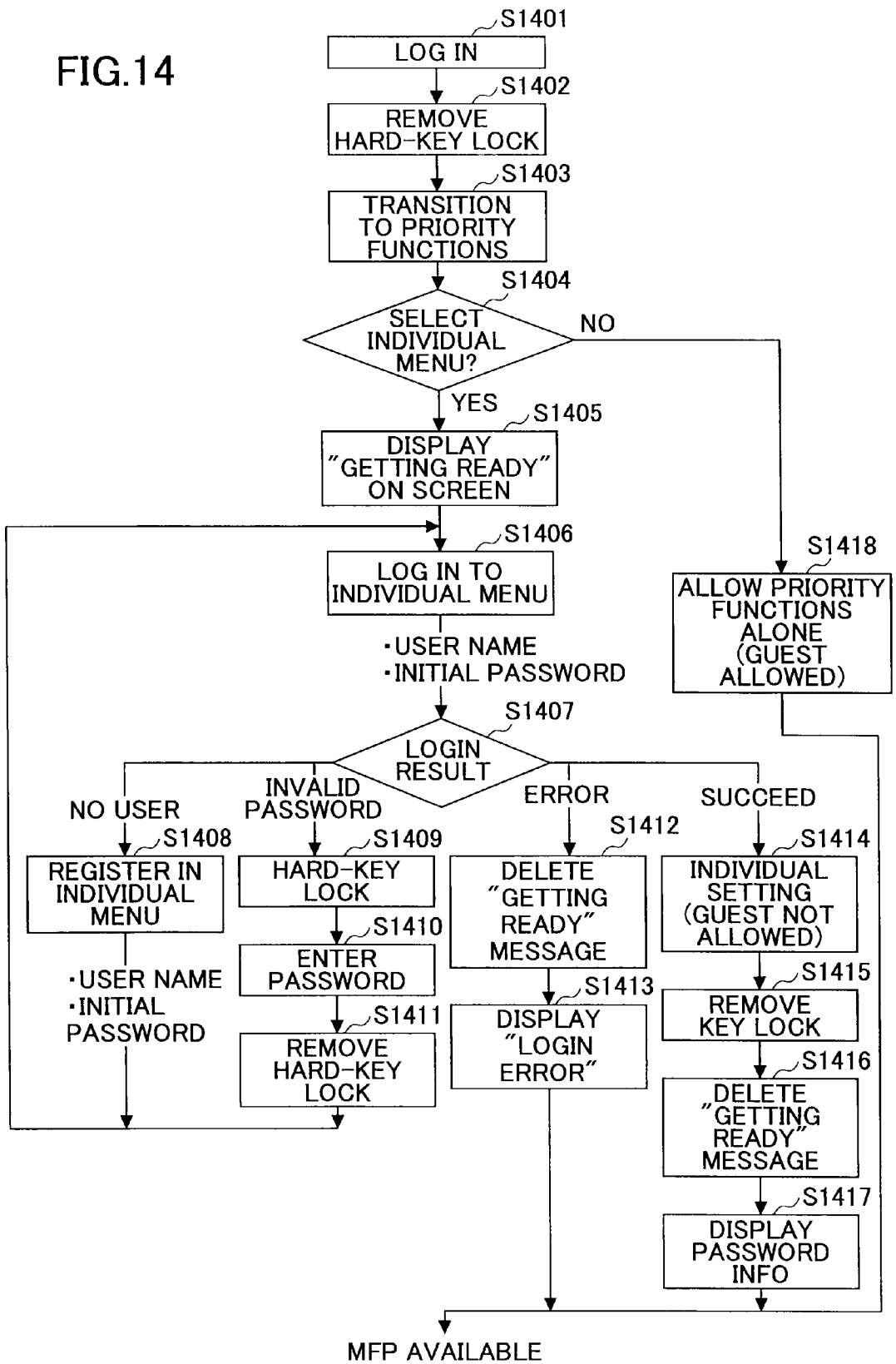
FIG. 14 shows a flowchart of an individual menu process according to Embodiment 1.
Figure 15A:
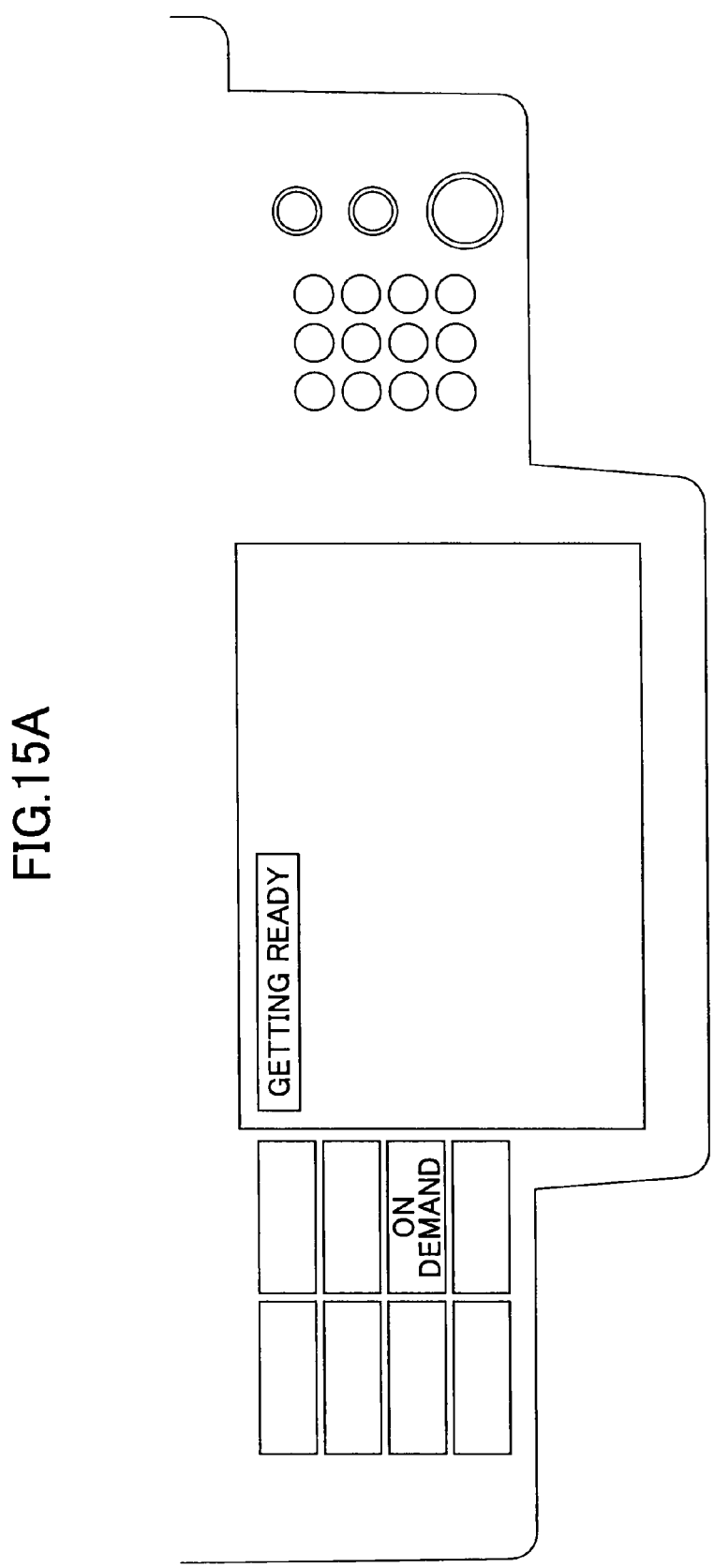
FIGS. 15A and 15B show statuses of the operating/display unit 28 upon selection of the individual menu process.
Figure 15B:
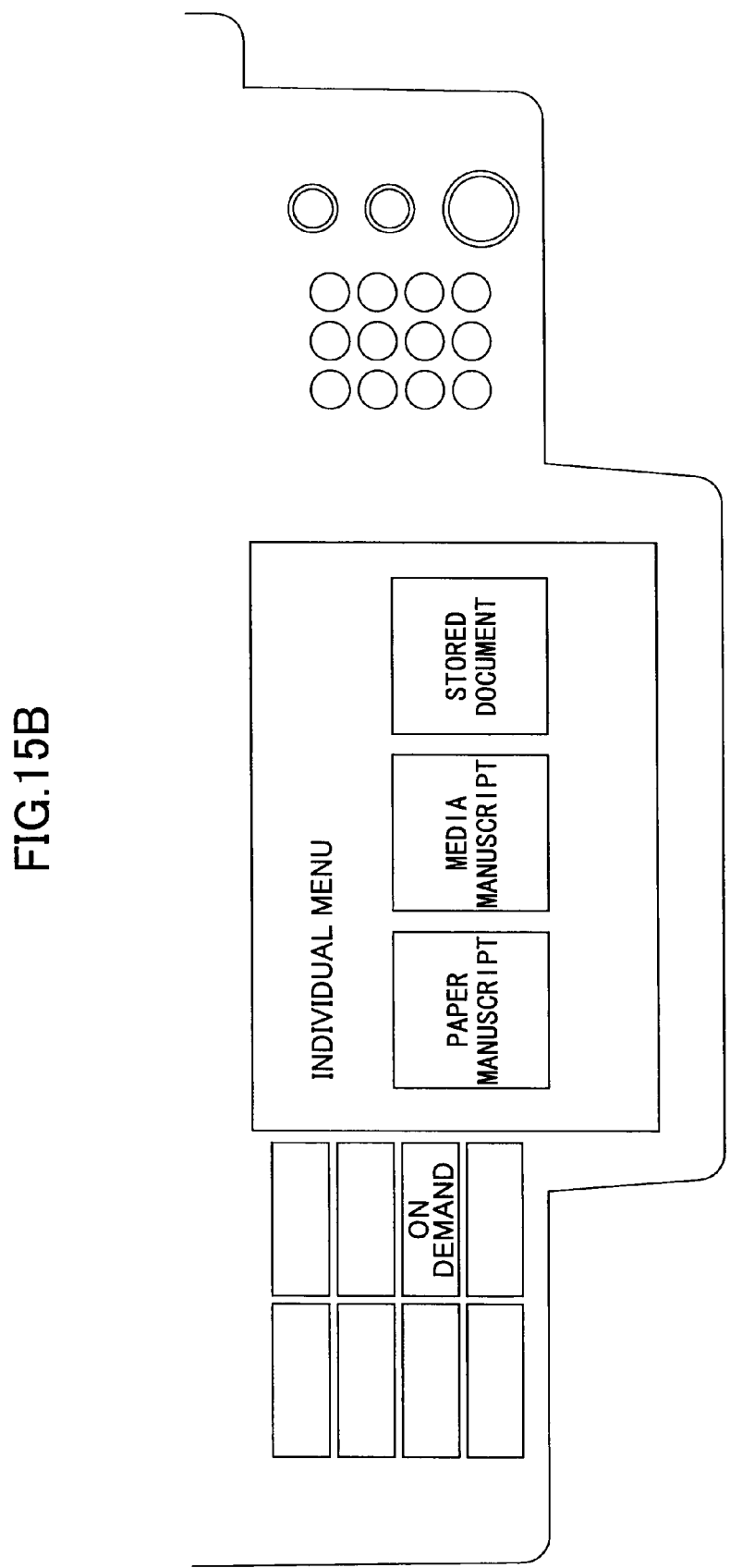

In the following, the individual menu process performed in the MFP 200 is described with reference to FIGS. 14 and 15. FIG. 14 shows a flowchart of the individual menu process. FIGS. 15A and 15B show examples of the display on the operating/display unit 28 when the individual menu process is selected. Specifically, FIG. 15A shows a status of the operating/display unit 28 before login to the individual menu, while FIG. 15B shows a status on the operating/display unit 28 after login into the individual menu.

After the login of the user is complete in step S1401, the MFP 200 in step S1402 renders operable the operating/display unit 28 that has been locked until completion of user login ("hard-key lock").

In step S1403, the MFP 200, based on the use limit information 313 transmitted from the managing server 300, transitions to a status where one or more predetermined functions (priority functions) alone can be realized. The priority functions may include a function that can be realized without using unique user information, such as the copy process.

If the MFP 200 receives an instruction for executing an individual menu process in step S1404, the process goes to step S1405 where the display control unit 260 causes the operating/display unit 28 to indicate that preparations are being made (see FIG. 15A). If there is no instruction for the individual menu process in step S1404, the MFP 200 is controlled in step S1418 so that only the priority functions determined based on the use limit information can be realized.

In step S1406, an individual menu login process is executed. In the MFP 200, a password is generated by the password generating unit 250 based on the user ID 312. The user ID 312 and the password that has been generated based on the user ID 312 at the time of the last login are stored in the auxiliary storage unit 24.

In step S1407, the MFP 200 determines whether there is a user ID and a password in the auxiliary storage unit 24 that correspond to the user ID 312 and the password generated from the user ID 312. In step S1407, if there is no corresponding user ID, the MFP 200 determines that the user ID 312 is a new user ID whose user is not registered. In step S1408, the display control unit 260 of the MFP 200 displays the user registration screen on the operating/display unit 28, and the process transitions to the user registration process. If the password is invalid in step S1407, the MFP 200 in step S1409 puts the operating/display unit 28 in the hard-key locked status. However, a print instruction can be issued for any print job that is retained within the MFP 200 at this point in time.

An invalid status of the password is recognized when, for example, the user changed his or her password (initial password) that has been generated by the password generating unit 250 upon initial login to the individual menu into a user-defined password. In such a case, the display control unit 260 displays in step S1410 a touch panel screen or the like on the operating/display unit 28, indicating that the input of the modified password is necessary. If a correct password is entered by the user in S1410, the hard-key lock status is cancelled in step S1411 in accordance with the use limit information.

If the login process produces an error in step S1407 for one reason or another, the display control unit 260 in step S1412 deletes the indication of process preparations from the operating/display unit 28. In step S1413, the display control unit 260 displays a message on the operating/display unit 28 indicating the error in the individual menu login process. Thereafter, the MFP 200 is controlled so that only the priority functions can be realized based on the use limit information 313.

In step S1407, if there are the corresponding user ID and password in the auxiliary storage unit 24, the login of the user to the individual menu is completed. This is followed by step S1414, where the individual information acquiring unit 270 acquires individual information from the auxiliary storage unit 24 that corresponds to the user ID 312. Then, settings or the like are made for the MFP 200 based on the individual information.

Following step S1414, the MFP 200 in step S1415 puts the operating/display unit 28 in a status such that operating keys used for the individual menu can be used. Then, in step S1416, the display control unit 260 deletes the indication on the operating/display unit 28 regarding the preparations being made for the execution of process. In step S1417, the display control unit 260 displays a message on the operating/display unit 28 indicating that information regarding password can be viewed. This completes the individual menu login process in the MFP 200, and thereafter the individual menu for the particular user is displayed on the operating/display unit 28 (see FIG. 15B).

The information regarding password that is displayed in step S1417 may include the initial password generated by the password generating unit 250, and a guidance for changing the initial password into a user-defined password. In accordance with the present embodiment, the screen displayed in step S1417 may transition to a password setting screen for changing the password. Alternatively, if the password has already been changed, the screen may transition to a screen that notifies the user of the initial password once again. When notifying the user of a password, the password displayed on the operating/display unit 28 may be automatically deleted after a predetermined duration of time.

Thus, in accordance with Embodiment 1 of the present invention, the user ID is managed using the managing server 300, and the available functions of the MFP 200 are limited based on the user ID. Thus, enhanced security can be obtained for the management of the individual information image held in the forming apparatus 200, enabling the maintenance of information confidentiality.

Figure 16:
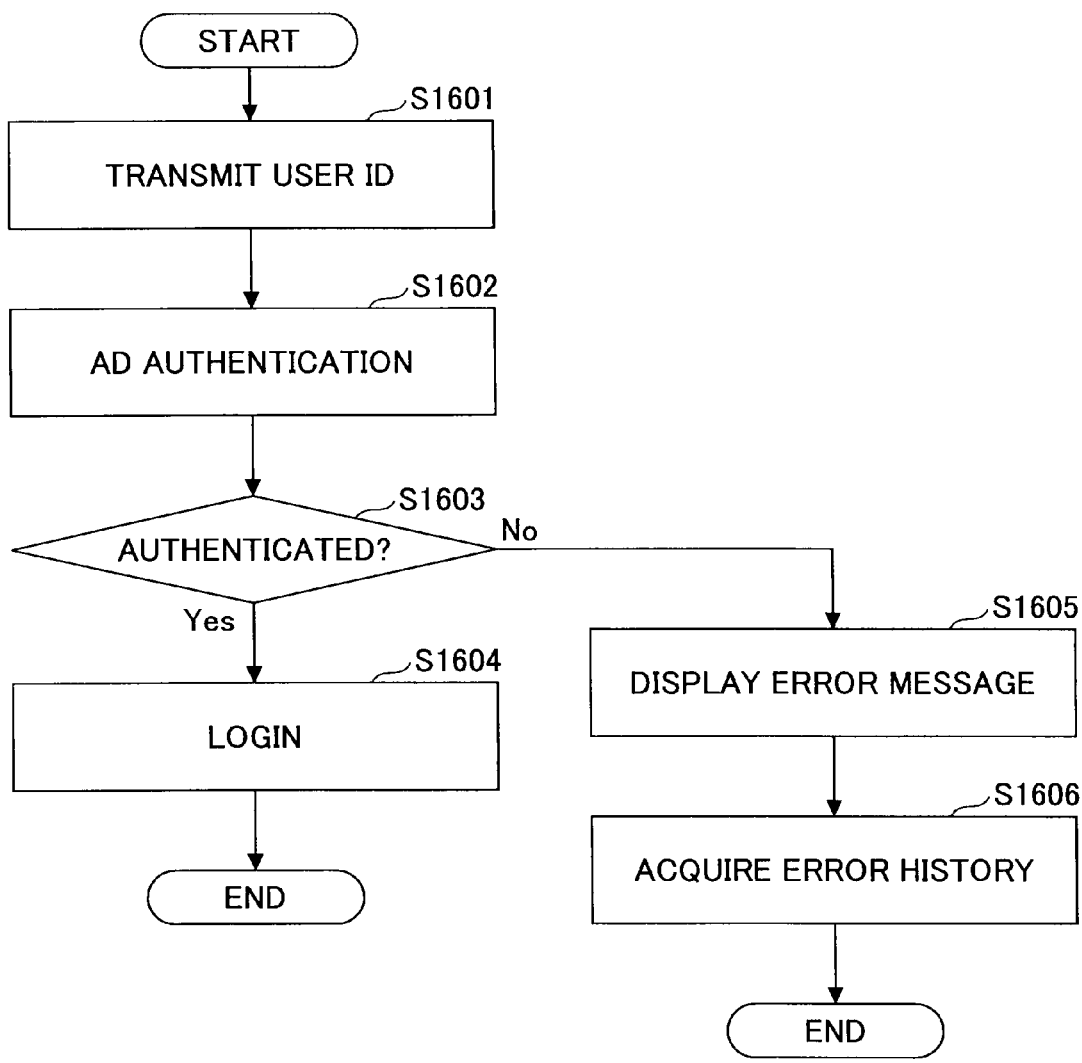
FIG. 16 shows a flowchart of a user authentication process when a biometric authentication server 400 in the image forming apparatus managing system 100 is unusable.

In accordance with the present embodiment, if the biometric authentication server 400 is unusable, for example, the AD server 500 may be directly accessed for user authentication. FIG. 16 shows a flowchart of a user authentication process that is performed when the biometric authentication server 400 is unusable. When the biometric authentication server 400 is unusable, the MFP 200 in step S1601 transmits the user ID (see step S906 in FIG. 9) entered via the operating/display unit 28 to the AD server 500. In step S1602, the AD server 500 determines whether a user ID that corresponds to the user ID that it received exists in the AD server 500. In step S1603, if there is the corresponding user ID in the AD server 500, the user is authenticated.

If in step S1603 there is no corresponding user ID, the AD server 500 in step S1605 notifies the MFP 200 of an authentication error. In the MFP 200, the control unit 260 displays an authentication error message on the operating/display unit 28. In step S1606, in the MFP 200, the process history acquiring unit 280 acquires authentication error history information and stores it in the auxiliary storage unit 24 or the like. The authentication error history may be transmitted to the managing server 300 and stored in the auxiliary storage unit 34 therein.

Thus, in the present embodiment, the login process can be performed using an entered user ID even when the biometric authentication server 400 is unusable due to failure or the like, or when biometric information cannot be acquired, enabling the user to use the MFP 200 based on his or her individual use limit information.

Embodiment 2

In the following, an image forming apparatus managing system according to Embodiment 2 of the present invention is described with reference to the drawings. Embodiment 2 differs from Embodiment 1 in that improved operability is obtained when performing user authentication based on biometric information. Thus, in the following description of Embodiment 2, only the differences from Embodiment 1 are described, with the units or components having similar or corresponding functions to those of Embodiment 1 being designated by similar reference numerals and their descriptions omitted.

In accordance with the present embodiment, in a biometric authentication server, biometric information about individual users and user IDs associated with the biometric information are registered on a group by group basis in advance. Each of the groups is allocated group identifying information (referred to as a "group ID").

Figure 17:
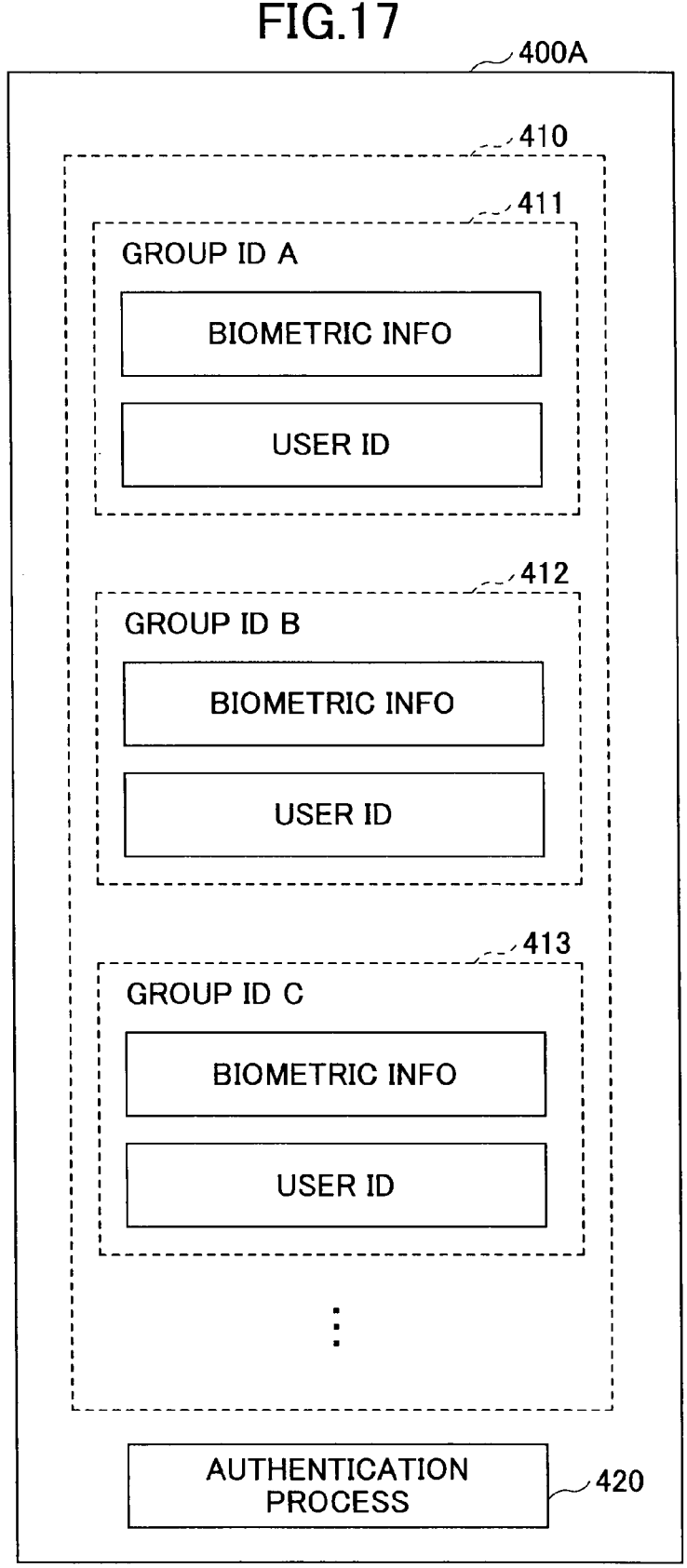
FIG. 17 shows a biometric authentication server 400A according to Embodiment 2.

Referring to FIG. 17, the biometric authentication server 400A may be realized by a general computer having a processor unit, a storage unit, and the like, which are not shown. The biometric authentication server 400A includes a database 410 in the storage unit, and an authentication processing unit 420 configured to perform an authentication process based on biometric information.

The database 410 stores authenticating information used for the authentication process, including biometric information about individual users and user IDs associated with the biometric information, on a group by group basis. Each group is given the group ID. In the example shown in FIG. 17, the database 410 includes authenticating information 411 with a group ID A; authenticating information 412 with a group ID B; and authenticating information 413 with a group ID C. Each of the groups may correspond to a department of a company or the like to which the individual users belong.

The authentication processing unit 420, in response to a biometric authentication start instruction from the MFP 200A, executes the authentication process, as described in detail below.

Figure 18:
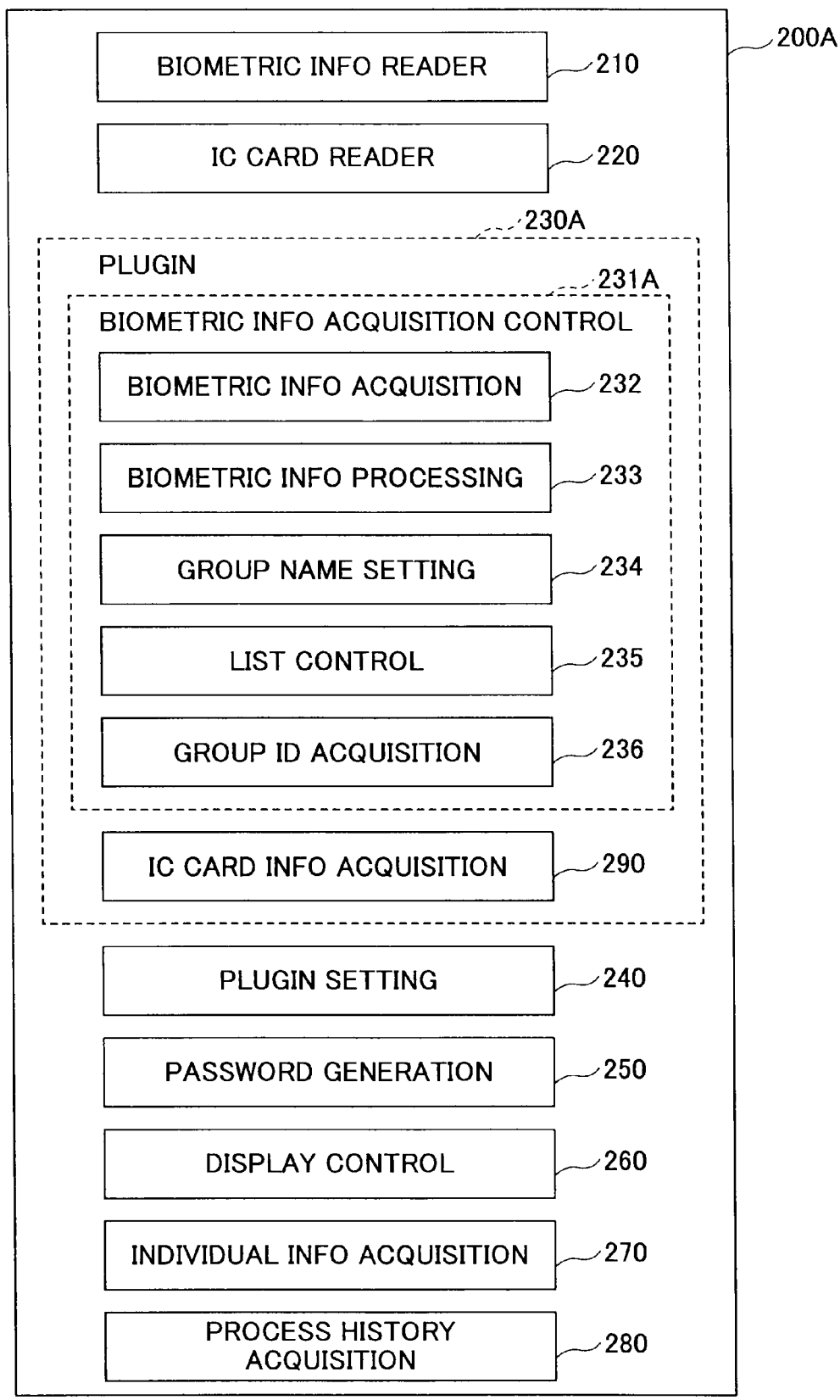
FIG. 18 shows a functional configuration of an MFP 200A according to Embodiment 2.

Referring to FIG. 18, the MFP 200A is described. FIG. 18 shows a functional configuration of the MFP 200A according to Embodiment 2. The MFP 200A includes a plug-in unit 230A. The plug-in unit 230A has a plugin 231A for realizing a biometric information acquiring function. The plugin 231A includes a biometric information acquiring unit 232, a biometric information processing unit 233, a group name setting unit 234, a list control unit 235, and a group ID acquiring unit 236.

Figure 19:
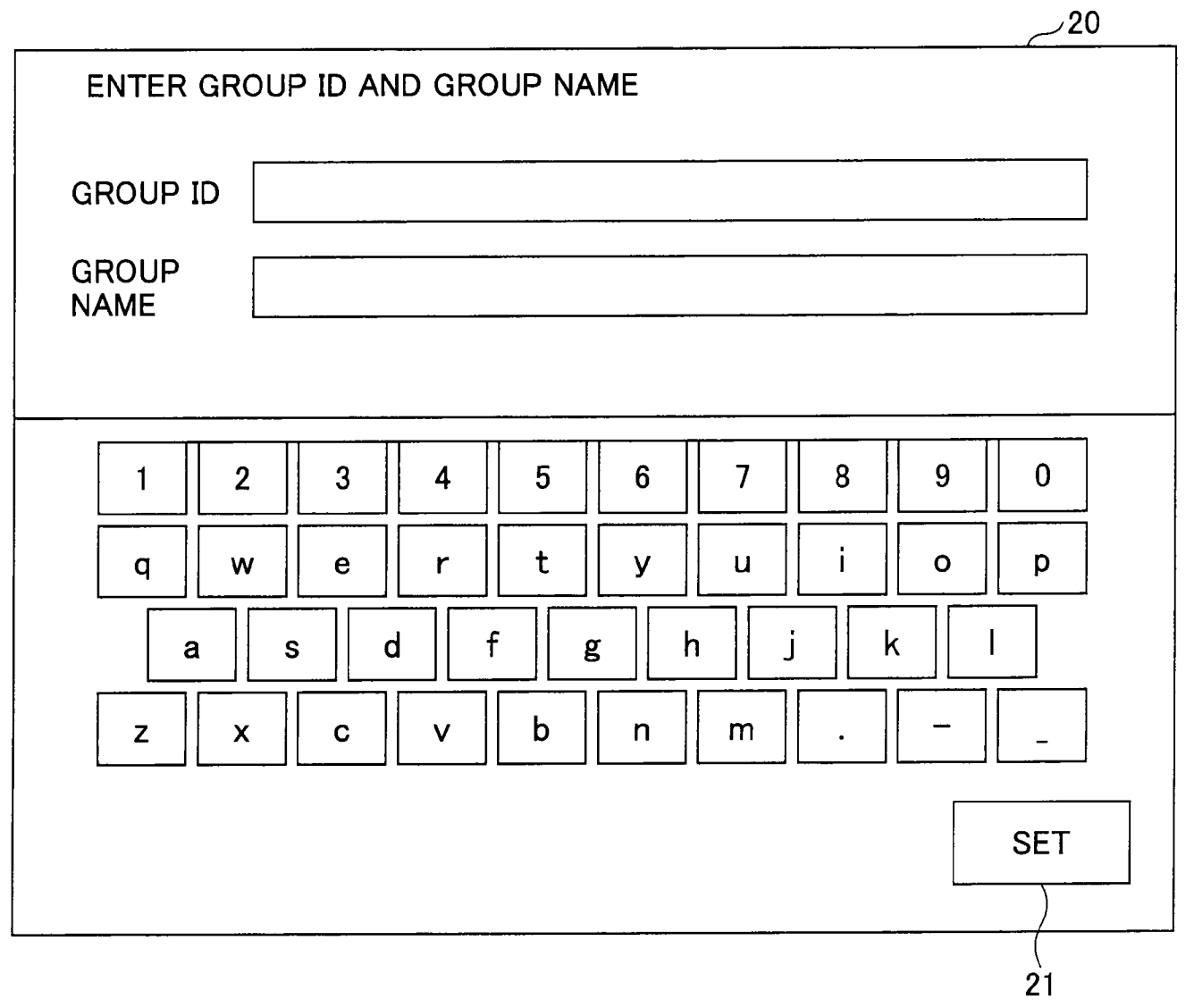

The group name setting unit 234 of the plugin 231A is configured to associate a group ID stored in the biometric authentication server 400A with a group name in a list box L10 (see FIG. 20) that is displayed on the operating/display unit 28 of the MFP 200A. The group name setting unit 234 causes the display control unit 260 to display a screen 20 shown in FIG. 19 to be displayed on the operating/display unit 28. FIG. 19 is an example of the screen displayed on the operating/display unit 28. In this example, a software keyboard is displayed. Using this software keyboard, a system administrator, for example, sets the associations between the group IDs and the group names.

On the screen 20 shown in FIG. 19, when a group ID and a group name associated with the group ID are inputted and a setting button 21 is pressed, the association between the group ID and the group name is set by the group name setting unit 234. The group name setting unit 234 may store the association between the group ID and the group name in the auxiliary storage unit 24 of the MFP 200A.

Figure 20:
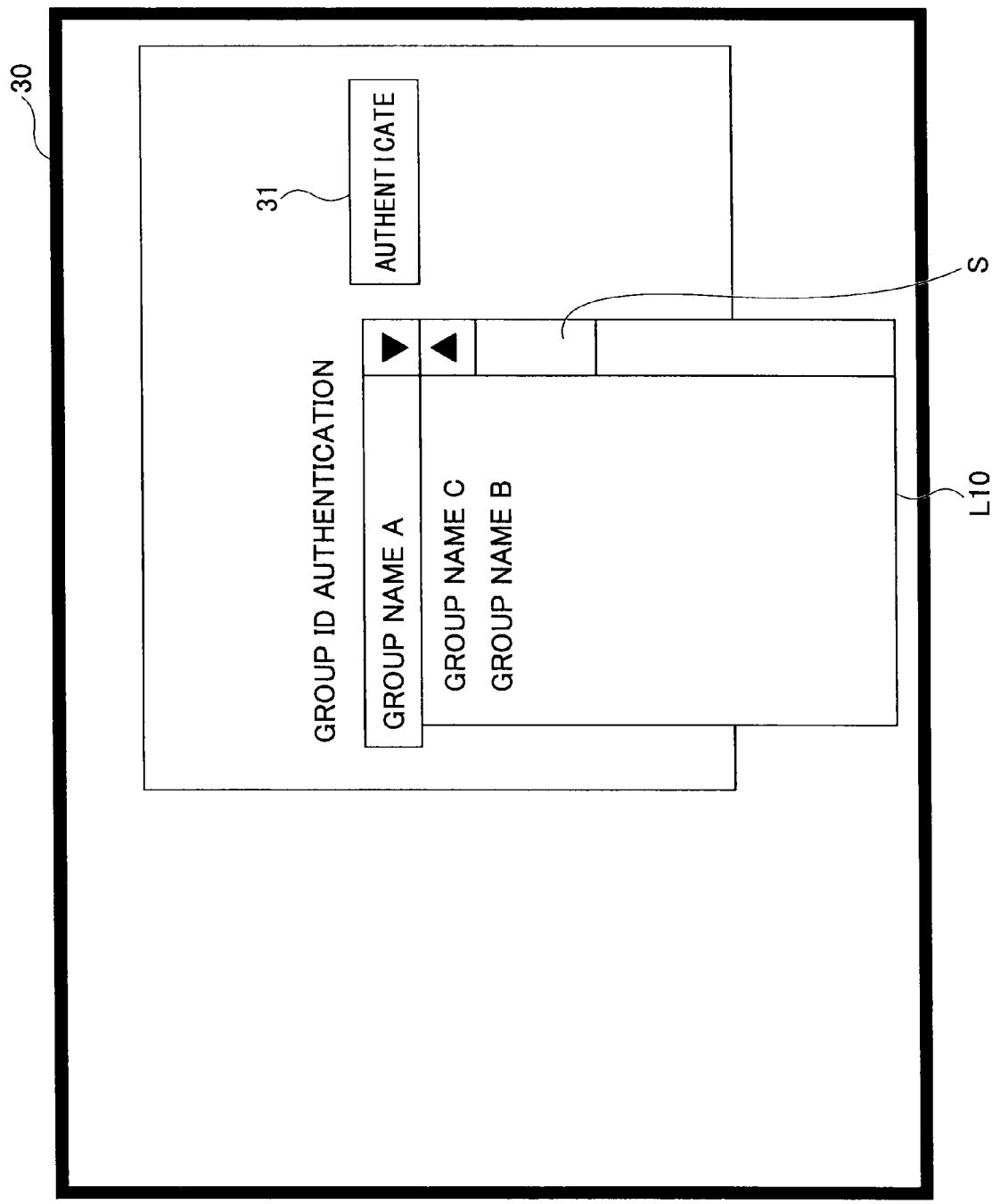
FIG. 20 shows a screen where a group name list is shown.

The list control unit 235 is configured to create a list of group names ("group name list") that have been set by the group name setting unit 234. The list created by the list control unit 235 is displayed in the list box L10 on the operating/display unit 28. FIG. 20 shows an example of the screen in which the group name list is displayed. The details of creation of the group name list by the list control unit 235 will be described later.

In the screen 30 shown in FIG. 20, the list box L10 shows all of the group names that have been set by the group name setting unit 234. In accordance with the present embodiment, a scroll bar S may be shown in the list box L10 when all of the group names set by the group name setting unit 234 cannot be shown in the list box L10. The group ID acquiring unit 236 acquires a group ID corresponding to a group name selected in the list box L10 created by the list control unit 235, from the auxiliary storage unit 24, for example, of the MFP 200A.

Figure 21:
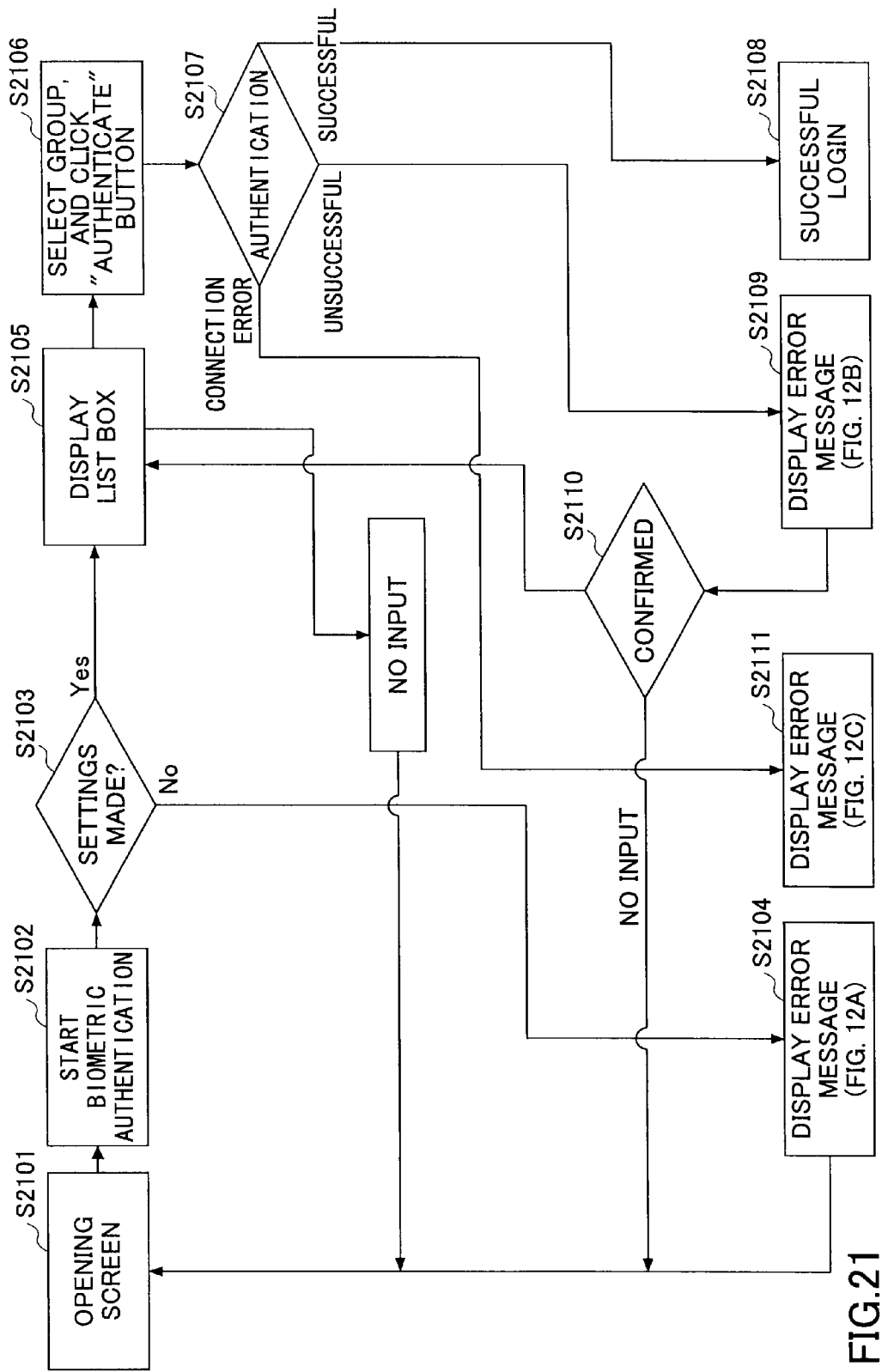
FIG. 21 shows a flowchart of a biometric authentication process according to Embodiment 2.

Hereafter, a biometric authentication process according to the present embodiment is described with reference to a flowchart shown in FIG. 21. The process between steps S2101 to S2104 in FIG. 21 is the same as the process between steps S901 and S904 shown in FIG. 9.

In step S2103, if the biometric authentication server 400A is set as the authentication server, the managing server 300 notifies the MFP 200A. The MFP 200A then causes the display control unit 260 to display the list box L10 of FIG. 20 to be displayed on the operating/display unit 28 in step S2105. In step S2106, after a group name is selected in the list box L10 and the biometric information is read, the authentication button 31 is operated (see FIG. 20). In step S2107, the biometric authentication process is performed, as described below.

Upon selection of the group name, the MFP 200A acquires a group ID corresponding to the group name selected by the group ID acquiring unit 236. The MFP 200A then transmits the acquired group ID and biometric information that is read to the biometric authentication server 400A. In the biometric authentication server 400A, the group ID and the biometric information are received and the authentication process is performed. Specifically, the biometric authentication server 400A retrieves authenticating information corresponding to the group ID received, using the authentication processing unit 420, and determines whether there is biometric information that matches the biometric information received. For example, if the biometric authentication server 400A has received the group ID A from the MFP 200A, the authentication processing unit 420 searches the authenticating information 411 corresponding to the group ID A, and determines whether there exists biometric information that matches the biometric information received. If there is the biometric information matching the biometric information received, the authentication processing unit 420 authenticates the biometric information.

The process between steps S2108 and S2111 is the same as the process between steps S908 and S911 shown in FIG. 9. Thus, description of steps S2108 to S2111 is omitted in the following.

The process of creating the group name list by the list control unit 235 in the present embodiment is described. The list control unit 235, after the group name is selected in step S2106, creates the group name list once again. Specifically, the list control unit 235, upon selection of the group name in step S2106, creates the group name list when the list box L10 is next displayed such that the group name selected in step S2106 comes at the top of the list. The group names that follow the top group name are arranged in descending order of the number of times of selection of the group name in the past.

For example, referring to FIG. 20, it is supposed that the group name that was selected from the list box L10 the last time it was displayed is the group name A, and that the group name C is the group name that has been most frequently selected among the group names A, B, and C in the past. In this case, the list control unit 235 puts the group name A at the top of the list, and places the group name C next to the group name A, as shown in FIG. 20. The group name B is placed next to the group name C. In the present embodiment, the list control unit 235 has stored values indicating the number of times each group name has been selected, so that the number of times of selection of each group name can be determined.

Thus, the list control unit 235 creates the group name list in which the group name selected the last time and the group names that have been selected most frequently in the past are at the top of the list. This allows a user to find and select his or her own group name the more easily the more often he or she uses the group name.

Further, in accordance with the present embodiment, it is only necessary to select a group name from the group name list in order to perform the biometric authentication process, without the need to input the user ID as in Embodiment 1. Thus, in accordance with the present embodiment, operations for performing the biometric authentication process can be simplified. Furthermore, the biometric authentication server 400A only needs to retrieve the authenticating information to which the group ID associated with the selected group name is allocated, and there is no need to retrieve all of the authenticating information stored in the biometric authentication server 400A. Thus, in accordance with the present embodiment, the time required for the authentication process can be reduced and its accuracy can be improved.

Embodiment 3

Hereafter, an image forming apparatus according to Embodiment 3 of the present invention is described with reference to the drawings. Embodiment 3 differs from Embodiment 2 in that a further improved operability is obtained when performing user authentication based on biometric information. Thus, in the following description of Embodiment 3, only the differences from Embodiment 2 are described and the units or components having the same or corresponding functions as those of Embodiment 2 are designated with similar reference numerals while omitting their descriptions.

In accordance with the present embodiment, the group names are displayed on the operating/display unit 28 of the MFP 200B as group name buttons. This eliminates the need to retrieve a desired group name from the list box L10, thus improving operability.

Figure 22:
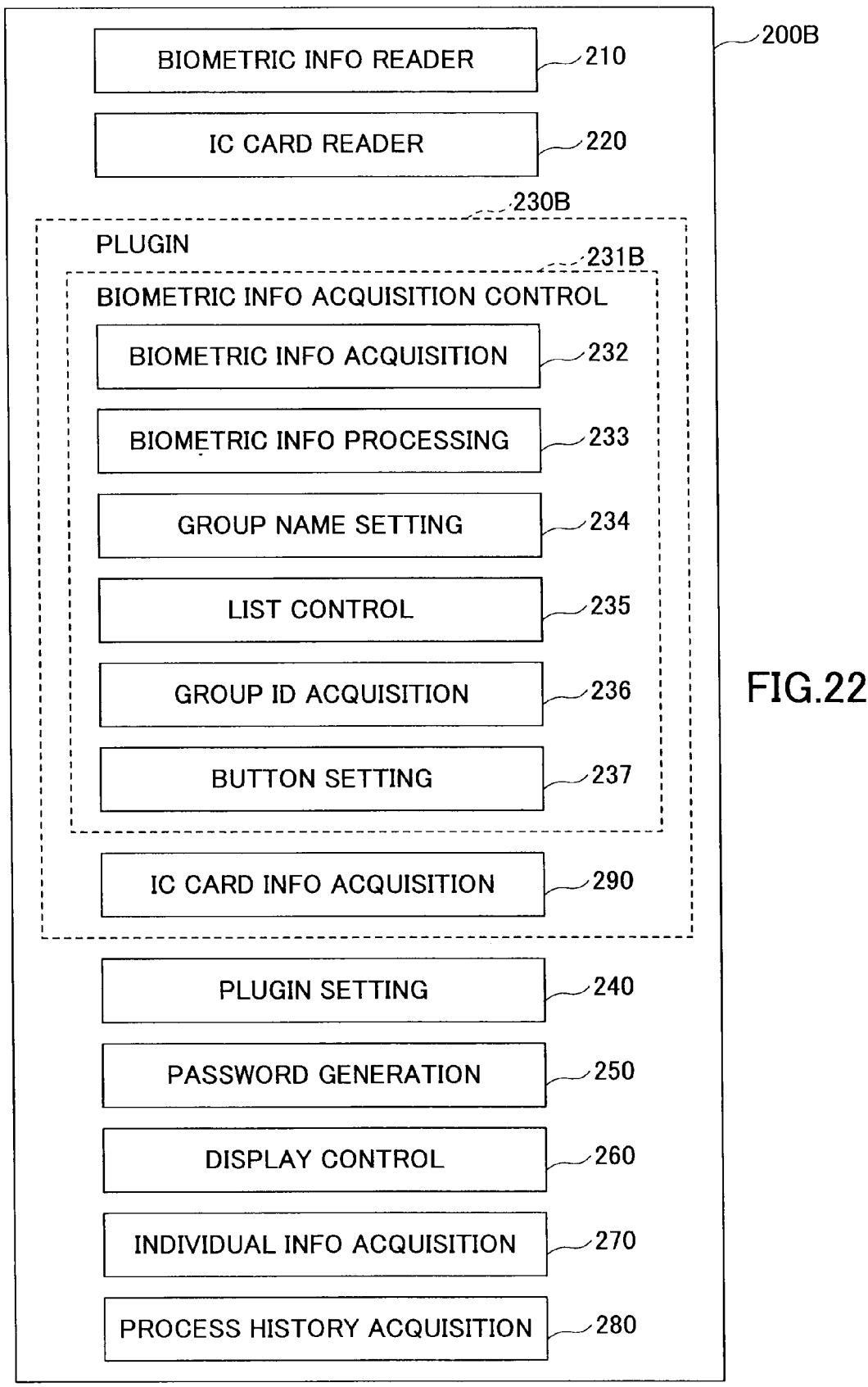
FIG. 22 shows a functional configuration of an MFP 200B according to Embodiment 3.

FIG. 22 shows a functional configuration of the MFP 200B according to the present embodiment. The MFP 200B includes a plug-in unit 230B which includes a plugin 231B for realizing a biometric information acquiring function. The plugin 231B includes a biometric information acquiring unit 232; a biometric information processing unit 233; a group name setting unit 234; a list control unit 235; a group ID acquiring unit 236; and a button setting unit 237.

The button setting unit 237 is configured to make settings for displaying on the operating/display unit 28 group name buttons corresponding to the group names that are set by the group name setting unit 234. Specifically, the button setting unit 237 displays a group name button setting screen that has the same layout as the screen displayed on the operating/display unit 28 upon biometric authentication.

Figure 23:
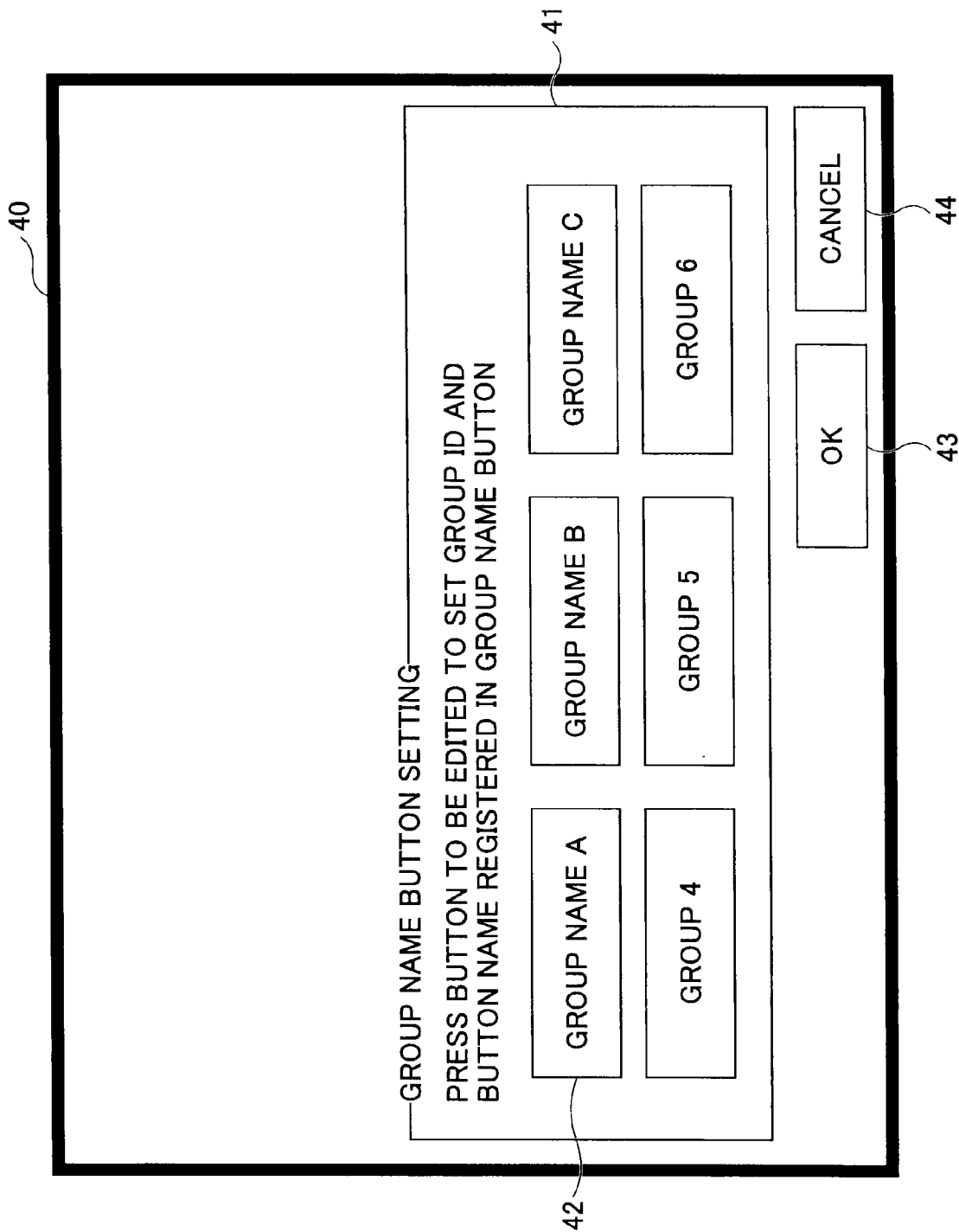
FIG. 23 shows a button setting screen produced by a button setting unit 237 according to Embodiment 2.

Referring to FIG. 23, the setting of the group name buttons in accordance with the present embodiment is described. FIG. 23 shows a button setting screen 40 produced by the button setting unit 237. The button setting screen 40 has a setting area 41 for associating the group name buttons and group names. The layout of the setting area 41 is the same as that of the screen that is displayed upon execution of biometric authentication as will be described later.

For example, when one of the group name buttons is pressed by a system administrator for association, the screen 20 shown in FIG. 19 is displayed. After a group ID and a group name are entered in the screen 20 and the setting button 21 is pressed, the entered group name is displayed within the setting area 41 in the screen 40. Because the layout of the screen 40 according to the present embodiment is the same as that of the screen displayed during actual biometric authentication, the system administrator or the like who makes the setting can make sure whether, looking at the display of the setting area 41, a group name can be correctly displayed within the group name button at the time of actual biometric authentication.

For example, when it is desired to display "Group name A" within the group name button 42, the group name button 42 within the setting area 41 is pressed. Then, the screen 20 of FIG. 19 appears, where the user presses the group name A, enters the group ID corresponding to the group name A, and presses the setting button 21. Then on the screen 40, the group name A entered in the screen 20 is displayed within the group name button 42. By pressing the OK button 43 at this time, the setting of the group name in the group name button 42 is complete. If the cancel button 44 is pressed instead, the screen 40 transitions back to the screen 20, where the group name to be displayed can be changed or modified. Thus, when the system administrator or the like makes the group name button setting, he or she can confirm the displayed content.

For example, when the allowed number of letters that can be displayed within the group name button is eight, if a 10-letter group name is entered, the ninth and 10th letters are not displayed within the group name button. In accordance with the present embodiment, however, such an incorrect display of the group name within the group name button is visibly displayed on the screen 40, so that the administrator or the like can quickly change or modify the group name.

Hereafter, a biometric authentication process according to the present embodiment is described with reference to a flow-chart shown in FIG. 24.

Figure 24:
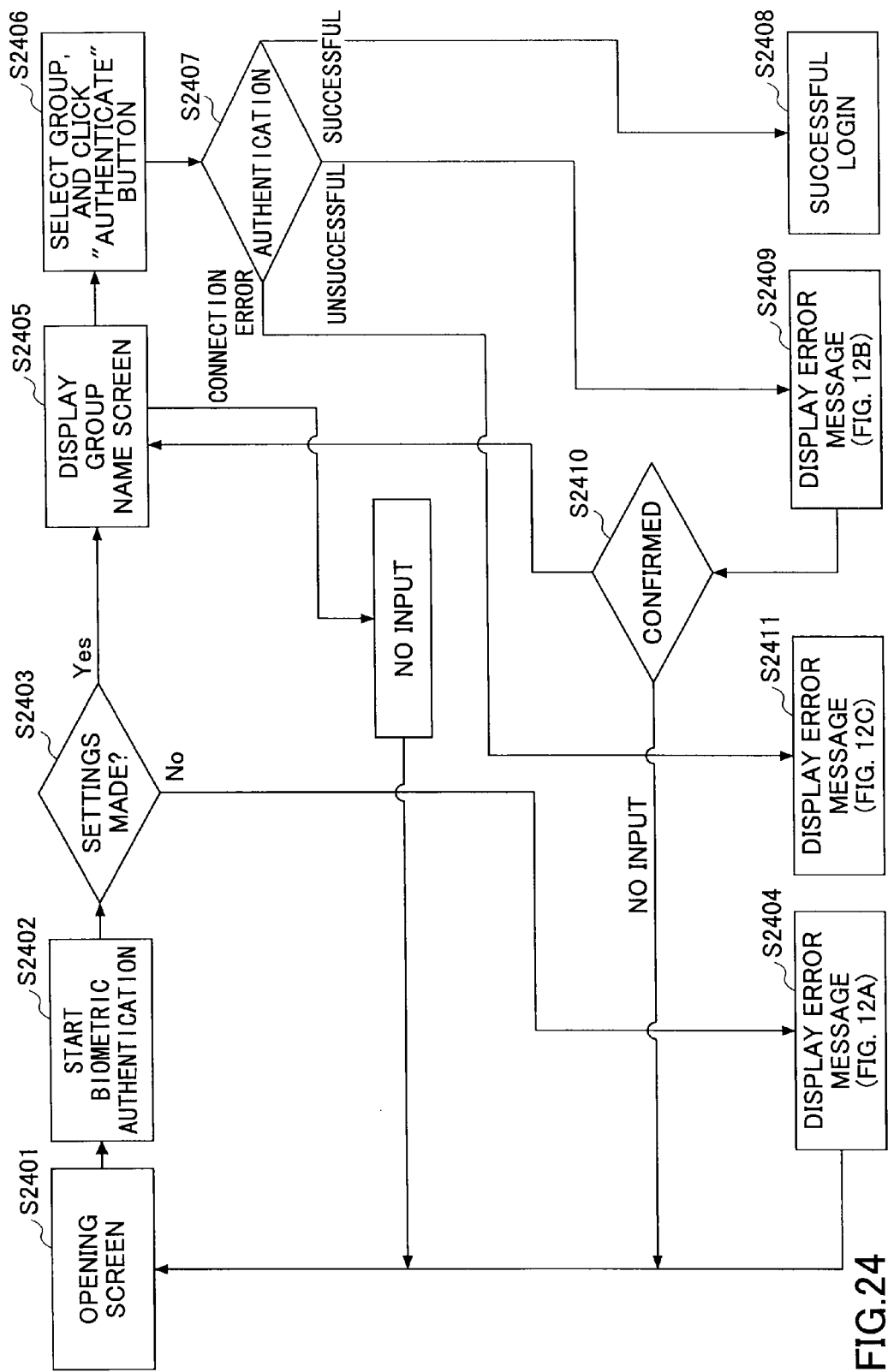
FIG. 24 shows a flowchart of a biometric authentication process according to Embodiment 3.

The process between steps S2401 and S2404 shown in FIG. 24 is the same as the process between steps S901 and S904 shown in FIG. 9. Therefore, description of steps S2401 to S2404 is omitted.

Figure 25:
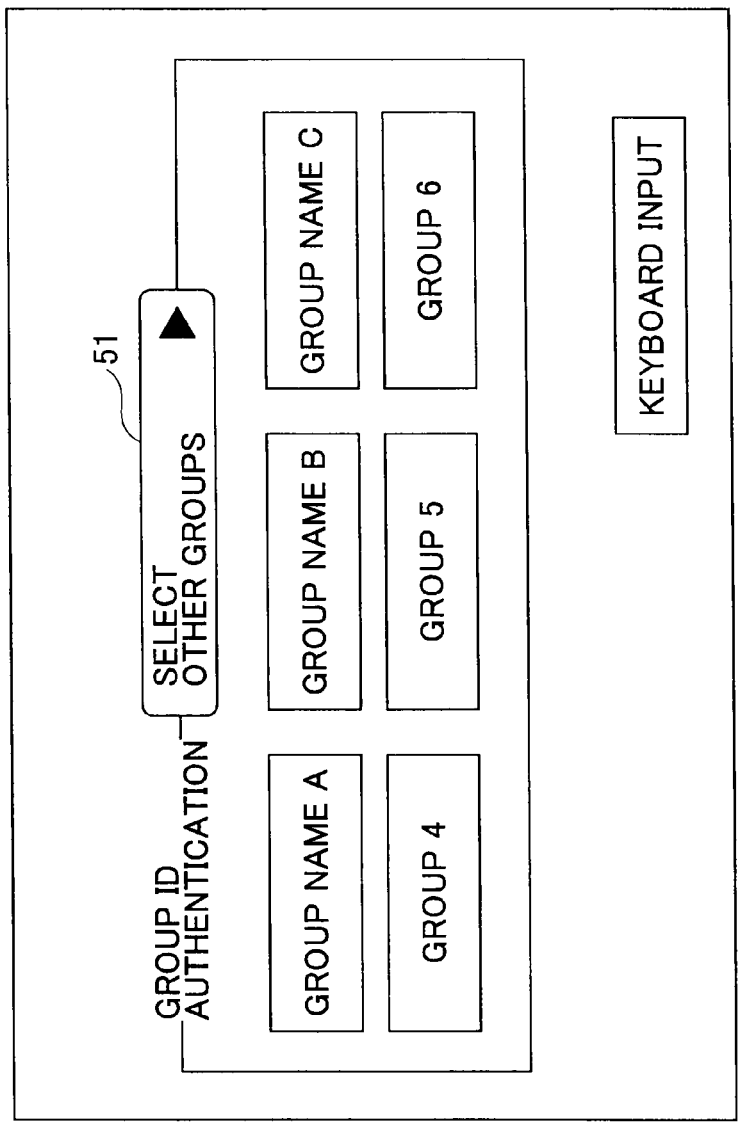
FIG. 25 shows a screen displayed on the operating/display unit 28.

In step S2403, if the biometric authentication server 400A is set as the authentication server, the managing server 300 notifies the MFP 200A. In the MFP 200A, the display control unit 260 displays the screen 50 shown in FIG. 25 on the operating/display unit 28 in step S2405. FIG. 25 is an example of the screen displayed on the operating/display unit 28.

In step S2406, a desired group name button is pressed in the screen 50, and biometric information is read. In step S2407, biometric authentication is performed. The biometric authentication procedure in step S2407 is the same as in Embodiment 2. Namely, upon selection of the group name by the pressing of the group name button, the group ID acquiring unit 236 acquires a group ID associated with the group name. The MFP 200B then transmits the acquired group ID and the biometric information to the biometric authentication server 400A. In the biometric authentication server 400A, the authentication processing unit 420 performs authentication using the group ID and biometric information.

The process between steps S2408 and S2411 is the same as the process between steps S908 and S911 shown in FIG. 9 and therefore the description of the corresponding steps is omitted.

In accordance with the present embodiment, up to six group name buttons can be displayed in the screen 50 shown in FIG. 25. Preferably, the group names that are set in the group name buttons are those group names that are frequently selected. Further, in accordance with the present embodiment, a group name that is not displayed in any of the group name buttons in the screen 50 can be selected. Specifically, when selecting a group name that is not displayed in the screen 50, a "Select other groups" button 51 is pressed. Then, the display screen of the operating/display unit 28 transitions to the screen 30 shown in FIG. 20, where a list of group names other than those set in the group name buttons is shown in the list box L10.

Thus, in accordance with the present embodiment, at the time of the biometric authentication process, the group name buttons indicating group names are displayed, so that the user can select a group name simply by pressing the corresponding group name button. This eliminates the need to search the list box L10 for the desired group name, thereby further improving operability.

Further, in accordance with the present embodiment, the group name buttons can be set in a setting screen having the same layout as that of the screen displayed when a relevant process is actually performed. This helps to reduce the burden on the system administrator or the like during the setting operation.

Embodiment 4

Hereafter, an image forming apparatus managing system according to Embodiment 4 of the present invention is described with reference to the drawings. Embodiment 4 is based on Embodiment 1 to which additional functions are provided. Thus, in the following description of Embodiment 4, units or components having the same or similar functions to those of Embodiment 1 are designated by similar reference numerals while omitting their descriptions.

In accordance with the present embodiment, in the MFP, information in a preset region on an IC card can be read. Further, the AD server and the managing server can be linked when user information stored in the managing server is registered or deleted. Furthermore, print jobs executed in the MFP can be managed.

Figure 26:
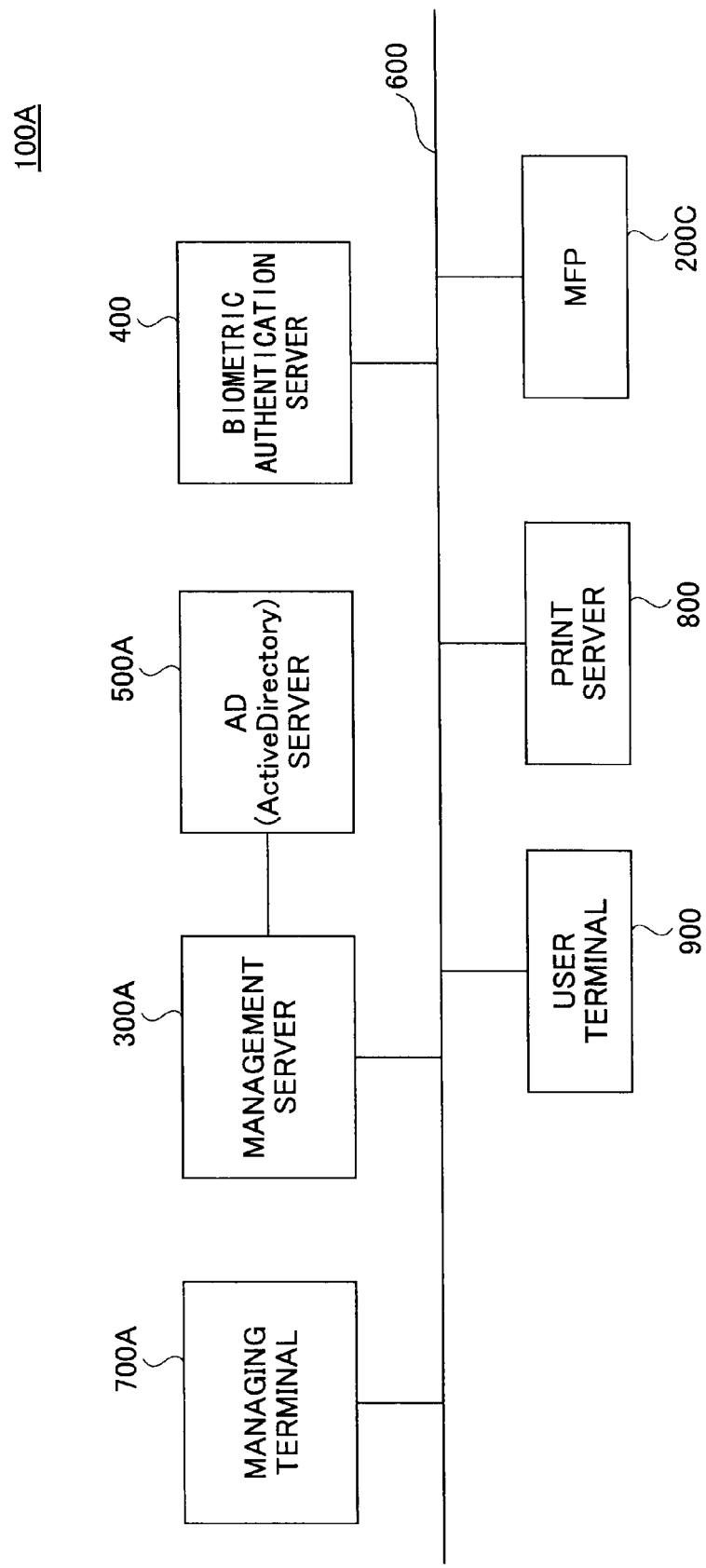
FIG. 26 shows a system configuration of an image forming apparatus managing system 100A according to Embodiment 4.

FIG. 26 shows a system configuration of an image forming apparatus managing system 100A according to Embodiment 4. The image forming apparatus managing system 100A includes an MFP 200C, a managing server 300A, a biometric authentication server 400, an AD server 500A, a managing terminal 700A, a print server 800, and a user terminal 900, which are connected via a network 600. The print server 800 manages print jobs that are generated in the user terminal 900 or the MFP 200C, as will be described below. The user terminal 900 may be used for selecting a document to be printed by the MFP 200C, or entering a print instruction into the MFP 200C.

Figure 27:
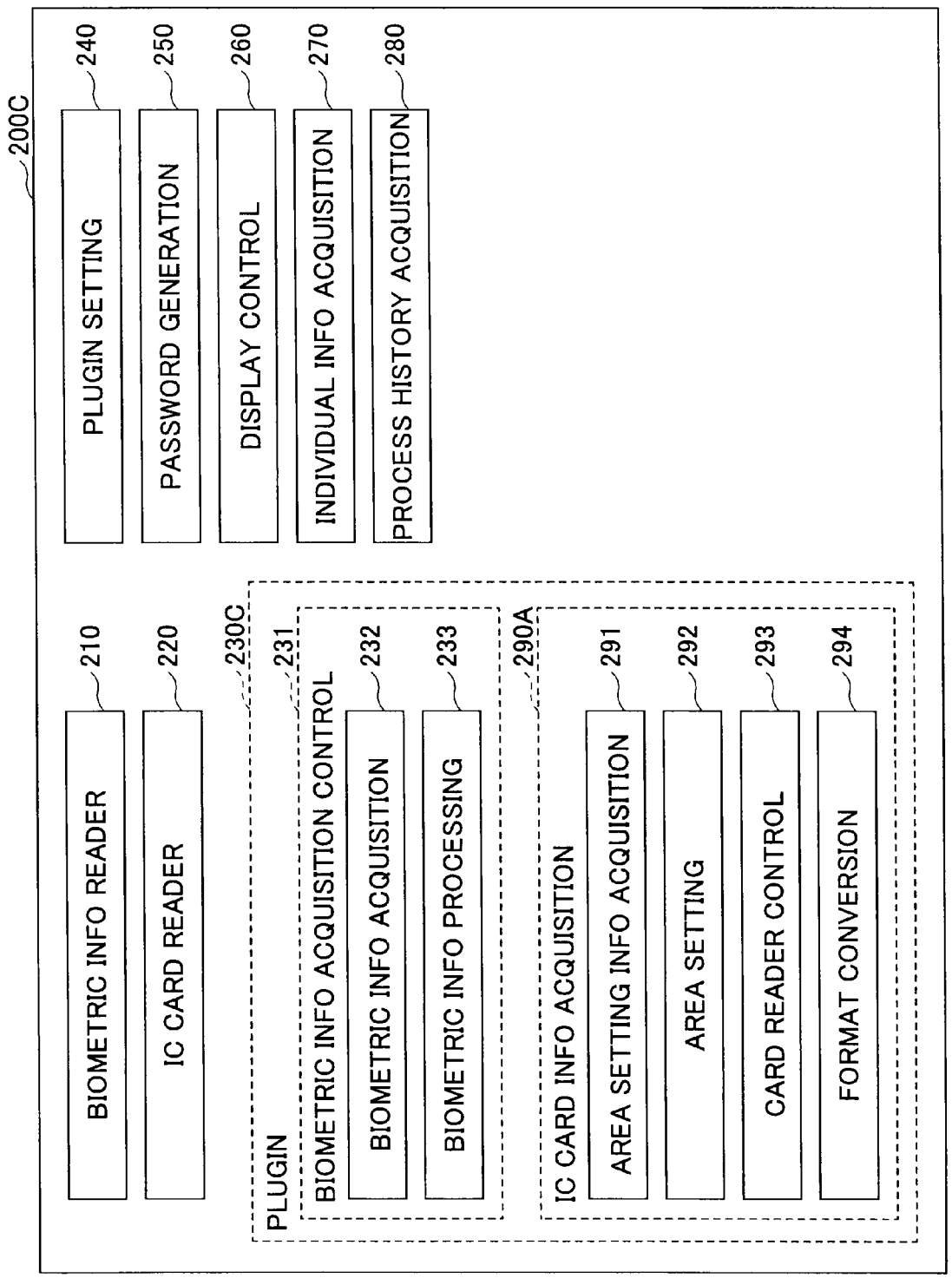
FIG. 27 shows a functional configuration of an MFP 200C according to Embodiment 4.

In the following, the various units of the image forming apparatus managing system 100A are described. FIG. 27 shows a functional configuration of an MFP 200C according to Embodiment 4. The MFP 200C includes a plug-in unit 230C having a plugin 290A for realizing an IC card information acquiring function.

The plugin 290A is configured to set an area of an IC card from which information is read by the MFP 200C. The plugin 290A includes an area setting information acquiring unit 291, an area setting unit 292, a card reader control unit 293, and an information format converting unit 294. The area setting information acquiring unit 291 acquires area setting information generated by the managing terminal 700A as described below. Based on the area setting information acquired by the area setting information acquiring unit 291, an area is set by the area setting unit 292. Specifically, the area setting unit 292 makes an area setting for the MFP 200C by storing the acquired area setting information in the auxiliary storage unit 24. Information in the area set in an IC card is read by the IC card reader 220, under the control by the card reader control unit 293.

The information format converting unit 294 converts IC card identifying information acquired by the IC card reader 220 into a predetermined information format. The "predetermined format" is herein intended to refer to a format handled by the image forming apparatus managing system 100A, i.e., a format that the MFP 200C can process.

For instance, when the MFP 200C is compatible with the FeliCa (contactless RFID smart card system developed by Sony Corp.) card format, if the information read by the IC card reader 220 is in eLWISE (multifunctional IC card system developed by NTT Communications Corp.) card format, the information format converting unit 294 converts the eLWISE format into FeliCa format. When the information read by the IC card reader 220 is compatible with the MFP 200C, the information format converting unit 294 need not perform such information format converting process. Thus, the information format converting unit 294 enables the MFP 200C to handle different IC card formats.

Figure 28:
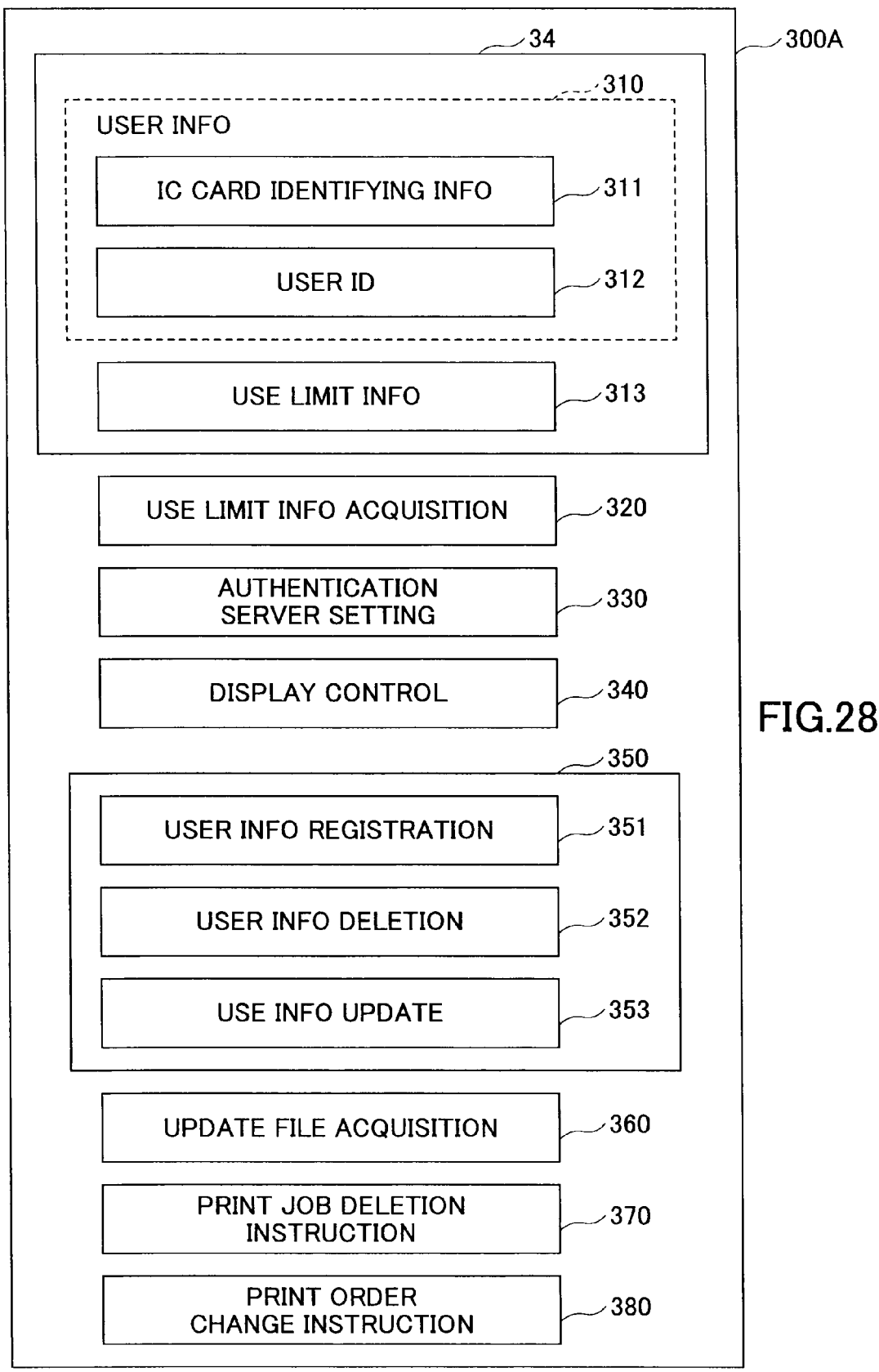
FIG. 28 shows a functional configuration of a managing server 300A according to Embodiment 4.

FIG. 28 shows a functional configuration of the managing server 300A according to Embodiment 4. The managing server 300 includes, in addition to the various units provided in the managing server 300 according to Embodiment 1 shown in FIG. 6, the following: a user information managing unit 350; an update file acquiring unit 360; a print job deleting instruction unit 370; and a print order change unit 380.

The user information managing unit 350 manages user information 310 stored in the managing server 300A by, for example, registering, deleting, or updating the user information. The user information managing unit 350 includes a user information registering unit 351, a user information deleting unit 352, and a user information updating unit 353.

The user information registering unit 351 is configured to register user information in the auxiliary storage unit 34. The user information deleting unit 352 deletes user information from the auxiliary storage unit 34. The user information updating unit 353 is configured to update user information stored in the auxiliary storage unit 34 based on an update file which will be described below.

The update file acquiring unit 360 acquires the update file for updating user information stored in the auxiliary storage unit 34. The update file may be created by a device connected to the managing server 300A via the network 600 and downloaded by the managing server 300A. The update file may also be created by a general computer not connected to the managing server 300A and then recorded in a recording medium. In this case, the managing server 300A can acquire the update file by reading it from the recording medium.

The print job deleting instruction unit 370 generates a print job deleting instruction for deleting one or more print jobs stored in the print server 800 all at once. The print order change instruction unit 380 generates an execution order change instruction for changing the order of execution of the print jobs stored in the print server 800.

Figure 29:
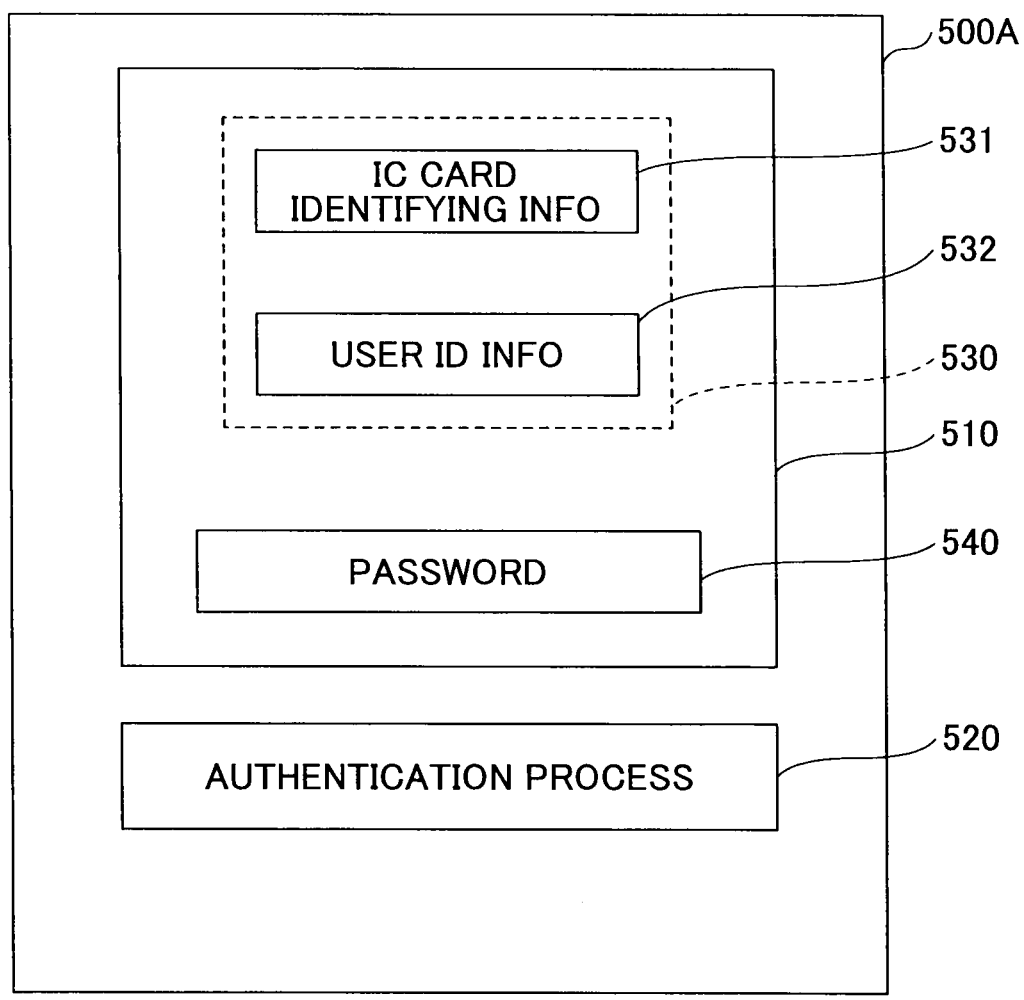
FIG. 29 shows an AD server 500A according to Embodiment 4.

With reference to FIG. 29, the AD server 500A according to Embodiment 4 is described. The AD server 500A includes a storage unit 510 and an authentication processing unit 520 that is realized by the processor unit. In the storage unit 510, there is stored user information 530 and a password 540 corresponding to the user information 530. The user information 530 includes IC card identifying information 531 and a user ID 532 corresponding to the IC card identifying information 531. The authentication processing unit 520 performs user authentication by determining whether the user information 530 stored in the storage unit 510 is valid.

Figure 30:
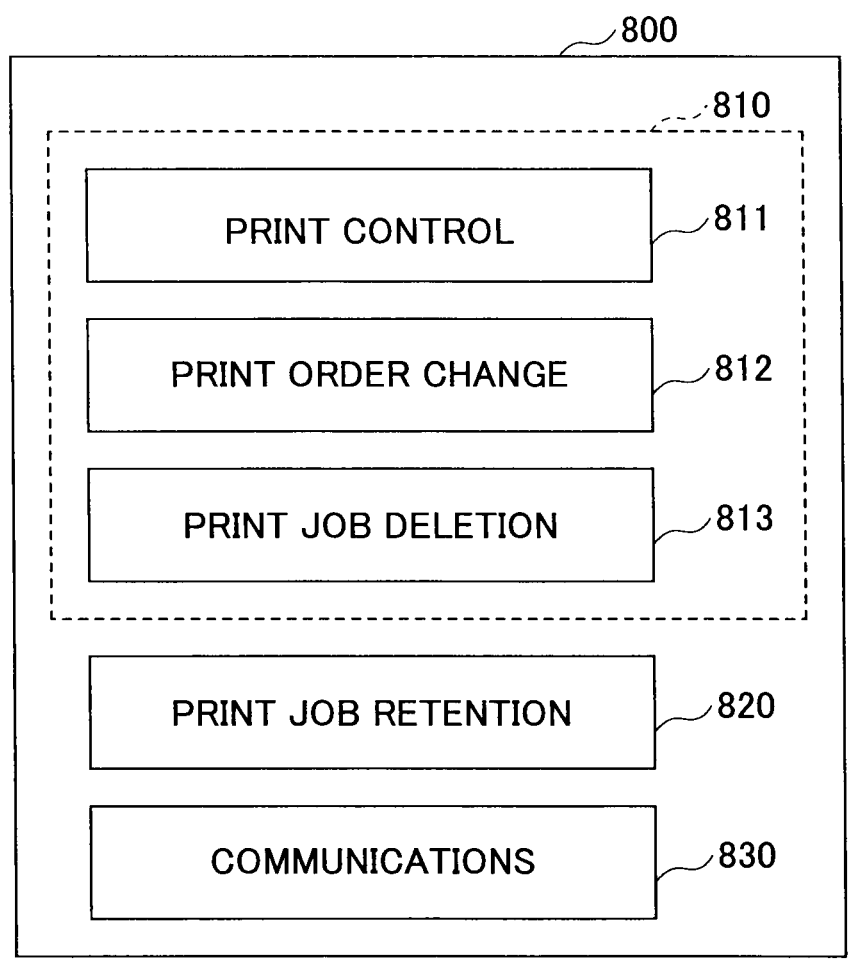
FIG. 30 shows a print server 800 according to Embodiment 4.

With reference to FIG. 30, the print server 800 according to the present embodiment is described. The print server 800 manages print jobs generated by the user terminal 900 and the MFP 200C, as will be described below. The print server 800 includes a print control unit 811, a print order change unit 812, and a print job deleting unit 813 which are realized by an processor unit 810, and a print job retaining unit 820 realized by a storage unit, and a communications unit 830.

In response to a print instruction from the user terminal 900 or the MFP 200C, the print control unit 811 transmits a relevant print job retained in the print instruction retaining unit 820 to the MFP 200C, where the print job is executed. In response to a print order change instruction from the managing server 300A, the print order change unit 812 changes the order in which the print jobs retained in the print instruction retaining unit 820 are executed. The print job deleting unit 813, in response to a print job deleting instruction from the managing server 300A, deletes the print jobs retained in the print instruction retaining unit 820 all at once. The communications unit 830 is configured to communicate with the managing server 300A and the MFP 200C.

Referring to FIG. 31, the managing terminal 700A according to Embodiment 4 is described. The managing terminal 700A may be realized by installing a suitable program in a general computer having an processor unit 710, a storage unit 720, a display unit 730, and a communications unit 740. The managing terminal 700A includes a control unit 711 and an area setting information generating unit 712, which are realized by the processor unit 710. The control unit 711 controls various processes executed by the managing terminal 700A. The area setting information generating unit 712 generates area setting information, as will be described later. In the managing terminal 700A, the processor unit 710 executes an area setting program stored in the storage unit 720 in order to realize the function of the area setting information generating unit 712. The area setting program is started up in the managing terminal 700A upon instruction for generating area setting information.

In the following, generation of area setting information by the area setting information generating unit 712 is described with reference to FIGS. 32 through 34. Initially, however, an IC card is described with reference to FIGS. 32A and 32B. FIG. 32A shows an information recording format for the IC card A. FIG. 32B shows various items of information recorded in the IC card A. In the example shown in FIG. 32A, IC card identifying information is recorded at the top. In block 1, employee number information is recorded. In block 2, information about the number of times of issuance of the IC card A is recorded. In block 3, information about the date of issuance of the IC card A is recorded. In block 4, information about the expiration date of the IC card A is recorded.

The format of the IC card may vary depending on the particular standard used and may be determined by the issuer of the IC card. The format of the information recorded in the IC card may also vary depending on the IC card standard. For example, in the case of a FeliCa card, information is recorded in FeliCa card format. In the case of an eLWISE card, the information is recorded in eLWISE card format.

In FIG. 32B, the areas of the individual items of information in the IC card A are shown. It is seen that, for example, the area in block 1 in which an employee number is recorded starts at address 0 and ends at address 9.

In the managing terminal 700A according to the present embodiment, area setting information is generated using the format information about the IC card A shown in FIGS. 32A and 32B. In the present embodiment, it is assumed that the format information about the IC card A is supplied by the IC card issuer in advance.

In the following, the generation of area setting information is described with reference to FIGS. 33 and 34. In accordance with the present embodiment, the information read from the IC card A may be selected from three kinds, as described below. FIG. 33 shows a screen for selecting the type of information to be read from the IC card A. In this example, the three types of information that can be read from the IC card A are the IC card identifying information, information in accordance with a standard format, and information recorded in a particular area within the IC card A.

Figure 33:
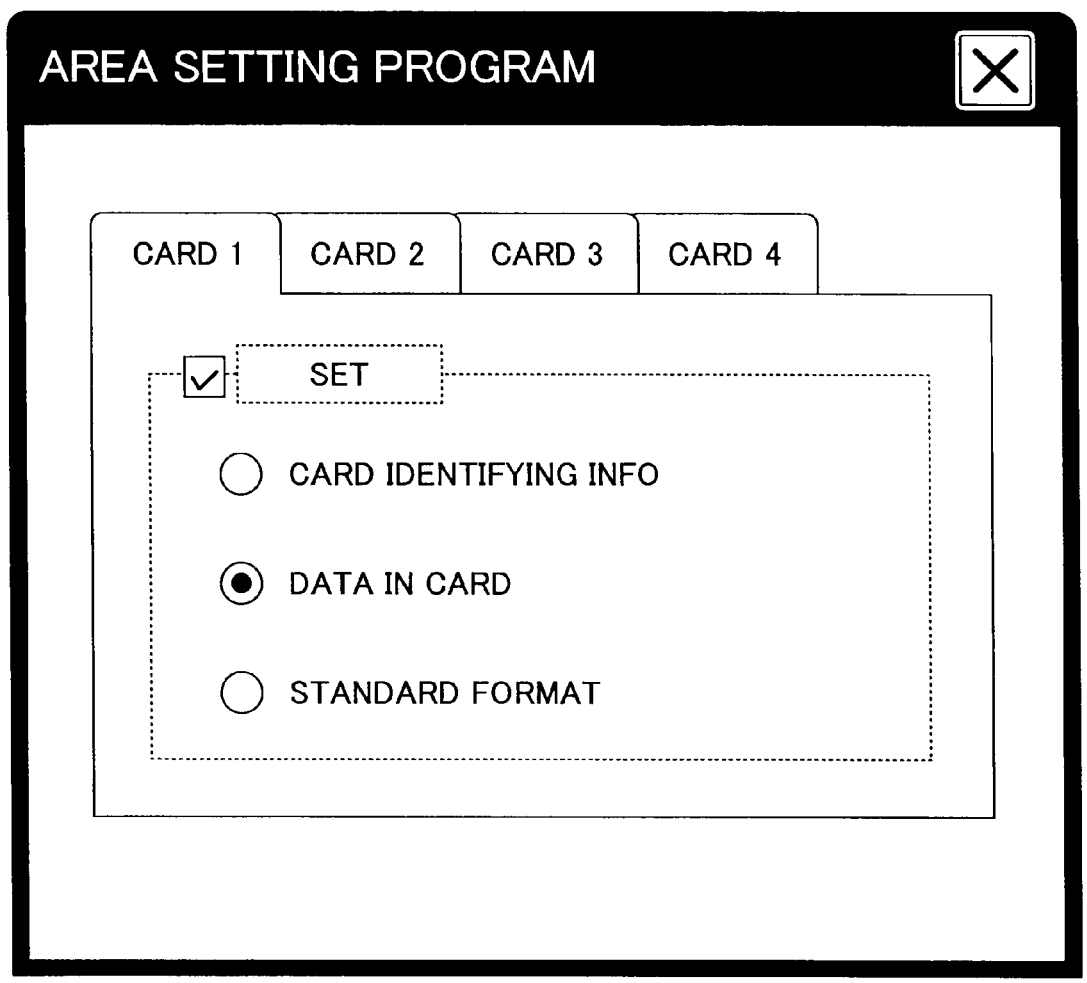
FIG. 33 shows a screen for selecting the type of information to be read from the IC card A.

In the managing terminal 700A, once information to be read from the IC card A is selected in the screen shown in FIG. 33, a screen for entering an area setting is displayed on the display unit 730. Referring to FIG. 33, when the IC card identifying information is selected as the information to be read from the IC card A, the area setting information generating unit 712 considers the information indicating the head area of the IC card A as the area setting information. It should be noted, however, that the area in which the IC card identifying information is recorded is not limited to the head area of the IC card A.

In FIG. 33, if the information according to the standard format is selected as the information to be read from the IC card A, the area setting information generating unit 712 uses the information indicating the standard format as the area setting information. The standard format may be supplied from the IC card issuer to the system administrator and set in the managing terminal 700A. When the standard format is followed, the format information stored in the managing terminal 700A may include information indicating the area where the IC card identifying information is recorded, and information indicating the area where the employee number is recorded. Based on such format information stored in the managing terminal 700A, the area setting information generating unit 712 generates area setting information.

Hereafter, a case where information recorded in a particular area in the IC card A is selected in FIG. 33 as the information to be read from the IC card A is described. In accordance with the present embodiment, by setting a desired area in the IC card, the information in the thus set area can be read.

Figure 34:
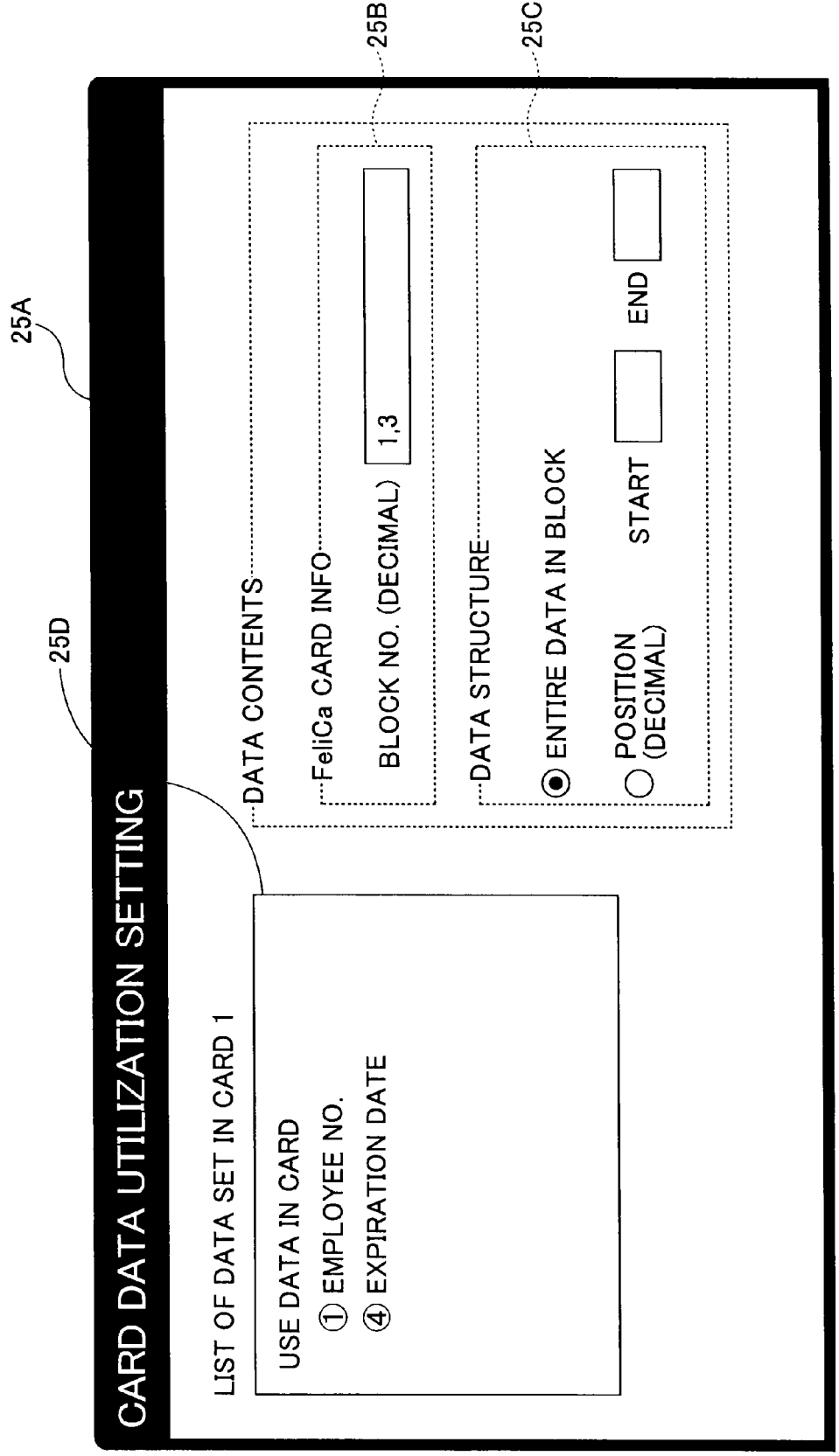
FIG. 34 shows an area setting screen for setting an area in the IC card A.

FIG. 34 shows an area setting screen 25A for setting an area in the IC card A. The area setting screen 25A includes a block designating area 25B for designating a block in which information is to be read; a position designating area 25C for designating a position (address) in the designated block; and an information list area 25D where information items that can be read are shown. In the area setting screen 25A, blocks 1 and 3 of the IC card A are designated in the block designating area 25B. In the position designating area 25C, the entire data in blocks 1 and 3 is designated. Thus, the area setting information generating unit 712 generates area setting information indicating that the entire data recorded in blocks 1 and 3 of the IC card is to be acquired.

In the information list area 25D, there are displayed an employee number, which is the entire data recorded in block 1, and an expiration date, which is the entire data recorded in block 3, as the information items to be acquired based on the area setting information. Thus, in accordance with the present embodiment, a block and the position of information in the block can be designated while confirming the information items to be read in the area setting screen. Thus, the area setting information can be generated by the system administrator or the like through a simple operation.

The area setting information generated by the managing terminal 700A may be supplied to the MFP 200C via the network 600. Alternatively, the area setting information may be recorded in a recording medium in the managing terminal 700A, such as a USB memory. The area setting information recorded in such a recording medium is then read by the MFP 200C, thus acquiring the area setting information. Further, while in the present embodiment an area setting program for realizing the function of the area setting information generating unit 712 is installed in the managing terminal 700A, this is merely an example. In another embodiment, the area setting program may be installed in the user terminal 900. Alternatively, the area setting program may be installed in a general computer not connected to the MFP 200C. In this case, the area setting information that is generated may be recorded in a recording medium and then supplied to the MFP 200C.

Figure 35:
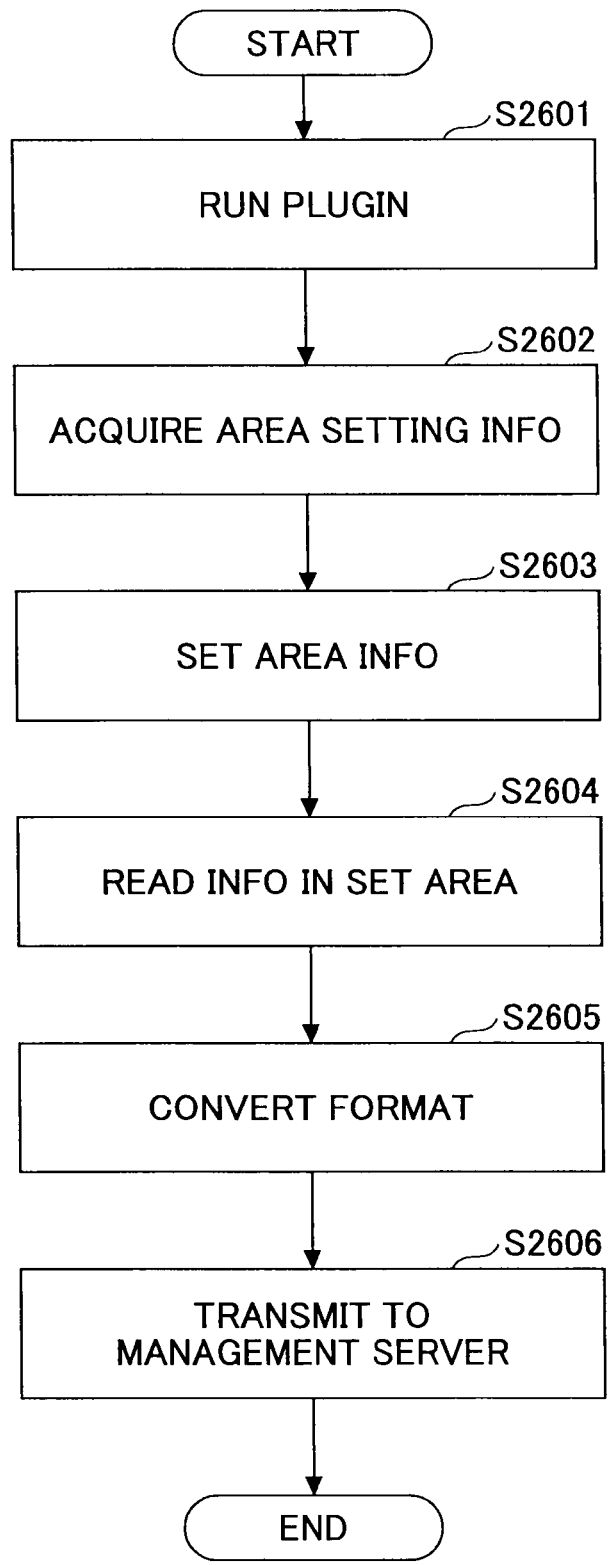
FIG. 35 shows a flowchart of an operation of a plugin 290A in the MFP 200C.

Hereafter, an operation of the plugin 290A in the MFP 200C according to the present embodiment is described. In the MFP 200C, an operation of the plugin 290A enables the reading of information based on the area setting information from the IC card. FIG. 35 shows a flowchart of an operation of the plugin 290A in the MFP 200C. The plugin 290A starts a process when selected as the plugin executed in the plug-in unit 230C in step S2601. The selection of the plugin is described below. The MFP 200C according to the present embodiment includes plural kinds of plugins (not shown) for controlling the reading of information from the IC card. A system administrator, for example, can select one of the plugins to be executed in the MFP 200C. The selection of the plugin may be performed by an administrator tool for managing the image forming apparatus managing system 100A. The administrator tool may be provided in the managing terminal 700A or in the MFP 200C.

Other plugins provided in the MFP 200C may include an SSFC (Shared Security Formats Cooperation; an ID card security management system using the FeliCa contactless IC card technology) plugin in accordance with the SSFC standard, and an eLWISE plugin in accordance with the eLWISE card standard. When the SSFC plugin is selected, for example, the SSFC plugin is executed so that the MFP 200C reads information from the IC card in accordance with SSFC standard format. The plugin 290A according to the present embodiment may be operated as a FeliCa plugin in accordance with the FeliCa standard.

Figure 36:
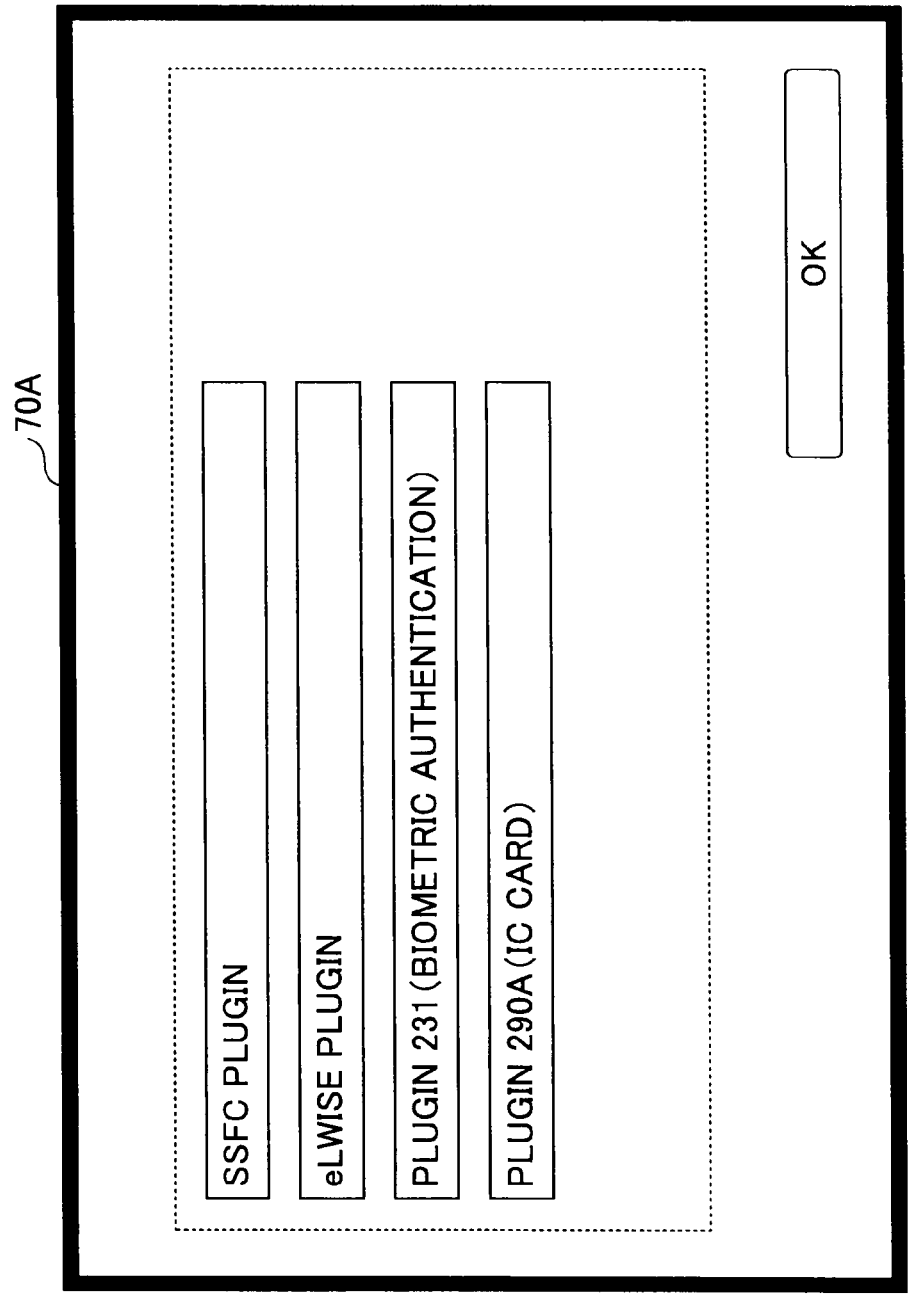
FIG. 36 shows a plugin setting screen according to Embodiment 4.

FIG. 36 shows an example of a plugin setting screen according to Embodiment 4. The plugin setting screen 70A may be displayed on the display unit 730 of the managing terminal 700A, or on the operating/display unit 28 of the MFP 200C. Upon selection of the plugin 290A in the plugin setting screen shown in FIG. 36, the MFP 200C starts the plugin 290A.

Referring back to FIG. 35, after the plugin 290A is started in the MFP 200C, the area setting information acquiring unit 291 acquires area setting information in step S2602. The area setting information acquiring unit 291 may acquire the area setting information from the managing terminal 700A via the network 600, or from a recording medium. In step S2603, the acquired area setting information is set in the MFP 200C by the area setting unit 292. Namely, the area setting unit 292 stores the area setting information in the auxiliary storage unit 24, whereupon the setting of area setting information in the MFP 200C is completed.

In step S2604, when the IC card A is passed over the IC card reader 220, the information recorded in a set area of the IC card A is read by the IC card reader 220 under the control of the card reader control unit 293. The card reader control unit 293 controls the reading of the information by the IC card reader 220 by referring to the area setting information stored in the auxiliary storage unit 24. The IC card reader 220 may also acquire the format information about the IC card A when the IC card A is passed over it.

In accordance with the present embodiment, four patterns of area setting information can be generated for each type of an IC card. Thus, in the MFP 200C, multiple patterns of area setting information may be acquired and set. When multiple patterns of area setting information are set in the MFP 200C, the card reader control unit 293 determines whether each item of area setting information corresponds to the format of the IC card A, in order from the area setting information that is initially acquired. Based on the area setting information that has been determined to correspond to the format of the IC card A, the card reader control unit 293 controls the reading of information by the IC card reader 220.

In step S2605, after the information has been read by the IC card reader 220, the information format converting unit 294 converts the information into a predetermined format. The "predetermined format" is herein intended to refer to a format that can be processed by the MFP 200C. For example, when the MFP 200C is adapted for FeliCa card format, if the information read by the IC card reader 220 is in eLWISE card format, the information format converting unit 294 converts the eLWISE format into FeliCa card format. If the information read by the IC card reader 220 is in a format compatible with the MFP 200C, the information format converting unit 294 need not perform the information format converting process.

In step S2606, the MFP 200C transmits the information whose format may have been converted by the information format converting unit 294 to the managing server 300A. The managing server 300A performs a user login process using the information transmitted from the MFP 200C.

Thus, in the MFP 200C in accordance with the present embodiment, an area for the reading of information is set in the IC card, so that the information recorded in the thus set area can be read. Thus, in the MFP 200C, information to be read from the IC card can be set depending on the environment in which the image forming apparatus managing system 100A is used. Further, in accordance with the present embodiment, the format of the information can be converted into a format that can be processed by the MFP 200C. This feature of the present embodiment enables the handling of various types of IC cards based on different standards, thus enhancing the versatility of the MFP 200C.

Hereafter, the login process according to the present embodiment is described. In the image forming apparatus managing system 100A according to the present embodiment, if a user forgot to bring his or her IC card, the user can still login by entering his or her user ID and password for user authentication.

Figure 37:
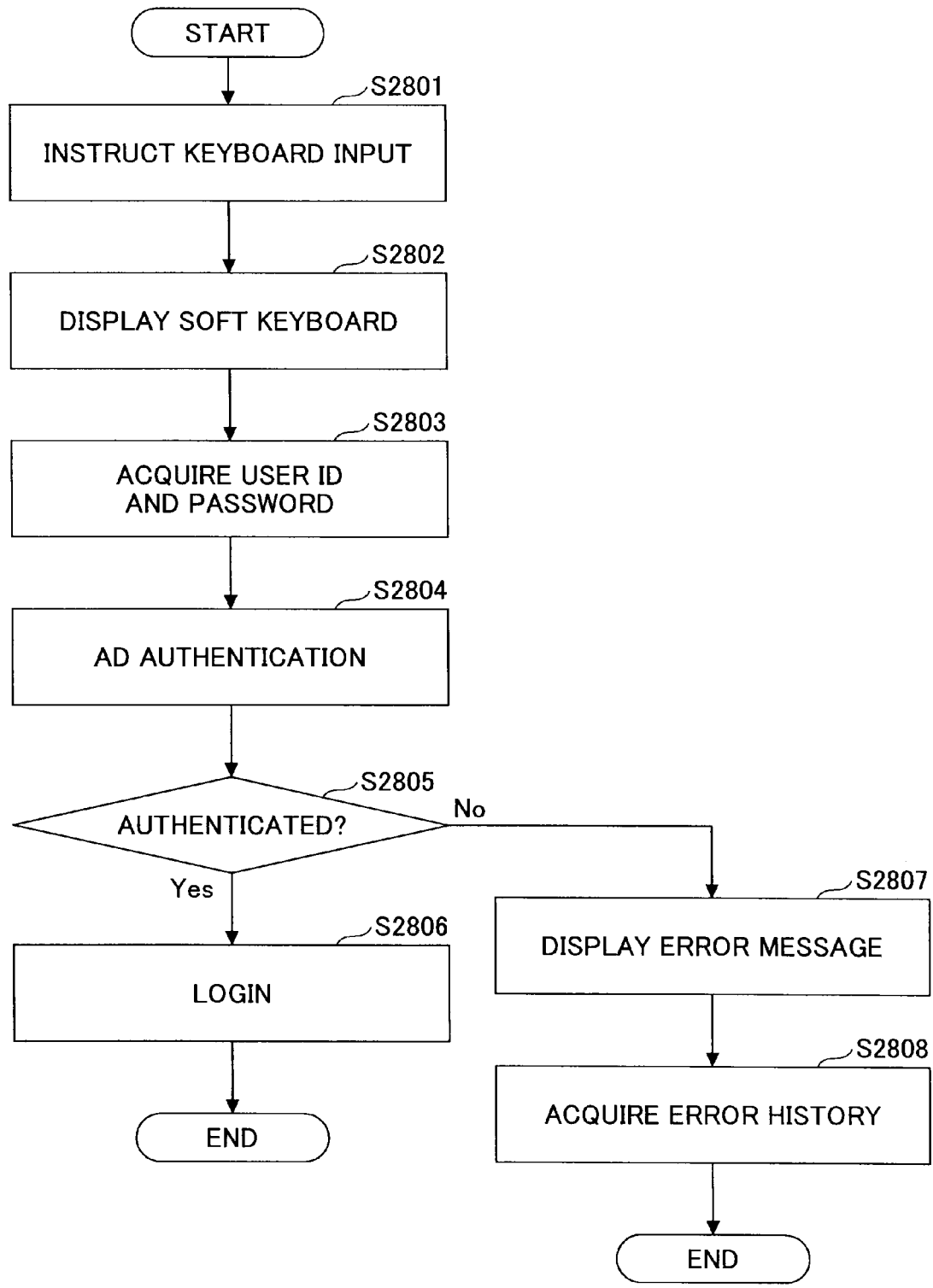
FIG. 37 shows a flowchart of a user authentication according to Embodiment 4 in the absence of the IC card.
Figure 38B:
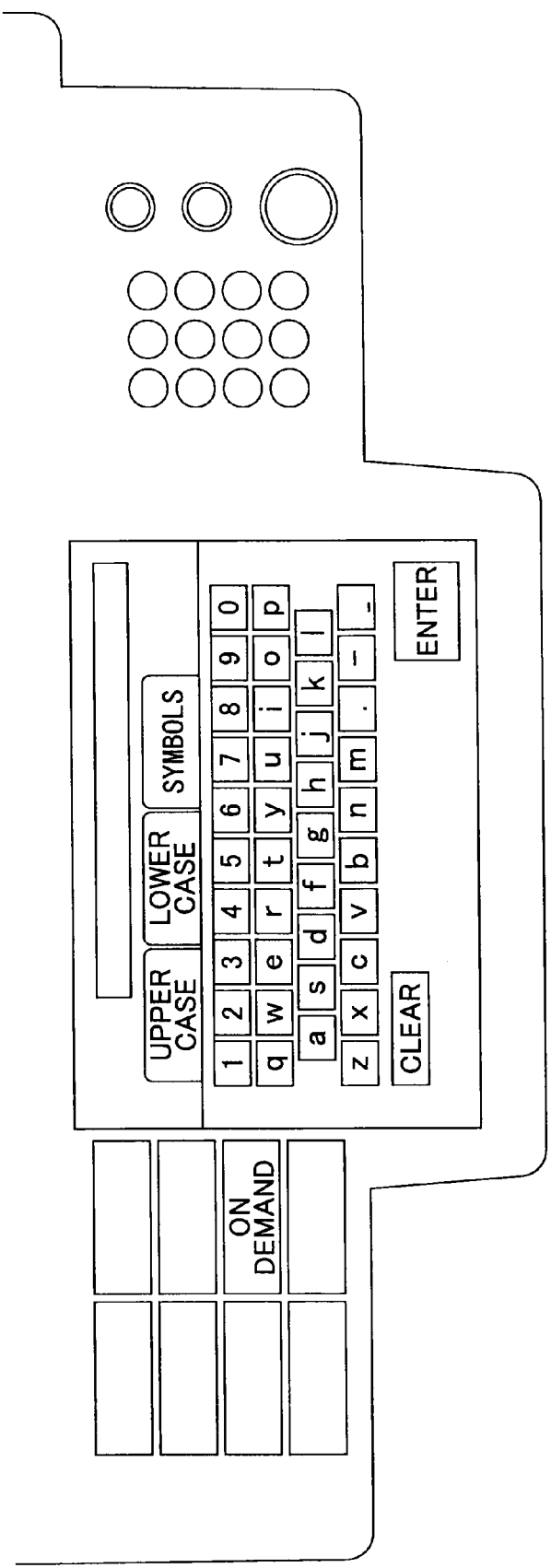

FIG. 37 shows a flowchart of user authentication that is performed when the user forgot to bring his or her IC card. In the present embodiment, the operating/display unit 28 of the MFP 200C displays an instructing button 28A (see FIG. 38A) for entering an instruction for displaying a keyboard screen. FIG. 38A shows an example of a standby screen displayed on the operating/display unit 28. FIG. 38B shows an example of a keyboard screen displayed on the operating/display unit 28. As shown in FIG. 38A, in the MFP 200C, the standby screen has the instructing button 28A for entering an instruction for keyboard input.

After the keyboard input instruction is entered via the instructing button 28A in step S2801, the MFP 200C in step S2802 displays the keyboard screen shown in FIG. 38B on the operating/display unit 28. In step S2803, the MFP 200C acquires a user ID and a password entered on the keyboard screen. In step S2804, the MFP 200C transmits the acquired user ID and password to the AD server 500A via the managing server 300A. In the AD server 500A, it is determined whether the acquired user ID and password are valid, based on the information stored in the storage unit 510 and also using authentication processing unit 520. If the acquired user ID and password are valid, the AD server 500A authenticates the user.

Hereafter, the user authentication process in the AD server 500A is described. In the AD server 500A, the IC card identifying information 531 and the user ID 532 are stored in the storage unit 510 associated with one another. The AD server 500A authenticates the user if information corresponding to the user ID and password acquired in step S2803 exists in the storage unit 510, and if IC card identifying information corresponding to the user ID acquired in step S2803 exists in the storage unit 510.

In step S2805, if the user is authenticated, the managing server 300A in step S2806 allows the user to log in. If in step S2805 user authentication is unsuccessful, an authentication error message is displayed on the operating/display unit 28 of the MFP 200C in step S2807. In step S2808, the MFP 200C acquires authentication error history information and stores it in the auxiliary storage unit 24. Alternatively, the authentication error history information may be stored in the managing server 300A.

Thus, in the MFP 200C, user authentication can be performed based on a user ID and password entered on the keyboard when the user does not have the IC card. Thus, in accordance with the present embodiment, the user can be allowed to use the MFP 200C in the absence of an IC card based on the user's use limit information, without having to issue a temporary IC card or the like.

In the image forming apparatus managing system 100A, up to four AD servers 500A may be installed. In this way, if one of the AD servers 500A fail to operate, the other AD servers 500A can cover the failed AD server. In accordance with the present embodiment, whether or not to display the instructing button 28A on the operating/display unit 28 of the MFP 200C may be set by the system administrator in advance. When the setting is such that the instructing button 28A is displayed, the AD server 500A may authenticate a user ID entered via the keyboard screen.

Figure 39:
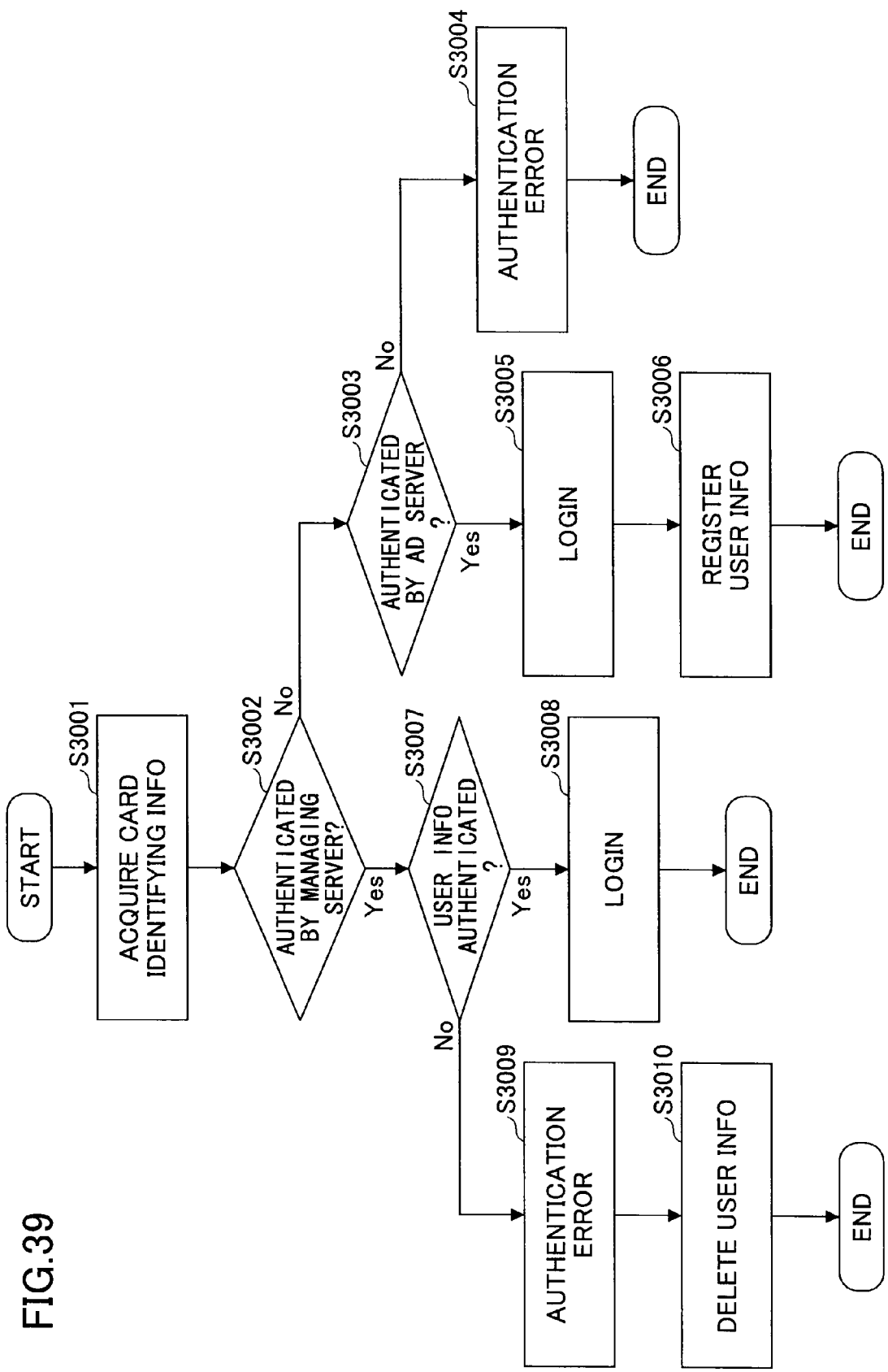
FIG. 39 shows a flowchart of a process for registering or deleting user information in the managing server 300A according to Embodiment 4.

Hereafter, management of user information in the managing server 300A is described. In the managing server 300A, the user information stored in the auxiliary storage unit 34 can be registered, deleted, or updated. FIG. 39 shows a flowchart of a process for registering or deleting user information in the managing server 300A according to Embodiment 4.

After the IC card identifying information is read by the IC card reader 220 in the MFP 200C, the managing server 300A in step S3001 acquires the IC card identifying information from the MFP 200C.

In step S3002, the managing server 300A performs an authentication process on the acquired IC card identifying information, based on the acquired IC card identifying information and the user information stored in the auxiliary storage unit 34. If the authentication of the IC card identifying information in step S3002 is unsuccessful, the managing server 300A transmits the IC card identifying information to the AD server 500A. In step S3003, the authentication processing unit 520 of the AD server 500A, based on the acquired IC card identifying information and the user information 530, performs an authentication process on the acquired IC card identifying information.

If in step S3003 the IC card identifying information acquired by the AD server 500A is not authenticated, the AD server 500A transmits an authentication error message to the MFP 200C via the managing server 300A. In step S3004, the authentication error message is displayed on the operating/display unit 28 of the MFP 200C.

If the IC card identifying information acquired by the AD server 500A is authenticated in step S3003, the managing server 300A receives a message from the AD server 500A indicating the successful authentication of the user. In response, the managing server 300A in step S3005 allows the user to login. In step S3006, the managing server 300A acquires from the AD server 500A a user ID corresponding to the authenticated IC card identifying information, and registers this user ID in the auxiliary storage unit 34, using the user information registering unit 351.

Specifically, in response to the message indicating the successful authentication of the IC card identifying information in the AD server 500A, the user information registering unit 351 acquires the user ID corresponding to the authenticated IC card identifying information from the AD server 500A. The user information registering unit 351 then stores the IC card identifying information and the user ID in the auxiliary storage unit 34 in association with use limit information. The use limit information with which the IC card identifying information and the user ID are associated is stored in the auxiliary storage unit 34 in advance as an initial setting. In accordance with the present embodiment, when the use limit information is in initial setting status, all of the functions of the MFP 200C are usable.

Thus, in accordance with the present embodiment, the user is considered to have been authenticated if the IC card identifying information is not authenticated by the managing server 300A but is authenticated by the AD server 500A. The managing server 300A then acquires the user ID corresponding to the IC card identifying information from the AD server 500A, and registers it in the auxiliary storage unit 34 in association with the use limit information of the initial setting.

Thus, when registering user information about a new user in the image forming apparatus managing system 100A, a system administrator needs only to register relevant IC card identifying information and user ID in the AD server 500A. This eliminates the need for registering the IC card identifying information and user ID in both the AD server 500A and the managing server 300A, thus reducing the burden on the system administrator.

If in step S3002 the IC card identifying information is authenticated by the managing server 300A, the managing server 300A transmits the user information including the IC card identifying information and the user ID to the AD server 500A. In step S3007, the AD server 500A performs an authentication process on the user information. If the user information is authenticated by the AD server 500A, the managing server 300A allows the user to login in step S3008.

If in step S3007 the user information is not authenticated by the AD server 500A, the managing server 300A in step S3009 regards the IC card identifying information invalid, and transmits an authentication error message to the MFP 200C. In step S3010, in the managing server 300A, the user information deleting unit 352 deletes from the auxiliary storage unit 34 the IC card identifying information that has not been authenticated by the AD server 500A and the corresponding user ID and use limit information.

Thus, in accordance with the present embodiment, invalid user information stored in the managing server 300A can be automatically deleted.

Further, in accordance with the present embodiment, the user information may be updated by registering new user information or deleting user information by the user information updating unit 353. The user information registration or deletion process described above with reference to FIG. 39 is performed only upon acquisition of the IC card identifying information corresponding to a particular user subject to the registration or deletion process. On the other hand, the user information updating unit 353 may periodically update the user information stored in the auxiliary storage unit 34. For example, in the managing server 300A, the update file acquiring unit 360 periodically acquires an update file that is prepared in advance for updating user information. Upon acquisition of the update file, the user information updating unit 353 rewrites the user information based on the update file.

The update file mainly includes IC card identifying information and user ID information. The information in the update file corresponds to the user information 530 stored in the AD server 500A. The AD server 500A periodically writes out the user information 530 stored in the AD server 500A in a file in a predetermined format, and supplies it to the managing server 300A. The "predetermined format" is herein intended to refer to a format such that the file can be processed by the managing server 300A, such as CSV (comma separated values) format.

The managing server 300A acquires the update file that is periodically supplied from the AD server 500A, and updates the user information based on the acquired update file. Such an update process enables the user information 310 in the auxiliary storage unit 34 in the managing server 300A to correspond to the user information within the AD server 500A. Updating of the user information in the managing server 300A may include updating use limit information.

For example, if new user information 310 has been added to the update file, the user information updating unit 353 stores the use limit information 313 of the initial setting in the auxiliary storage unit 34 in association with the newly added user information 310. If the user information 310 has been deleted from the update file, the user information updating unit 353 deletes the use limit information corresponding to the deleted user information 310 from the auxiliary storage unit 34.

Thus, in the managing server 300A according to the present embodiment, the user information can be updated periodically in accordance with the AD server 500A. This eliminates the need for double information management requiring the management of the user information 530 in the manage AD server 500A and the management of the user information 310 in the managing server 300A, thereby reducing the burden on the system administrator or the like for information management.

Furthermore, in accordance with the present embodiment, the managing server 300A can delete the print jobs stored in the print server 800 all at once. For example, in the managing server 300A, the print job deleting instruction unit 370 generates a print job deleting instruction and sends it to the print server 800. In response, in the print server 800, the print job deleting unit 813 deletes the print jobs retained in the print instruction retaining unit 820.

In the managing server 300A, the print job deleting instruction may be periodically generated and sent to the print server 800. For example, the print job deleting instruction unit 370 generates the print job deleting instruction at preset time intervals determined by the system administrator, and transmits the instruction to the print server 800. The print job deleting instruction thus generated may instruct the deletion of the entire print jobs all at once. In this case, the print jobs retained in the print instruction retaining unit 820 are deleted all at once each time the print job deleting instruction is received in the print server 800.

In the managing server 300A, a print job deleting instruction may be generated such that the print jobs accumulated in a predetermined period determined by the system administrator can be deleted. For example, the system administrator sets an 8-day period for deleting print jobs that have been accumulated between 10 days ago and 2 days ago. The print job deleting instruction unit 370 then transmits a print job deleting instruction and the information about the period set by the system administrator to the print server 800. In the print server 800, the print jobs accumulated during the set (8-day) period are deleted in accordance with the period information.

The print job deleting instruction unit 370 may display a setting screen prompting the entry of a setting of period information or a print job deleting instruction on a display unit of the managing server 300A. The system administrator can then set a period or enter a print job deleting instruction by following such a setting screen.

Thus, in accordance with the present embodiment, accumulation of large amounts of data in the print server 800 can be prevented, thus enabling a decrease in the capacity of the print server 800.

Further, in the managing server 300A, the order of execution of the print jobs accumulated in the print server 800 can be changed by the print order change instruction unit 380. For example, when the print server 800 is set to execute print jobs in reverse-chronological order of reception so that the latest print job is executed first, the print order change instruction unit 380 may generate an instruction for printing the print jobs in chronological order of reception of the print jobs. The managing server 300A then transmits the generated print order change instruction to the print server 800. In response to the print order change instruction, the print server 800 changes the setting for the order of execution of the print jobs.

Preferably, the print order change instruction unit 380 may display a setting screen on the display unit of the managing server 300A prompting a change in print order. The system administrator may then set a print order in accordance with the setting screen, so that a print order change instruction can be generated.

Thus, in accordance with the present embodiment, the order of execution of print jobs by the print server 800 can be changed to an appropriate order suitable for the operation of the image forming apparatus managing system 100A.

Embodiment 5

Figure 40:
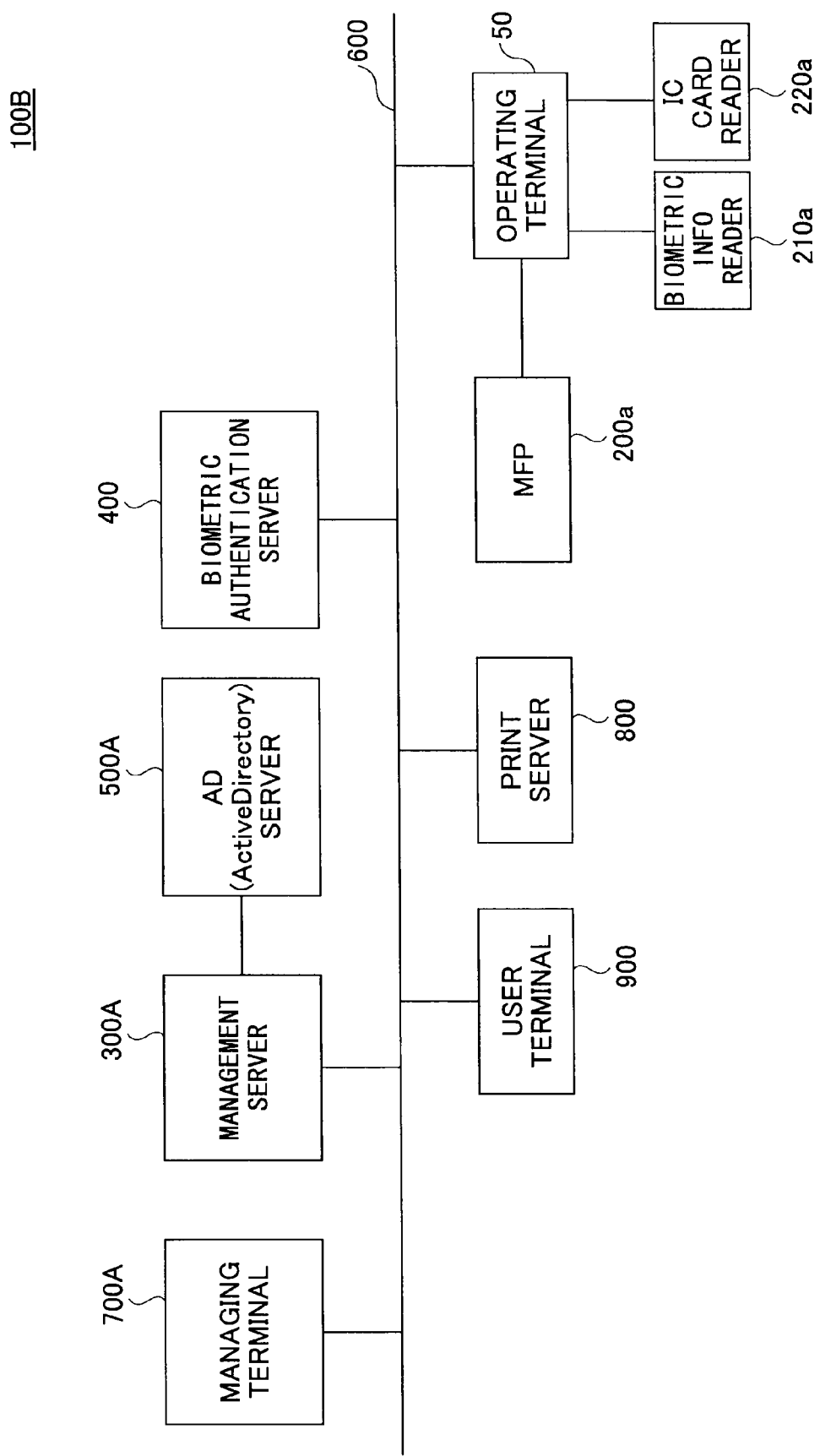
FIG. 40 shows a system configuration of an image forming apparatus managing system 100B according to Embodiment 5.

Hereafter, an image forming apparatus managing system according to Embodiment 5 of the present invention is described with reference to the drawings. FIG. 40 shows a system configuration of the image forming apparatus managing system 100B according to Embodiment 5. In the following description of the image forming apparatus managing system 100B, units or components having the same or corresponding functions or structures as those of Embodiment 4 are designated by similar reference numerals and their descriptions are omitted.

In the image forming apparatus managing system 100B, a portion corresponding to the MFP 200C of Embodiment 4 includes an MFP 200a, an operating terminal 50 for operating the MFP 200a, and a biometric information reader 210a and an IC card reader 220a which are connected outside the operating terminal 50.

Figure 41:
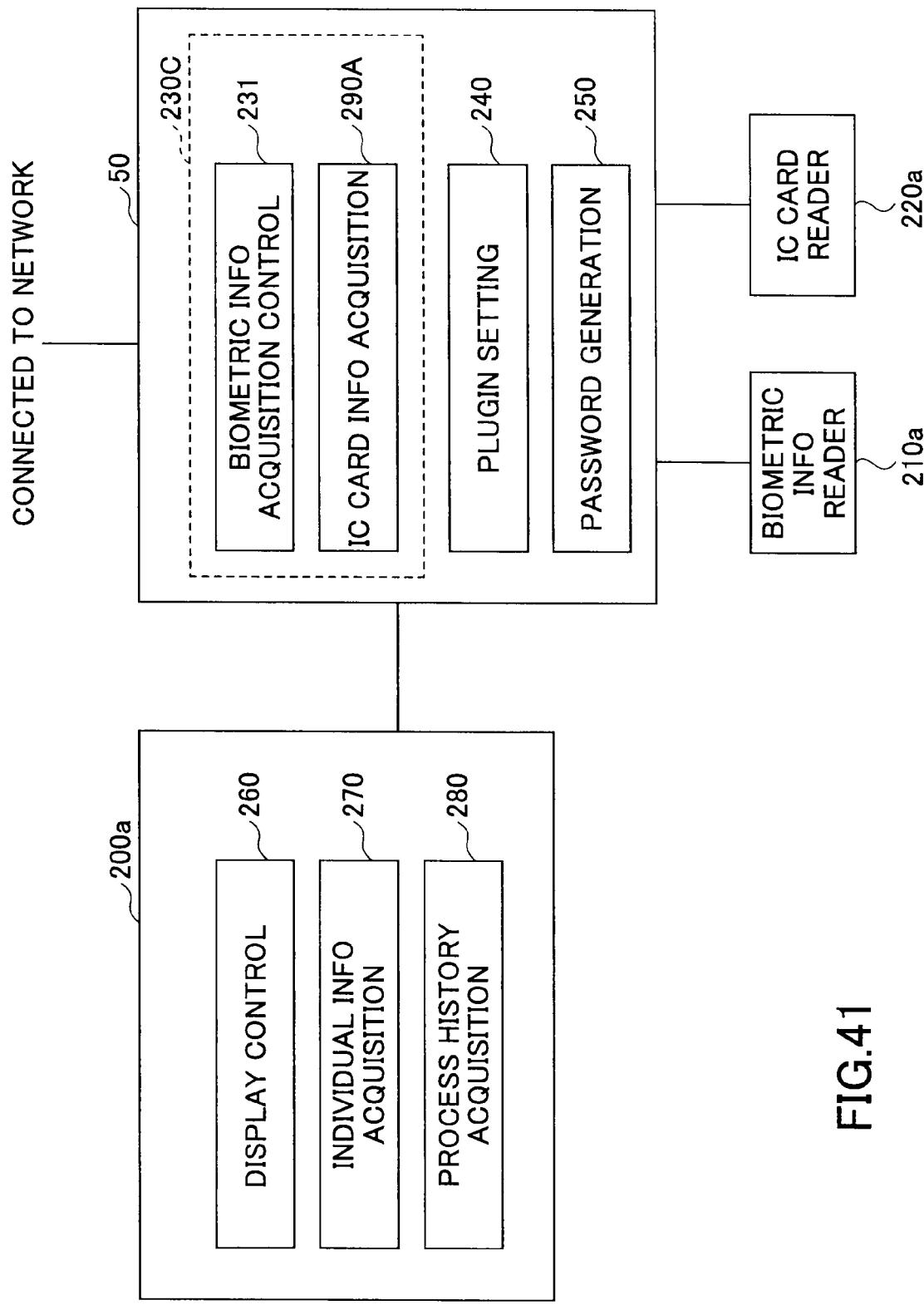

Referring to FIG. 41, the MFP 200a, the operating terminal 50, the biometric information reader 210a, and the IC card reader 220a are described in detail. In accordance with the present embodiment, the MFP 200a is connected to a network 600. The biometric information reader 210a and the IC card reader 220a are connected to the MFP 200a via the operating terminal 50. The MFP 200a may be serially connected to the operating terminal 50 via RS232C connection. The biometric information reader 210a and the IC card reader 220a may be connected to the operating terminal 50 via USB connection.

The hardware structure of the MFP 200a is the same as the MFP 200 according to Embodiment 1. The functions of the display control unit 260, the individual information acquiring unit 270, and the process history acquiring unit 280 are also the same as those of the MFP 200 according to Embodiment 1.

The operating terminal 50, which may comprise a computer having an processor unit and a storage unit, includes a plug-in unit 230C, a plugin setting unit 240, and a password generating unit 250. The plug-in unit 230C includes a plugin 231 for realizing a biometric information read control function, and a plugin 290A for realizing an IC card information acquiring function. The individual plugins function as described with reference to Embodiments 1 through 4. The plugins 231 and 290A may be installed in the operating terminal 50 via the network 600. Alternatively, the operating terminal 50 may acquire the individual plugins from a recording medium in which the plugins 231 and 290A are recorded.

The functions of the plugin setting unit 240 and the password generating unit 250 are as described with reference to Embodiment 4.

In the storage unit of the operating terminal 50, various setting values are stored, and also calculated values obtained by the processor unit may be temporarily recorded. In a recording unit in the operating terminal 50, there may be stored various information in case the operating terminal 50 is unable to communicate with the managing server 300A or the print server 800. Such information may include information concerning the system settings of the image forming apparatus managing system 100A; user information including IC card identifying information, a user ID, and a password; use limit information corresponding to the user information; and history information about a user who used the MFP 200C. These information stored in the storage unit are transmitted periodically by the operating terminal 50 to the managing server 300A.

Hereafter, a biometric authentication process according to Embodiment 5 is described. When performing biometric authentication in the image forming apparatus managing system 100B, the plugin 231 is set by the plugin setting unit 240 in the operating terminal 50. The operating terminal 50 acquires biometric information using the functions of the biometric information reader 210a and the plugin 231. The biometric information is transmitted to the biometric authentication server 400 via the network 600, together with the user ID inputted from the MFP 200a. The process after the transmission of the biometric information to the biometric authentication server 400 is as described with reference to Embodiment 1.

Hereafter, an IC card authentication process according to Embodiment 5 is described. The operating terminal 50 acquires IC card identifying information using the IC card reader 220a. The control unit 211 of the operating terminal 50 then acquires the IC card identifying information from the IC card reader 220a. From the operating terminal 50, the IC card identifying information is transmitted to the managing server 300A via the network 600. In the managing server 300A, a user ID corresponding to the IC card identifying information is obtained. The managing server 300A then supplies use limit information corresponding to the obtained user ID to the MFP 200a. Based on the use limit information, operation of the MFP 200a is controlled.

As described above, in accordance with Embodiment 5 of the present invention, utilization of the image forming apparatus is granted on an individual user basis as in Embodiments 1 and 4 using the operating terminal 50, whereby the confidentiality of information can be maintained.

Although this invention has been described in detail with reference to certain embodiments, variations and modifications exist within the scope and spirit of the invention as described and defined in the following claims.

The present application is based on the Japanese Priority Application No. 2008-176227 filed Jul. 4, 2008, the entire contents of which are hereby incorporated by reference.

What is claimed is:

1. An apparatus, comprising:
a first connecting unit configured to be connected to a first authentication apparatus storing first identification information and executing a user authentication process based on externally received information and the first identification information;
a second connecting unit configured to be connected to a second authentication apparatus storing second identification information and executing the user authentication process based on externally received information and the second identification information;
a setting unit configured to set one of the first authentication apparatus and the second authentication apparatus as an authentication apparatus to be used for the user authentication process;
a first receiving unit configured to receive third identification information;
a second receiving unit configured to receive fourth identification information;

a first sending unit configured to send the third identification information to the first authentication apparatus when the first authentication apparatus is used for the user authentication process;

a second sending unit configured to send the fourth identification information to the second authentication apparatus when the second authentication apparatus is used for the user authentication process;

an authentication process executing unit configured to execute the user authentication process based on the user authentication process executed by one of the first authentication apparatus and the second authentication apparatus, wherein, the first identification information is first biometric information stored in the first authentication apparatus, and the third identification information is second biometric information read by a biometric information reading unit; and a third receiving unit configured to receive first group identification information, wherein the first connecting unit is configured to be connected to the first authentication apparatus storing a plurality of the first biometric information corresponding to one of second group identification information, specifying a plurality of the first biometric information corresponding to the first group identification information externally received, and executing the user authentication process based on the second biometric information externally received and the plurality of the first biometric information specified, and the first sending unit is configured to transmit the second biometric information and the first group identification information to the first authentication apparatus.

2. The apparatus as claimed in claim 1, further comprising:
a storing unit configured to store fifth identification information being associated with use limit information indicating a limit of using a function; and
an acquiring unit configured to acquire the use limit information associated with the fifth identification information of an authenticated user having been authorized by one of the first authentication apparatus and the second authentication apparatus.

3. The apparatus as claimed in claim 1, further comprising:
a third sending unit configured to send the fourth identification information to the second authentication apparatus when the first authentication apparatus is unusable.

4. The apparatus as claimed in claim 1, further comprising:
a third sending unit configured to send the fourth identification information to the second authentication apparatus when the first authentication apparatus is unusable,
wherein
the first connecting unit is configured to be connected to the first authentication apparatus storing the first identification information associated with sixth identification information and executing the user authentication process based on two kinds of externally received information, the first identification information, and the sixth identification information; and
the first sending unit is configured to send the third identification information and the fourth identification information to the first authentication apparatus.

5. The apparatus as claimed in claim 1, wherein the first sending unit is further configured to send the third identification information and the fourth identification information to the first authentication apparatus when the first authentication apparatus is used for the user authentication process, and wherein the user authentication process executed by the first authentication apparatus utilizes only on the third identification information, or utilizes both the third identification information and the second identification information.

6. An authentication system, comprising:
a management apparatus including
a first connecting unit configured to be connected to a first authentication apparatus storing first identification information and executing a user authentication process based on externally received information and the first identification information,
a second connecting unit configured to be connected to a second authentication apparatus storing second identification information and executing the user authentication process based on externally received information and the second identification information,
a setting unit configured to set one of the first authentication apparatus and the second authentication apparatus as an authentication apparatus to be used for the user authentication process,
a first receiving unit configured to receive third identification information;
a second receiving unit configured to receive fourth identification information,
a first sending unit configured to send the third identification information to the first authentication apparatus when the first authentication apparatus is used for the user authentication process,
a second sending unit configured to send the fourth identification information to the second authentication apparatus when the second authentication apparatus is used for the user authentication process, and
an authentication process executing unit configured to execute the user authentication process based on the user authentication process executed by one of the first authentication apparatus and the second authentication apparatus; and
an information processing apparatus including
a third sending unit configured to send the third identification information to the management apparatus,
a fourth sending unit configured to send the fourth identification information to the management apparatus, and
a selection unit configured to select from the third sending unit and the fourth sending unit to be utilized for sending identification information to the management apparatus based on which of the first authentication apparatus and the second authentication apparatus is set as the authentication apparatus to be used for the user authentication process by the setting unit,
wherein, the first identification information is first biometric information stored in the first authentication apparatus, and the third identification information is second biometric information read by a biometric information reading unit,
wherein the management apparatus further includes a fifth receiving unit configured to receive first group identification information,
wherein the first connecting unit is configured to be connected to the first authentication apparatus storing a plurality of the first biometric information corresponding to one of second group identification information, specifying a plurality of the first biometric information corresponding to the first group identification information externally received, and executing the user authentication process based on the second biometric information externally received and the plurality of the first biometric information specified, and wherein the first sending unit is configured to transmit the second biometric information and the first group identification information to the first authentication apparatus.

7. The system as claimed in claim 6, wherein the management apparatus further includes a storing unit configured to store fifth identification information being associated with use limit information indicating a limit of using a function; and an acquiring unit configured to acquire the use limit information associated with the fifth identification information of an authenticated user having been authorized by one of the first authentication apparatus and the second authentication apparatus.

8. The system as claimed in claim 6, wherein the management apparatus further includes a fifth sending unit configured to send the fourth identification information to the second authentication apparatus when the first authentication apparatus is unusable.

9. The system as claimed in claim 6, wherein the management apparatus further includes a fifth sending unit configured to send the fourth identification information to the second authentication apparatus when the first authentication apparatus is unusable, wherein the first connecting unit is configured to be connected to the first authentication apparatus storing the first identification information associated with sixth identification information and executing the user authentication process based on two kinds of externally received information, the first identification information, and the sixth identification information, and wherein the first sending unit is configured to send the third identification information and the fourth identification information to the first authentication apparatus.

10. A method, comprising:

setting one of a first authentication apparatus and a second authentication apparatus as an authentication apparatus to be used for the user authentication process;

connecting to the first authentication apparatus which stores first identification information and executes a user authentication process based on externally received information and the first identification information when the first authentication apparatus is set as the authentication apparatus and connecting to the second authentication apparatus which stores second identification information and executes the user authentication process based on externally received information and the second identification information when the second authentication apparatus is set as the authentication apparatus;

receiving third identification information when the first authentication apparatus is set as the authentication apparatus and fourth identification information when the second authentication apparatus is set as the authentication apparatus;

sending the third identification information to the first authentication apparatus when the first authentication apparatus is used for the user authentication process and sending the fourth identification information to the second authentication apparatus when the second authentication apparatus is used for the user authentication process; and executing the user authentication process based on the user authentication process executed by the first authentication apparatus when the first authentication apparatus is set as the authentication apparatus and by the second authentication apparatus when the second authentication apparatus is set as the authentication apparatus, wherein, the first identification information is first biometric information stored in the first authentication apparatus, and the third identification information is second biometric information read by a biometric information reading unit;

receiving first group identification information; and transmitting the second biometric information and the first group identification information to the first authentication apparatus, wherein first authentication apparatus stores a plurality of the first biometric information corresponding to one of second group identification information, specifies a plurality of the first biometric information corresponding to the first group identification information externally received, and executes the user authentication process based on the second biometric information externally received and the plurality of the first biometric information specified.

11. The method as claimed in claim 10, further comprising:

storing fifth identification information being associated with use limit information indicating a limit of using a function; and acquiring the use limit information associated with the fifth identification information of an authenticated user having been authorized by one of the first authentication apparatus and the second authentication apparatus.

12. The method as claimed in claim 10, further comprising:

sending the fourth identification information to the second authentication apparatus when the first authentication apparatus is unusable.

13. The method as claimed in claim 10, further comprising:

sending the fourth identification information to the second authentication apparatus when the first authentication apparatus is unusable, sending the third identification information and the fourth identification information to the first authentication apparatus, wherein the first authentication apparatus further stores the first identification information associated with sixth identification information and executes the user authentication process based on two kinds of externally received information, the first identification information, and the sixth identification information.

* * * * *